US008926856B2

(12) United States Patent
Low

(10) Patent No.: US 8,926,856 B2
(45) Date of Patent: *Jan. 6, 2015

(54) HEAT TRANSFER COMPOSITIONS

(71) Applicant: Robert E. Low, Newcwys (GB)

(72) Inventor: Robert E. Low, Newcwys (GB)

(73) Assignee: Mexichem Amanco Holding S.A. de C.V., Tlalnepantla (MX)

( * ) Notice: Subject to any disclaimer, the term of this patent is extended or adjusted under 35 U.S.C. 154(b) by 0 days.

This patent is subject to a terminal disclaimer.

(21) Appl. No.: 13/946,697

(22) Filed: Jul. 19, 2013

(65) Prior Publication Data

US 2013/0325732 A1    Dec. 5, 2013

Related U.S. Application Data

(63) Continuation of application No. 13/005,373, filed on Jan. 12, 2011, now Pat. No. 8,512,591.

(30) Foreign Application Priority Data

Feb. 16, 2010 (GB) ................................... 1002625.0

(51) Int. Cl.
| C09K 5/04 | (2006.01) |
| A23L 1/221 | (2006.01) |
| C08J 9/14 | (2006.01) |
| C09K 3/30 | (2006.01) |
| C11B 9/02 | (2006.01) |
| C09K 3/00 | (2006.01) |
| C11D 3/43 | (2006.01) |
| F01K 25/08 | (2006.01) |
| F25B 45/00 | (2006.01) |
| F28C 3/06 | (2006.01) |
| G06Q 30/00 | (2012.01) |

(52) U.S. Cl.
CPC ............... *C09K 5/045* (2013.01); *A23L 1/2215* (2013.01); *C08J 9/146* (2013.01); *C09K 3/30* (2013.01); *C11B 9/025* (2013.01); *C09K 3/00* (2013.01); *C11D 3/43* (2013.01); *F01K 25/08* (2013.01); *F25B 45/00* (2013.01); *F28C 3/06* (2013.01); *G06Q 30/018* (2013.01); *C09K 2205/126* (2013.01); *C09K 2205/22* (2013.01)
USPC .................. 252/67; 252/68; 252/69; 252/364; 521/131; 62/114; 134/36; 60/531

(58) Field of Classification Search
CPC ............. C09K 5/045; C09K 2205/126; C09K 2205/122; C08J 9/14; C08J 9/12; B08B 3/04
USPC ........... 252/67, 68, 69, 364; 521/131; 62/114; 134/36; 60/531
See application file for complete search history.

(56) References Cited

U.S. PATENT DOCUMENTS

| 3,723,318 A | 3/1973 | Butler |
| 3,884,828 A | 5/1975 | Butler |
| 5,053,155 A | 10/1991 | Mahler |
| 5,616,275 A | 4/1997 | Chisolm et al. |
| 5,714,083 A | 2/1998 | Turner |
| 5,788,886 A | 8/1998 | Minor et al. |
| 6,258,292 B1 | 7/2001 | Turner |
| 6,374,629 B1 | 4/2002 | Oberle et al. |
| 6,426,019 B1 | 7/2002 | Acharya et al. |
| 6,881,354 B2 | 4/2005 | Arman et al. |
| 7,238,299 B2 | 7/2007 | Singh et al. |
| 7,569,170 B2 | 8/2009 | Minor |
| 7,629,306 B2 | 12/2009 | Shankland et al. |
| 7,807,074 B2 | 10/2010 | Luly et al. |
| 7,829,748 B1 | 11/2010 | Tung et al. |
| 7,846,355 B2 | 12/2010 | Nappa et al. |
| 7,862,740 B2 | 1/2011 | Minor et al. |
| 7,862,741 B2 | 1/2011 | Minor et al. |
| 7,862,742 B2 | 1/2011 | Minor et al. |
| 7,879,253 B2 | 2/2011 | Minor et al. |
| 7,906,037 B2 | 3/2011 | Minor et al. |
| 7,914,696 B2 | 3/2011 | Low et al. |
| 7,959,825 B2 | 6/2011 | Minor et al. |
| 8,333,901 B2 | 12/2012 | Low |
| 8,512,591 B2 * | 8/2013 | Low .............................. 252/67 |
| 8,628,681 B2 | 1/2014 | Low |
| 2002/0046568 A1 | 4/2002 | Thomas et al. |
| 2003/0042463 A1 | 3/2003 | Arman et al. |
| 2004/0119047 A1 | 6/2004 | Singh et al. |
| 2004/0127383 A1 | 7/2004 | Pham et al. |
| 2004/0256594 A1 | 12/2004 | Singh et al. |
| 2005/0233923 A1 | 10/2005 | Singh et al. |
| 2005/0233932 A1 | 10/2005 | Singh et al. |

(Continued)

FOREIGN PATENT DOCUMENTS

| CA | 668494 | 8/1963 |
| CN | 95117074.0 | 10/1995 |
| CN | 101864276 | 10/2010 |
| DE | 4116274 | 11/1992 |
| DE | 202007008291 | 11/2007 |
| EP | 0398147 | 11/1990 |
| EP | 0582451 | 2/1994 |
| EP | 0772659 | 9/2001 |
| EP | 1167894 | 1/2002 |
| EP | 1832639 | 9/2007 |

(Continued)

OTHER PUBLICATIONS

Poling, B.E. et al.; The Properties of Gases and Liquids, 2001, Chapters 2, 3, 4, 6, 7, and 8.

(Continued)

Primary Examiner — Douglas McGinty
(74) Attorney, Agent, or Firm — Ryan Kromholz & Manion, S.C.

(57) ABSTRACT

A heat transfer composition comprising trans-1,3,3,3-tetrafluoropropene (R-1234ze(E)), difluoromethane (R-32) and 1,1-difluoroethane (R-152a).

45 Claims, 5 Drawing Sheets

(56) References Cited

U.S. PATENT DOCUMENTS

| | | |
|---|---|---|
| 2005/0245421 A1 | 11/2005 | Singh et al. |
| 2005/0247905 A1 | 11/2005 | Singh et al. |
| 2006/0043331 A1 | 3/2006 | Shankland et al. |
| 2006/0243944 A1 | 11/2006 | Minor et al. |
| 2006/0243945 A1 | 11/2006 | Minor et al. |
| 2007/0007488 A1 | 1/2007 | Singh et al. |
| 2007/0010592 A1 | 1/2007 | Bowman et al. |
| 2007/0069175 A1 | 3/2007 | Thomas et al. |
| 2007/0108403 A1 | 5/2007 | Sievert et al. |
| 2007/0210275 A1 | 9/2007 | Luly et al. |
| 2007/0210276 A1 | 9/2007 | Luly et al. |
| 2008/0069177 A1 | 3/2008 | Minor et al. |
| 2008/0099190 A1 | 5/2008 | Singh et al. |
| 2008/0121837 A1 | 5/2008 | Singh et al. |
| 2008/0171652 A1 | 7/2008 | Singh et al. |
| 2008/0230738 A1* | 9/2008 | Minor et al. ............ 252/67 |
| 2008/0308763 A1 | 12/2008 | Singh et al. |
| 2008/0314073 A1 | 12/2008 | Minor et al. |
| 2009/0120619 A1 | 5/2009 | Sievert et al. |
| 2009/0249809 A1 | 10/2009 | Minor et al. |
| 2009/0250650 A1 | 10/2009 | Minor et al. |
| 2009/0253820 A1 | 10/2009 | Bowman et al. |
| 2009/0255285 A1 | 10/2009 | Minor et al. |
| 2009/0272931 A1 | 11/2009 | Minor et al. |
| 2009/0277194 A1 | 11/2009 | Minor et al. |
| 2009/0278072 A1 | 11/2009 | Minor et al. |
| 2009/0278076 A1 | 11/2009 | Singh et al. |
| 2009/0285764 A1 | 11/2009 | Singh et al. |
| 2009/0302285 A1 | 12/2009 | Singh et al. |
| 2010/0025619 A1 | 2/2010 | Riva et al. |
| 2010/0044619 A1 | 2/2010 | Hulse et al. |
| 2010/0075046 A1 | 3/2010 | Hakamada et al. |
| 2010/0122545 A1 | 5/2010 | Minor et al. |
| 2010/0127209 A1 | 5/2010 | Singh et al. |
| 2010/0200798 A1 | 8/2010 | Rao et al. |
| 2011/0162410 A1 | 7/2011 | Low |
| 2011/0173997 A1 | 7/2011 | Low et al. |
| 2011/0258146 A1 | 10/2011 | Low |
| 2011/0260095 A1 | 10/2011 | Low |
| 2012/0096877 A1 | 4/2012 | Yana Motta et al. |
| 2012/0101177 A1* | 4/2012 | Van Horn et al. ............ 521/98 |
| 2012/0126187 A1 | 5/2012 | Low |
| 2012/0168663 A1 | 7/2012 | Singh et al. |
| 2013/0096218 A1 | 4/2013 | Rached et al. |

FOREIGN PATENT DOCUMENTS

| | | |
|---|---|---|
| EP | 1832640 | 9/2007 |
| EP | 1985680 | 10/2008 |
| EP | 2036943 | 3/2009 |
| EP | 2085422 | 8/2009 |
| EP | 1716216 | 11/2009 |
| EP | 2149592 | 2/2010 |
| EP | 2246649 | 11/2010 |
| EP | 2249104 | 11/2010 |
| GB | 950876 | 2/1964 |
| GB | 2435747 | 9/2007 |
| GB | 2440258 | 1/2008 |
| JP | 4110388 | 4/1992 |
| JP | 2003-076747 A | 3/2003 |
| RU | 2073058 | 2/1997 |
| WO | WO96/03473 | 2/1996 |
| WO | WO98/50331 | 11/1998 |
| WO | WO2004/037752 | 5/2004 |
| WO | WO2004/037913 | 5/2004 |
| WO | WO2005/042663 | 5/2005 |
| WO | WO2005/103190 | 11/2005 |
| WO | WO2005/103191 | 11/2005 |
| WO | WO2005/103192 | 11/2005 |
| WO | WO2005/105947 | 11/2005 |
| WO | WO2005/108522 | 11/2005 |
| WO | WO2005/108523 | 11/2005 |
| WO | WO2006/094303 | 9/2006 |
| WO | WO2007/002625 | 1/2007 |
| WO | WO2007/035697 | 3/2007 |
| WO | WO2007053697 | 5/2007 |
| WO | WO2007/109748 | 9/2007 |
| WO | WO2008/009928 | 1/2008 |
| WO | WO2008/027555 | 3/2008 |
| WO | WO2008/065011 | 6/2008 |
| WO | WO2008/065331 | 6/2008 |
| WO | WO2008/076272 | 6/2008 |
| WO | WO2008/121776 | 10/2008 |
| WO | WO2008/121783 | 10/2008 |
| WO | WO2008/121785 | 10/2008 |
| WO | WO2008/140809 | 11/2008 |
| WO | WO2009/047535 | 4/2009 |
| WO | WO2009/047542 | 4/2009 |
| WO | WO2009/134957 | 11/2009 |
| WO | WO2009/151669 | 12/2009 |
| WO | WO2010/000993 | 1/2010 |
| WO | WO2010/000994 | 1/2010 |
| WO | WO2010/000995 | 1/2010 |
| WO | WO2010/002020 | 1/2010 |
| WO | WO2010/002023 | 1/2010 |
| WO | WO2010/056695 | 5/2010 |
| WO | WO2010/059677 | 5/2010 |
| WO | WO 2010059677 A2 * | 5/2010 |
| WO | WO2010/064005 A1 | 6/2010 |
| WO | WO2010/075046 | 7/2010 |
| WO | WO2010075046 | 7/2010 |
| WO | WO2010/088320 | 8/2010 |
| WO | WO2010119265 | 10/2010 |
| WO | WO2010/129461 | 11/2010 |
| WO | WO2010/129920 | 11/2010 |

OTHER PUBLICATIONS http://en.wikipedia.org/wiki/Total Equivalent warming impact.

http://www.sae.org/events/aars/presentations/2007papsavva.pdf Jul. 17, 2007.

Althouse et al.; Modern refrigeration and Air Conditioning, 1968, Chapters 26 and 27.

ASHRAE Standard 34-2007 Designation and Safety Classification of Refrigerants.

Downing, Fluorocarbon Refrigerants Handbook, 1988, Prentice-Hall, pp. 21- 22 and pp. 371-372.

Kleiber, Vapor-liquid equilibria of binary refrigerant mixtures containing propylene or R134a, Fluid Phase Equilib., 1994 pp. 149-194.

Lee et al., Phase Equilibria of Chlorofluorocarbon Alternative Refrigerant Mixtures, J. Chem. Eng. Data 1999, 44, 190-192.

Ho et al., Measurement of Vapor-Liquid Equilibria for the Binary Mixture Difluoromethane (HFC-32) + Propylene (R-1270), J. Chem. Eng. Data 2005, 50, 419-424.

Nagel et al., Vapour-liquid equilibrium of ternary mixtures of the refrigerants R32, R125 and R134a, Int J. Refrig. vol. 18, No, 8, pp. 534-543, 1995.

NASA Contract NAS-7-918, Technical Support Package on Nearly Azeotropic Mixtures to Replace Refrigerant 12, Aug. 1992.

Regulation of the European Parliament and of Council on certain Fluorinated Greenhouse Gases, Brussels 2003.

Rivollet et al., Vapor-liquid equilibrium data for carbon dioxide (CO2) + difluoromethane (R32) system at temperatures . . . , Fluid Phase Equilibria 218 (2004) 95-101.

Kutz, Mechanical Engineers' Handbook, 1998, 2nd Edition, p. 1887.

Takizawa et al., Reaction stoichiometry for combustionof fluoroethane blends, ASHRAE Trans., 2006 pp. 459-468.

Orkin et al., Photochemistry of Bromine-Containing Fluorinated Alkenes: Reactivity toward OH and UV Spectra, J. Phys. Chem. A 2002, 106, 10195-10199.

Van Ness et al., Vapor-Liquid Equilibrium, ALChE Journal, 1978, pp. 1055-1063.

Langley, Refrigeration and Air Conditioning, 1986 3rd Edition, pp. 525-526.

Puhl, Presentation at VDA Winter Meeting at Saalfelden, Feb. 11-12, 2009.

US Dept for Commerce, NIST Reference Fluid Thermodynamic and Transport Properties-REFRPROP User Guide, Version 8, Apr. 2007.

(56) References Cited

OTHER PUBLICATIONS

Papasavva et al., Global Refrigerants Energy & Environmental-Mobile Air Conditioning-Life Cycle Climate Performance, Jul. 17, 2007, SAE 8th Alternate Refrigerant Systems Symposium.

Barrault et al., Analysis of the economic and environmental consequences of a phase out of considerable reduction leakage. . . , EU Commission Final Report, Feb. 2003.

The Scientific Assessment of Ozone Depletion 2002. Controlled Substances and Other Source Gases Chapter 1.

Brown, HFOs New, Low Globabl Warming potential Refrigerants, ASHRAE Journal, Aug. 2009.

Table 2.14 Lieftimes, radiative efficiencies and direct, IPCC/TEAP data, 2005.

ASHRAE Handbook (2001 Fundamentals Volume), Section 2 (Jacobi, A.M.) pp. 2.1-2.14.

ASHRAE Standard 34, 1997, p. 12.

Kondo et al. "Flammability limits of multi-fluorinated compounds", Fire Safety Journal, 2006, 41, 46-56.

Kondo et al., "Flammability limits of olefinic and saturated fluoricompounds", Journal of Hazardous Materials, 2009, 171, 613-618.

Han et al., "Isothermal vapour-liquid equilibrium . . . ", J.Chem.Eng. Data, 2006, 51, 1232-1235.

Chen et al., "Gaseous PVT properties of ethyl fluoride", Fluid Phase Equilibria, 2005, 237, 111-116.

Beyerleim et al., "Properties of novel fluorinated compounds . . . ", Fluid Phase Equilibria, 1998, 150-151, 287-296.

ASHRAE Standard 34, 2004.

ASHRAE Standard 34—Appendices, 2004.

ASTM Standard E-681, May 14, 2012.

\* cited by examiner

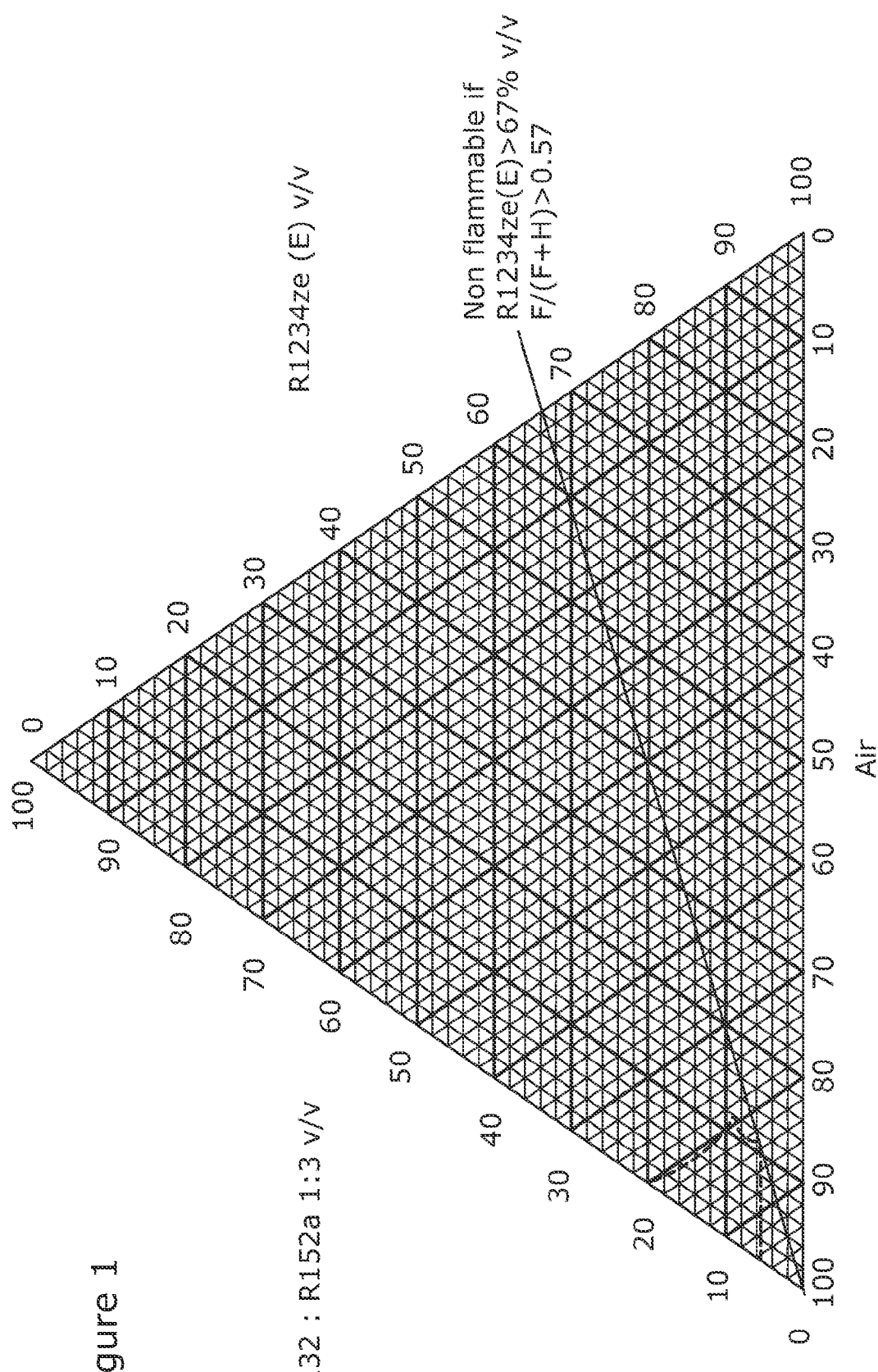

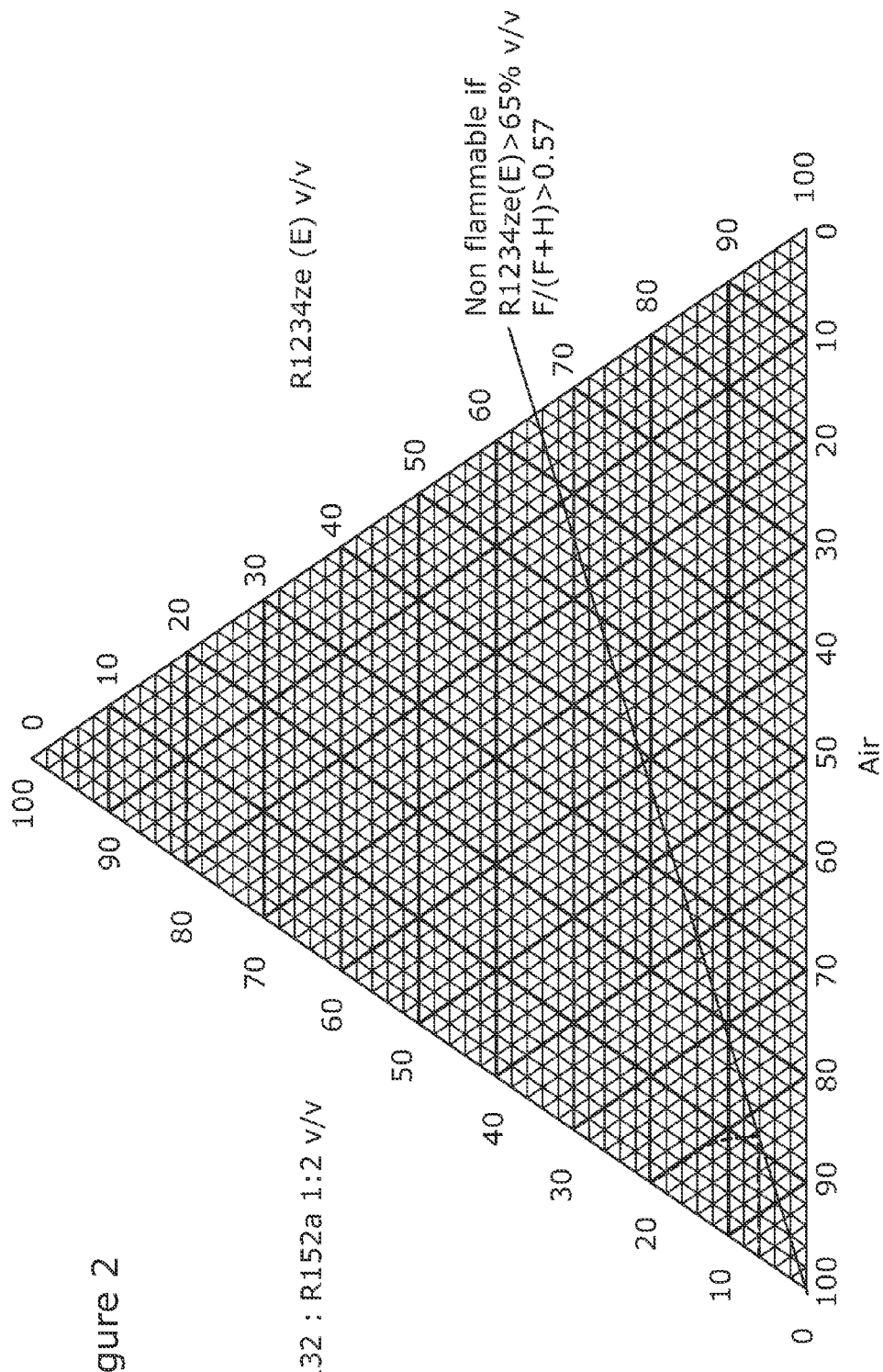

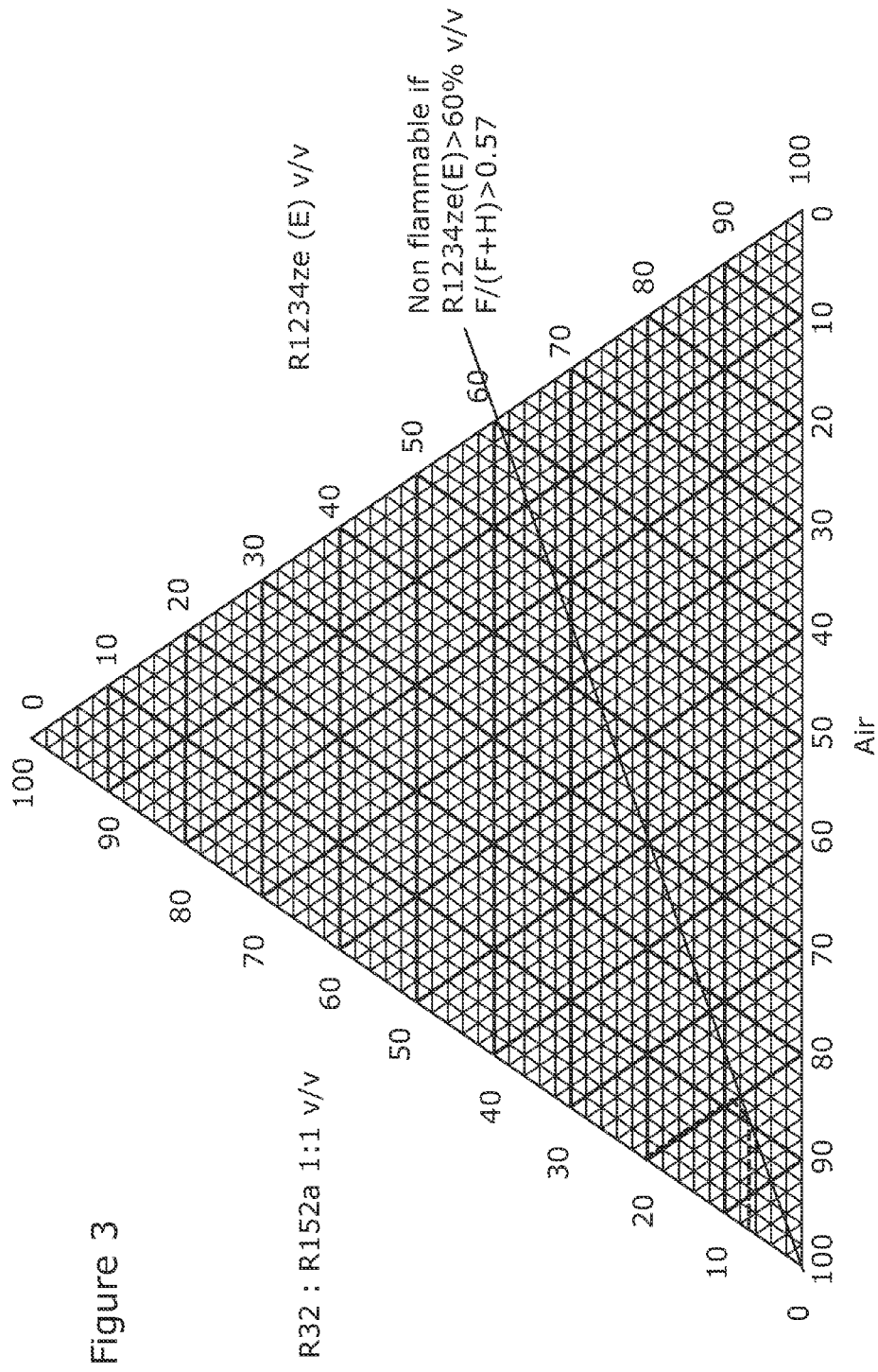

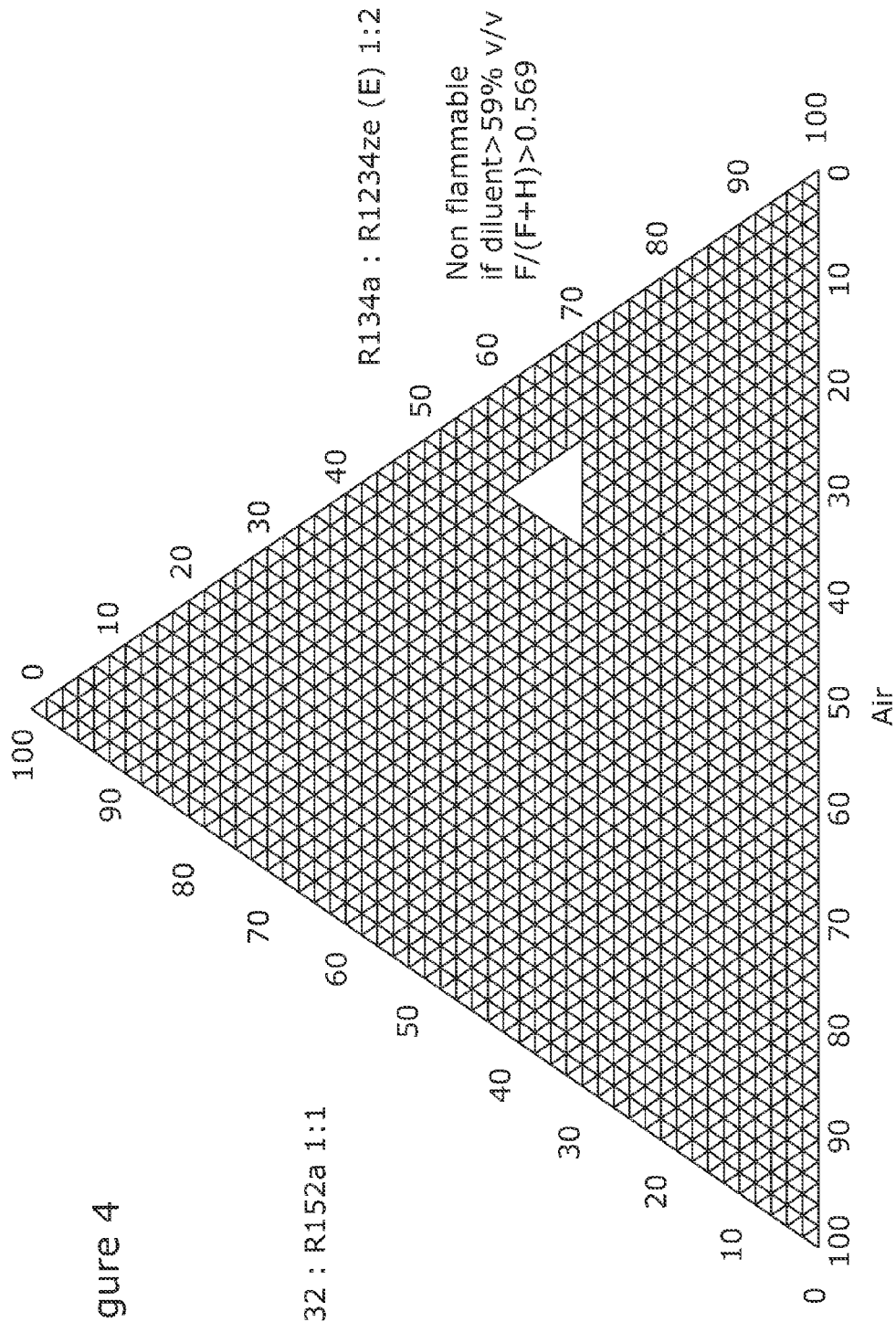

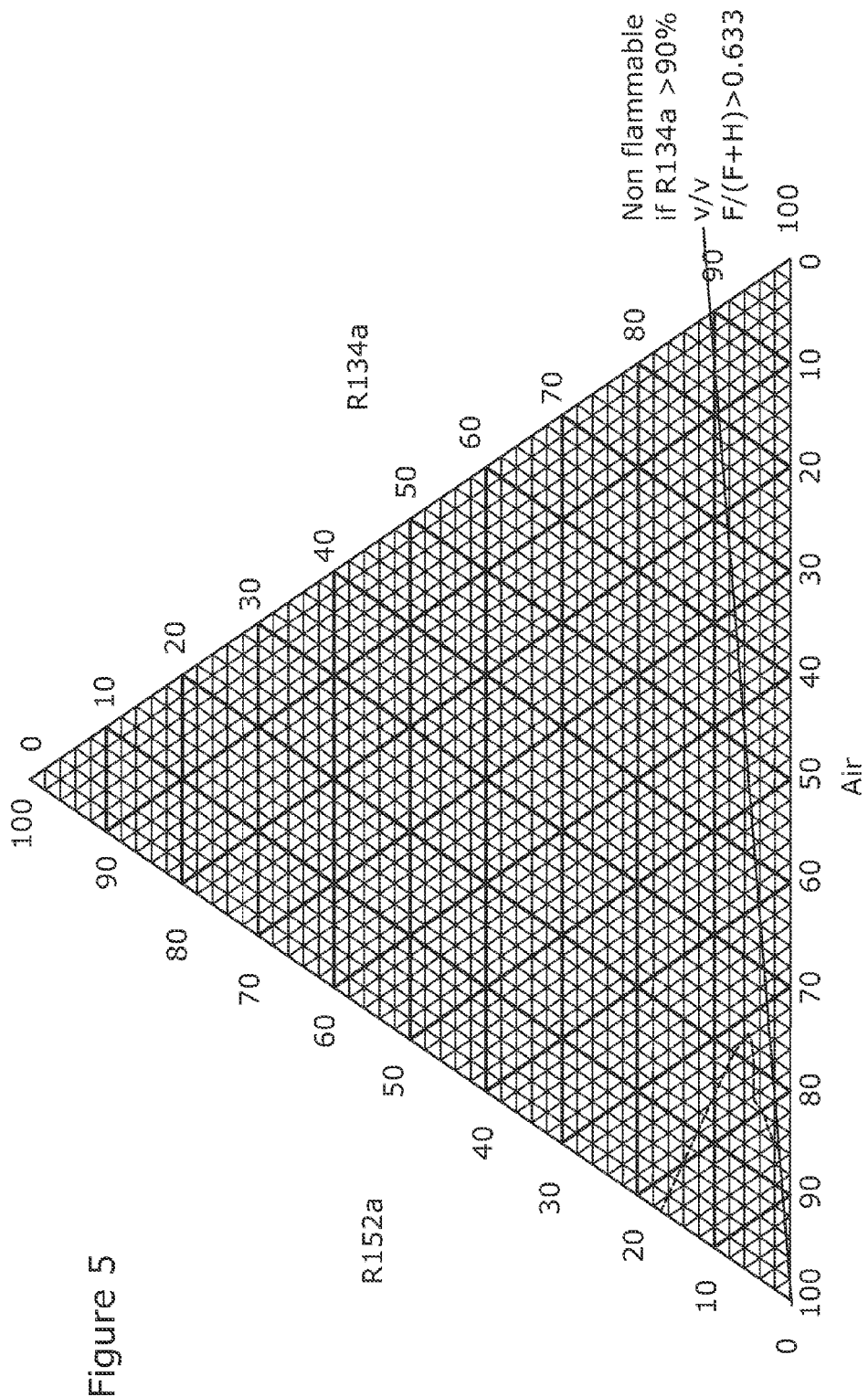

HEAT TRANSFER COMPOSITIONS

RELATED APPLICATIONS

The present application is a continuation of co-pending U.S. application Ser. No. 13/005,373 filed 12 Jan. 2011, which claims priority to Great Britain Application No. 1002625.0 filed on Feb. 16, 2010.

BACKGROUND OF THE INVENTION

The invention relates to heat transfer compositions, and in particular to heat transfer compositions which may be suitable as replacements for existing refrigerants such as R-134a, R-152a, R-1234yf, R-22, R-410A, R-407A, R-407B, R-407C, R507 and R-404a.

The listing or discussion of a prior-published document or any background in the specification should not necessarily be taken as an acknowledgement that a document or background is part of the state of the art or is common general knowledge.

Mechanical refrigeration systems and related heat transfer devices such as heat pumps and air-conditioning systems are well known. In such systems, a refrigerant liquid evaporates at low pressure taking heat from the surrounding zone. The resulting vapor is then compressed and passed to a condenser where it condenses and gives off heat to a second zone, the condensate being returned through an expansion valve to the evaporator, so completing the cycle. Mechanical energy required for compressing the vapor and pumping the liquid is provided by, for example, an electric motor or an internal combustion engine.

In addition to having a suitable boiling point and a high latent heat of vaporization, the properties preferred in a refrigerant include low toxicity, non-flammability, non-corrosivity, high stability and freedom from objectionable odor. Other desirable properties are ready compressibility at pressures below 25 bars, low discharge temperature on compression, high refrigeration capacity, high efficiency (high coefficient of performance) and an evaporator pressure in excess of 1 bar at the desired evaporation temperature.

Dichlorodifluoromethane (refrigerant R-12) possesses a suitable combination of properties and was for many years the most widely used refrigerant. Due to international concern that fully and partially halogenated chlorofluorocarbons were damaging the earth's protective ozone layer, there was general agreement that their manufacture and use should be severely restricted and eventually phased out completely. The use of dichlorodifluoromethane was phased out in the 1990's.

Chlorodifluoromethane (R-22) was introduced as a replacement for R-12 because of its lower ozone depletion potential. Following concerns that R-22 is a potent greenhouse gas, its use is also being phased out.

Whilst heat transfer devices of the type to which the present invention relates are essentially closed systems, loss of refrigerant to the atmosphere can occur due to leakage during operation of the equipment or during maintenance procedures. It is important, therefore, to replace fully and partially halogenated chlorofluorocarbon refrigerants by materials having zero ozone depletion potentials.

In addition to the possibility of ozone depletion, it has been suggested that significant concentrations of halocarbon refrigerants in the atmosphere might contribute to global warming (the so-called greenhouse effect). It is desirable, therefore, to use refrigerants which have relatively short atmospheric lifetimes as a result of their ability to react with other atmospheric constituents such as hydroxyl radicals, or as a result of ready degradation through photolytic processes.

R-410A and R-407 refrigerants (including R-407A, R-407B and R-407C) have been introduced as a replacement refrigerant for R-22. However, R-22, R-410A and the R-407 refrigerants all have a high global warming potential (GWP, also known as greenhouse warming potential).

1,1,1,2-tetrafluoroethane (refrigerant R-134a) was introduced as a replacement refrigerant for R-12. However, despite having no significant ozone depletion potential, R-134a has a GWP of 1300. It would be desirable to find replacements for R-134a that have a lower GWP.

R-152a (1,1-difluoroethane) has been identified as an alternative to R-134a. It is somewhat more efficient than R-134a and has a greenhouse warming potential of 120. However the flammability of R-152a is judged too high, for example to permit its safe use in mobile air conditioning systems. In particular it is believed that its lower flammable limit in air is too low, its flame speeds are too high, and its ignition energy is too low.

Thus there is a need to provide alternative refrigerants having improved properties such as low flammability. Fluorocarbon combustion chemistry is complex and unpredictable. It is not always the case that mixing a non-flammable fluorocarbon with a flammable fluorocarbon reduces the flammability of the fluid or reduces the range of flammable compositions in air. For example, the inventors have found that if non-flammable R-134a is mixed with flammable R-152a, the lower flammable limit of the mixture alters in a manner which is not predictable. The situation is rendered even more complex and less predictable if ternary or quaternary compositions are considered.

There is also a need to provide alternative refrigerants that may be used in existing devices such as refrigeration devices with little or no modification.

R-1234yf (2,3,3,3-tetrafluoropropene) has been identified as a candidate alternative refrigerant to replace R-134a in certain applications, notably in mobile air conditioning or heat pumping applications. Its GWP is about 4. R-1234yf is flammable but its flammability characteristics are generally regarded as acceptable for some applications including mobile air conditioning or heat pumping. In particular, when compared with R-152a, its lower flammable limit is higher, its minimum ignition energy is higher and the flame speed in air is significantly lower than that of R-152a.

The environmental impact of operating an air conditioning or refrigeration system, in terms of the emissions of greenhouse gases, should be considered with reference not only to the so-called "direct" GWP of the refrigerant, but also with reference to the so-called "indirect" emissions, meaning those emissions of carbon dioxide resulting from consumption of electricity or fuel to operate the system. Several metrics of this total. GWP impact have been developed, including those known as Total Equivalent Warming Impact (TEWI) analysis, or Life-Cycle Carbon Production (LCCP) analysis. Both of these measures include estimation of the effect of refrigerant GWP and energy efficiency on overall warming impact.

The energy efficiency and refrigeration capacity of R-1234yf have been found to be significantly lower than those of R-134a and in addition the fluid has been found to exhibit increased pressure drop in system pipework and heat exchangers. A consequence of this is that to use R-1234yf and achieve energy efficiency and cooling performance equivalent to R-134a, increased complexity of equipment and increased size of pipework is required, leading to an increase in indirect emissions associated with equipment. Furthermore, the production of R-1234yf is thought to be more complex and less efficient in its use of raw materials (fluorinated and chlorinated) than R-134a. So the adoption of R-1234yf to replace R-134a will consume more raw materials and result in more indirect emissions of greenhouse gases than does R-134a.

Some existing technologies designed for R-134a may not be able to accept even the reduced flammability of some heat transfer compositions (any composition having a GWP of less than 150 is believed to be flammable to some extent).

SUMMARY OF THE INVENTION

A principal object of the present invention is therefore to provide a heat transfer composition which is usable in its own right or suitable as a replacement for existing refrigeration usages which should have a reduced GWP, yet have a capacity and energy efficiency (which may be conveniently expressed as the "Coefficient of Performance") ideally within 10% of the values, for example of those attained using existing refrigerants (e.g. R-134a, R-152a, R-1234yf, R-22, R-410A, R-407A, R-407B, R-407C, R507 and R-404a), and preferably within less than 10% (e.g. about 5%) of these values. It is known in the art that differences of this order between fluids are usually resolvable by redesign of equipment and system operational features. The composition should also ideally have reduced toxicity and acceptable flammability.

The subject invention addresses the above deficiencies by the provision of a heat transfer composition comprising trans-1,3,3,3-tetrafluoropropene (R-1234ze(E)), difluoromethane (R-32), and 1,1-difluoroethane (R-152a). This will be referred to hereinafter as the composition of the invention, unless otherwise stated.

BRIEF DESCRIPTION OF THE DRAWINGS

FIG. 1 is a flammability diagram for compositions of R-32, R-152a, and R-1234ze(E), with R-32 and R-152a having a 1:3 ratio.

FIG. 2 is a flammability diagram for compositions of R-32, R-152a, and R-1234ze(E), with R-32 and R-152a having a 1:2 ratio.

FIG. 3 is a flammability diagram for compositions of R-32, R-152a, and R-1234ze(E), with R-32 and R-152a having a 1:1 ratio.

FIG. 4 is a flammability diagram for composition of R-32, R-152a, R-134a, and R-1234ze(E), with R-32 and R-152a having a 1:1 ration and R-134a and R-1234ze(E) having a 1:2 ratio.

FIG. 5 is a flammability diagram of R-152a and R-134a.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

All of the chemicals herein described are commercially available. For example, the fluorochemicals may be obtained from Apollo Scientific (UK).

Typically, the compositions of the invention contain up to about 25% by weight R-32.

Conveniently, the compositions of the invention contain up to about 45% by weight R-152a.

In a preferred embodiment, the compositions of the invention contain from about 2 to about 25% by weight R-32, from about 5 to about 45% by weight R-152a, and from about 60 to about 95% by weight (e.g. from about 70 to about 93%) R-1234ze(E).

Advantageously, the compositions of the invention contain from about 4 to about 12% by weight R-32, from about 5 to about 10% by weight R-152a, and from about 78 to about 91% by weight R-1234ze(E).

In a preferred aspect, the compositions of the invention contain from about 8 to about 12% by weight R-32, from about 5 to about 10% by weight R-152a, and from about 78 to about 87% by weight R-1234ze(E). Examples of such compositions are ternary blends containing:

about 10% R-32, about 5% R-152a and about 85% R-1234ze(E);

about 11% R-32, about 6% R-152a and about 83% R-1234ze(E);

about 9% R-32, about 6% R-152a and about 85% R-1234ze(E);

about 8% R-32, about 5% R-152a and about 87% R-1234ze(E); or about 8% R-32, about 6% R-152a and about 86% R-1234ze(E).

Conveniently, the compositions of the invention contain from about 8 to about 12% by weight R-32, from about 3 to about 7% by weight R-152a, and from about 81 to about 89% by weight R-1234ze(E).

In one aspect of the invention, the compositions of the invention contain from about 5 to about 12% by weight R-32, from about 10 to about 45% by weight of R-152a, and from about 43 to about 85% by weight R-1234ze(E).

In a further preferred aspect, the compositions of the invention contain from about 5 to about 12% by weight R-32, from about 10 to about 40% by weight of R-152a, and from about 48 to about 85% by weight R-1234ze(E).

In one embodiment, the compositions of the invention contain from about 5 to about 11% by weight R-32, from about 10 to about 35% by weight of R-152a, and from about 54 to about 85% by weight R-1234ze(E).

Advantageously, the compositions of the invention contain from about 5 to about 10% by weight R-32, from about 15 to about 30% by weight R-152a, and from about 60 to about 80% by weight R-1234ze(E).

As used herein, all % amounts mentioned in compositions herein, including in the claims, are by weight based on the total weight of the compositions, unless otherwise stated.

For the avoidance of doubt, it is to be understood that the stated upper and lower values for ranges of amounts of components in the compositions of the invention may be interchanged in any way, provided that the resulting ranges fall within the broadest scope of the invention. For example, a composition of the invention may comprise from about 5 to about 12% by weight R-32, from about 5 or 10 to about 35% by weight of R-152a, and from about 53 to about 85 or 90% by weight R-1234ze(E).

The compositions of the invention containing R-1234ze (E), R-32, and R-152a may consist essentially of (or consist of) these components.

By the term "consist essentially of", we mean that the compositions of the invention contain substantially no other components, particularly no further (hydro)(fluoro)compounds (e.g. (hydro)(fluoro)alkanes or (hydro)(fluoro)alkenes) known to be used in heat transfer compositions. We include the term "consist of" within the meaning of "consist essentially of". Thus, the compositions of the invention preferably are ternary blends of R-1234ze(E), R-32, and R-152a.

For the avoidance of doubt, any of the compositions of the invention described herein, including those with specifically defined amounts of components, may consist essentially of (or consist of) the components defined in those compositions.

In a further aspect, the compositions of the invention containing R-1234ze(E), R-32, and R-152a may additionally comprise 1,1,1,2-tetrafluoroethane (R-134a). The R-134a typically is included to reduce the flammability of the compositions of the invention.

If R-134a is present, then the resulting compositions typically contain up to about 50% by weight R-134a, preferably from about 25% to about 45% by weight R-134a. The remainder of the composition will contain R32, R152a and R-1234ze (E), suitably in similar preferred proportions as described hereinbefore.

Suitable blends of R32, R152a, R-1234ze(E) and R-134a contain from about 2 to about 15% by weight R-32, from about 5 to about 45% by weight R-152a, from about 25 to about 50% R-134a, and from about 5 to about 70% by weight R-1234ze(E).

For example, the composition of the invention may contain from about 4 to about 12% by weight R-32, from about 5 to about 35% by weight R-152a, from about 25 to about 45% R-134a, and the balance R-1234ze(E).

If the proportion of R-134a in the composition is about 25% by weight, then the remainder of the composition typically contains from about 3 to about 12% (preferably from about 4 to about 10%) by weight R-32, from about 5 to about 45% (preferably from about 5 to about 40%) by weight R-152a, and from about 20 to about 70% (preferably from about 25 to about 65%) by weight R-1234ze(E).

If the proportion of R-134a in the composition is about 35% by weight, then the remainder of the composition typically contains from about 3 to about 11% (preferably from about 4 to about 10%) by weight R-32, from about 5 to about 45% (preferably from about 5 to about 40%) by weight R-152a, and from about 10 to about 60% (preferably from about 15 to about 55%) by weight R-1234ze(E).

If the proportion of R-134a in the composition is about 45% by weight, then the remainder of the composition typically contains from about 3 to about 10% (preferably from about 3 to about 8%) by weight R-32, from about 5 to about 45% (preferably from about 5 to about 40%) by weight R-152a, and from about 5 to about 50% (preferably from about 15 to about 45%) by weight R-1234ze(E).

Preferably, the compositions of the invention which contain R-134a are non-flammable at a test temperature of 60° C. using the ASHRAE 34 methodology. Advantageously, the mixtures of vapor that exist in equilibrium with the compositions of the invention at any temperature between about −20° C. and 60° C. are also non-flammable.

Compositions according to the invention conveniently comprise substantially no R-1225 (pentafluoropropene), conveniently substantially no R-1225ye (1,2,3,3,3-pentafluoropropene) or R-1225zc (1,1,3,3,3-pentafluoropropene), which compounds may have associated toxicity issues.

By "substantially no", we include the meaning that the compositions of the invention contain 0.5% by weight or less of the stated component, preferably 0.1% or less, based on the total weight of the composition.

The compositions of the invention may contain substantially no:
(i) 2,3,3,3-tetrafluoropropene (R-1234yf),
(ii) cis-1,3,3,3-tetrafluoropropene (R-1234ze(Z)), and/or
(iii) 3,3,3-trifluoropropene (R-1243zf).

The compositions of the invention have zero ozone depletion potential.

Preferably, the compositions of the invention (e.g. those that are suitable refrigerant replacements for R-134a, R-1234yf or R-152a) have a GWP that is less than 1300, preferably less than 1000, more preferably less than 500, 400, 300 or 200, especially less than 150 or 100, even less than 50 in some cases. Unless otherwise stated, IPCC (Intergovernmental Panel on Climate Change) TAR (Third Assessment Report) values of GWP have been used herein.

Advantageously, the compositions are of reduced flammability hazard when compared to the individual flammable components of the compositions, e.g. R-32 or R-152a. Preferably, the compositions are of reduced flammability hazard when compared to R-1234yf.

In one aspect, the compositions have one or more of (a) a higher lower flammable limit; (b) a higher ignition energy; or (c) a lower burning velocity compared to R-32, R-152a or R-1234yf. In a preferred embodiment, the compositions of the invention are non-flammable. Advantageously, the mixtures of vapor that exist in equilibrium with the compositions of the invention at any temperature between about −20° C. and 60° C. are also non-flammable.

Flammability may be determined in accordance with ASHRAE Standard 34 incorporating the ASTM Standard E-681 with test methodology as per Addendum 34p dated 2004, the entire content of which is incorporated herein by reference.

In some applications it may not be necessary for the formulation to be classed as non-flammable by the ASHRAE 34 methodology; it is possible to develop fluids whose flammability limits will be sufficiently reduced in air to render them safe for use in the application, for example if it is physically not possible to make a flammable mixture by leaking the refrigeration equipment charge into the surrounds. We have found that the effect of adding further refrigerants R-32 and R-1234ze(E) to flammable refrigerant R-152a is to modify the flammability in mixtures with air in this manner.

It is known that the flammability of mixtures of hydrofluorocarbons, (HFCs) or hydrofluorocarbons plus hydrofluoroolefins, is related to the proportion of carbon-fluorine bonds relative to carbon-hydrogen bonds. This can be expressed as the ratio $R=F/(F+H)$ where, on a molar basis, F represents the total number of fluorine atoms and H represents the total number of hydrogen atoms in the composition. This is referred to herein as the fluorine ratio, unless otherwise stated.

For example, Takizawa et al, *Reaction Stoichiometry for Combustion of Fluoroethane Blends*, ASHRAE Transactions 112(2) 2006 (which is incorporated herein by reference), shows there exists a near-linear relationship between this ratio and the flame speed of mixtures comprising R-152a, with increasing fluorine ratio resulting in lower flame speeds. The data in this reference teach that the fluorine ratio needs to be greater than about 0.65 for the flame speed to drop to zero, in other words, for the mixture to be non-flammable.

Similarly, Minor et al (Du Pont Patent Application WO2007/053697) provide teaching on the flammability of many hydrofluoroolefins, showing that such compounds could be expected to be non-flammable if the fluorine ratio is greater than about 0.7.

It may be expected on the basis of the art, therefore, that mixtures comprising R-32 (fluorine ratio 0.5), R-152a (fluorine ratio 0.33) and R-1234ze(E) (fluorine ratio 0.67) would be flammable except for limited compositional ranges comprising almost 100% R-1234ze(E), since any amount of R-152a added to the olefin would reduce the fluorine ratio of the mixture below 0.67.

Surprisingly, we have found this not to be the case. In particular, we have found that mixtures comprising R-32, R-152a and R-1234ze(E) having a fluorine ratio of less than 0.7 exist that are non-flammable at 23° C. As shown in the examples hereinafter, certain mixtures of R-32, R-152a and R-1234ze(E) are non-flammable even down to fluorine ratios of about 0.57.

Moreover, again as demonstrated in the examples hereinafter, we have further identified mixtures of R-32, R-152a and R-1234ze(E) having a lower flammable limit in air of 7% v/v or higher (thereby making them safe to use in many applications), and having a fluorine ratio as low as about 0.46. This is especially surprising given that flammable 2,3,3,3-tetrafluoropropene (R-1234yf) has a fluorine ratio of 0.67 and a measured lower flammable limit in air at 23° C. of 6 to 6.5% v/v.

In one embodiment, the compositions of the invention have a fluorine ratio of from about 0.42 to about 0.7, such as from about 0.44 to about 0.67, for example from about 0.57 to about 0.65. For the avoidance of doubt, it is to be understood that the upper and lower values of these fluorine ratio ranges may be interchanged in any way, provided that the resulting ranges fall within the broadest scope of the invention.

By producing low- or non-flammable R-32/R-152a/R-1234ze(E) blends containing unexpectedly low amounts of R-1234ze(E), the amounts of R-32 and/or R-152a in such compositions are increased. This is believed to result in heat transfer compositions exhibiting increased cooling capacity, decreased temperature glide and/or decreased pressure drop, compared to equivalent compositions containing higher amounts (e.g. almost 100%) R-1234ze(E).

Thus, the compositions of the invention exhibit a completely unexpected combination of low-/non-flammability, low GWP and improved refrigeration performance properties. Some of these refrigeration performance properties are explained in more detail below.

Temperature glide, which can be thought of as the difference between bubble point and dew point temperatures of a zeotropic (non-azeotropic) mixture at constant pressure, is a characteristic of a refrigerant; if it is desired to replace a fluid with a mixture then it is often preferable to have similar or reduced glide in the alternative fluid. In an embodiment, the compositions of the invention are zeotropic.

In the evaporator of a vapor-compression cycle the effective temperature glide is less than the difference between dew and bubble point temperatures, since the working fluid enters the evaporator as a two-phase mixture of liquid and vapor intermediate between the bubble and dew points.

Conveniently, the temperature glide (in the evaporator) of the compositions of the invention is less than about 10K, preferably less than about 5K.

Advantageously, the volumetric refrigeration capacity of the compositions of the invention is at least 85% of the existing refrigerant fluid it is replacing, preferably at least 90% or even at least 95%.

The compositions of the invention typically have a volumetric refrigeration capacity that is at least 90% of that of R-1234yf. Preferably, the compositions of the invention have a volumetric refrigeration capacity that is at least 95% of that of R-1234yf, for example from about 95% to about 120% of that of R-1234yf.

In one embodiment, the cycle efficiency (Coefficient of Performance, COP) of the compositions of the invention is within about 5% or even better than the existing refrigerant fluid it is replacing Conveniently, the compressor discharge temperature of the compositions of the invention is within about 15K of the existing refrigerant fluid it is replacing, preferably about 10K or even about 5K.

The compositions of the invention preferably have energy efficiency at least 95% (preferably at least 98%) of R-134a under equivalent conditions, while having reduced or equivalent pressure drop characteristics and cooling capacity at 95% or higher of R-134a values. Advantageously the compositions have higher energy efficiency and lower pressure drop characteristics than R-134a under equivalent conditions. The compositions also advantageously have better energy efficiency and pressure drop characteristics than R-1234yf alone.

The heat transfer compositions of the invention are suitable for use in existing designs of equipment, and are compatible with all classes of lubricant currently used with established HFC refrigerants. They may be optionally stabilized or compatibilized with mineral oils by the use of appropriate additives.

Preferably, when used in heat transfer equipment, the composition of the invention is combined with a lubricant.

Conveniently, the lubricant is selected from the group consisting of mineral oil, silicone oil, polyalkyl benzenes (PABs), polyol esters (POEs), polyalkylene glycols (PACs), polyalkylene glycol esters (PAC esters), polyvinyl ethers (PVEs), poly (alpha-olefins) and combinations thereof.

Advantageously, the lubricant further comprises a stabilizer.

Preferably, the stabilizer is selected from the group consisting of diene-based compounds, phosphates, phenol compounds and epoxides, and mixtures thereof.

Conveniently, the composition of the invention may be combined with a flame retardant.

Advantageously, the flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminum trihydrate, polyvinyl chloride, a fluorinated iodocarbon, a fluorinated bromocarbon, trifluoro iodomethane, perfluoroalkyl amines, bromo-fluoroalkyl amines and mixtures thereof.

Preferably, the heat transfer composition is a refrigerant composition.

In one embodiment, the invention provides a heat transfer device comprising a composition of the invention.

Preferably, the heat transfer device is a refrigeration device.

Conveniently, the heat transfer device is selected from group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems. Preferably, the heat transfer device is a refrigeration device or an air-conditioning system.

Advantageously, the heat transfer device contains a centrifugal-type compressor.

The invention also provides the use of a composition of the invention in a heat transfer device as herein described.

According to a further aspect of the invention, there is provided a blowing agent comprising a composition of the invention.

According to another aspect of the invention, there is provided a foamable composition comprising one or more components capable of forming foam and a composition of the invention.

Preferably, the one or more components capable of forming foam are selected from polyurethanes, thermoplastic polymers and resins, such as polystyrene, and epoxy resins.

According to a further aspect of the invention, there is provided a foam obtainable from the foamable composition of the invention.

Preferably the foam comprises a composition of the invention.

According to another aspect of the invention, there is provided a sprayable composition comprising a material to be sprayed and a propellant comprising a composition of the invention.

According to a further aspect of the invention, there is provided a method for cooling an article which comprises condensing a composition of the invention and thereafter evaporating said composition in the vicinity of the article to be cooled.

According to another aspect of the invention, there is provided a method for heating an article which comprises condensing a composition of the invention in the vicinity of the article to be heated and thereafter evaporating said composition.

According to a further aspect of the invention, there is provided a method for extracting a substance from biomass comprising contacting the biomass with a solvent comprising a composition of the invention, and separating the substance from the solvent.

According to another aspect of the invention, there is provided a method of cleaning an article comprising contacting the article with a solvent comprising a composition of the invention.

According to a further aspect of the invention, there is provided a method for extracting a material from an aqueous solution comprising contacting the aqueous solution with a solvent comprising a composition of the invention, and separating the material from the solvent.

According to another aspect of the invention, there is provided a method for extracting a material from a particulate solid matrix comprising contacting the particulate solid matrix with a solvent comprising a composition of the invention, and separating the material from the solvent.

According to a further aspect of the invention, there is provided a mechanical power generation device containing a composition of the invention.

Preferably, the mechanical power generation device is adapted to use a Rankine Cycle or modification thereof to generate work from heat.

According to another aspect of the invention, there is provided a method of retrofitting a heat transfer device comprising the step of removing an existing heat transfer fluid, and introducing a composition of the invention. Preferably, the heat transfer device is a refrigeration device or (a static) air conditioning system. Advantageously, the method further comprises the step of obtaining an allocation of greenhouse gas (e.g. carbon dioxide) emission credit.

In accordance with the retrofitting method described above, an existing heat transfer fluid can be fully removed from the heat transfer device before introducing a composition of the invention. An existing heat transfer fluid can also be partially removed from a heat transfer device, followed by introducing a composition of the invention.

In another embodiment wherein the existing heat transfer fluid is R-134a, and the composition of the invention contains R134a, R-1234ze(E), R-32, and R-152a (and optional components such as a lubricant, a stabilizer or an additional flame retardant), R-1234ze(E), R-32, and R-152a, etc, can be added to the R-134a in the heat transfer device, thereby forming the compositions of the invention, and the heat transfer device of the invention, in situ. Some of the existing R-134a may be removed from the heat transfer device prior to adding the R-1234ze(E), R-32, R-152a, etc, to facilitate providing the components of the compositions of the invention in the desired proportions.

Thus, the invention provides a method for preparing a composition and/or heat transfer device of the invention comprising introducing R-1234ze(E), R-32, and R-152a, and optional components such as a lubricant, a stabilizer or an additional flame retardant, into a heat transfer device containing an existing heat transfer fluid which is R-134a. Optionally, at least some of the R-134a is removed from the heat transfer device before introducing the R-1234ze(E), R-32, R-152a, etc.

Of course, the compositions of the invention may also be prepared simply by mixing the R-1234ze(E), R-32, R-152a, optionally R-134a (and optional components such as a lubricant, a stabilizer or an additional flame retardant) in the desired proportions. The compositions can then be added to a heat transfer device (or used in any other way as defined herein) that does not contain R-134a or any other existing heat transfer fluid, such as a device from which R-134a or any other existing heat transfer fluid have been removed.

In a further aspect of the invention, there is provided a method for reducing the environmental impact arising from operation of a product comprising an existing compound or composition, the method comprising replacing at least partially the existing compound or composition with a composition of the invention. Preferably, this method comprises the step of obtaining an allocation of greenhouse gas emission credit.

By environmental impact we include the generation and emission of greenhouse warming gases through operation of the product.

As mentioned above, this environmental impact can be considered as including not only those emissions of compounds or compositions having a significant environmental impact from leakage or other losses, but also including the emission of carbon dioxide arising from the energy consumed by the device over its working life. Such environmental impact may be quantified by the measure known as Total Equivalent Warming impact (TEWI). This measure has been used in quantification of the environmental impact of certain stationary refrigeration and air conditioning equipment, including for example supermarket refrigeration systems (see, for example, http://en.wikipedia.org/wiki/Total_equivalent_warming_impact).

The environmental impact may further be considered as including the emissions of greenhouse gases arising from the synthesis and manufacture of the compounds or compositions. In this case the manufacturing emissions are added to the energy consumption and direct loss effects to yield the measure known as Life-Cycle Carbon Production (LCCP, see for example http://www.sae.org/events/aars/pressentations/2007papaaavva.pdf). The use of LCCP is common in assessing environmental impact of automotive air conditioning systems.

Emission credit(s) are awarded for reducing pollutant emissions that contribute to global warming and may, for example, be banked, traded or sold. They are conventionally expressed in the equivalent amount of carbon dioxide. Thus if the emission of 1 kg of R-134a is avoided then an emission credit of 1×1300=1300 kg $CO_2$ equivalent may be awarded.

In another embodiment of the invention, there is provided a method for generating greenhouse gas emission credit(s) comprising (i) replacing an existing compound or composition with a composition of the invention, wherein the composition of the invention has a lower GWP than the existing compound or composition; and (ii) obtaining greenhouse gas emission credit for said replacing step.

In a preferred embodiment, the use of the composition of the invention results in the equipment having a lower Total Equivalent Warming Impact, and/or a lower Life-Cycle Carbon Production than that which would be attained by use of the existing compound or composition.

These methods may be carried out on any suitable product, for example in the fields of air-conditioning, refrigeration (e.g. low and medium temperature refrigeration), heat transfer, blowing agents, aerosols Of sprayable propellants, gaseous dielectrics, cryosurgery, veterinary procedures, dental procedures, fire extinguishing, flame suppression, solvents (e.g. carriers for flavorings and fragrances), cleaners, air horns, pellet guns, topical anesthetics, and expansion applications. Preferably, the field is air-conditioning or refrigeration.

Examples of suitable products include a heat transfer devices, blowing agents, foamable compositions, sprayable compositions, solvents and mechanical power generation devices. In a preferred embodiment, the product is a heat transfer device, such as a refrigeration device or an air-conditioning unit.

The existing compound or composition has an environmental impact as measured by GWP and/or TEWI and/or LCCP that is higher than the composition of the invention which replaces it. The existing compound or composition may comprise a fluorocarbon compound, such as a perfluoro-, hydrofluoro-, chlorofluoro- or hydrochlorofluoro-carbon compound or it may comprise a fluorinated olefin.

Preferably, the existing compound or composition is a heat transfer compound or composition such as a refrigerant. Examples of refrigerants that may be replaced include R-134a, R-152a, R-1234yf, R-410A, R-407A, R-407B, R-407C, R507, R-22 and R-404A. The compositions of the invention are particularly suited as replacements for R-134a, R-152a or R-1234yf.

Any amount of the existing compound or composition may be replaced so as to reduce the environmental impact. This may depend on the environmental impact of the existing compound or composition being replaced and the environmental impact of the replacement composition of the invention. Preferably, the existing compound or composition in the product is fully replaced by the composition of the invention.

The invention is illustrated by the following non-limiting examples.

Examples

Flammability

The flammability of certain compositions of the invention in air at atmospheric pressure and controlled humidity was studied in a test flask apparatus as described by the methodology of ASHRAE standard 34. The test temperature used was 23° C.; the humidity was controlled to be 50% relative to a standard temperature of 77° F. (25° C.). The diluent used was R-1234ze(E), which was found to be non flammable under these test conditions. The fuels used were mixtures of R-32 and R-152a. Three fuel compositions were tested and the molar proportion of R32 to R-152a was varied in each fuel. The three molar ratios of R32 to R-152a used were 1:1; 1:2 and 1:3. The fuel and diluent gases were subjected to vacuum purging of the cylinder to remove dissolved air or other inert gases prior to testing. The results of these tests are shown in FIGS. 1 to 3. In these triangular charts the vertices represent pure fuel, air and diluent. The flammable region was identified by varying the relative proportions of fuel, air and diluent and is plotted as the hatched line in each chart.

Using the above methodology we have found the following compositions to be non-flammable at 23° C. (associated fluorine ratios are also shown).

| Non flammable mixture composition (volumetric basis) | Fluorine ratio R = F/(F + H) | Composition on a weight/weight basis |
|---|---|---|
| R-32 20%, R-152a 20%, R-1234ze(E) 60% | 0.571 | R-32 11% R-152a 14% R-1234ze(E) 75% |
| R-32 11.7%, R-152a 23.3%, R-1234ze(E) 65% | 0.572 | R-32 6% R-152a 16% R-1234ze(E) 78% |
| R-32 8.3%, R-152a 24.8%, R-1234ze(E) 67% | 0.572 | R-32 4% R-152a 17% R-1234ze(E) 79% |
| R-32 10%, R-152a 20%, R-1234ze(E) 70% | 0.586 | R-32 5% R-152a 13% R-1234ze(E) 82% |
| R-32 8%, R-152a 17%, R-1234ze(E) 75% | 0.600 | R-32 4% R-152a 11% R-1234ze(E) 85% |
| R-32 17.5%, R-152a 17.5%, R-1234ze(E) 65% | 0.584 | R-32 10% R-152a 12% R-1234ze(E) 78% |
| R-32 15%, R-152a 15%, R-1234ze(E) 70% | 0.596 | R-32 8% R-152a 10% R-1234ze(E) 82% |
| R-32 10%, R-152a 10%, R-1234ze(E) 80% | 0.621 | R-32 5% R-152a 6% R-1234ze(E) 89% |
| R-32 7.5%, R-152a 22.5%, R-1234ze(E) 70% | 0.581 | R-32 4% R-152a 15% R-1234ze(E) 81% |

It can be seen that non flammable mixtures comprising R-32, R-152a and R-1234ze(E) can be created if the fluorine ratio of the mixture is greater than about 0.57.

We have further identified the following mixtures of R-32, R-152a and R-1234ze(E) having a lower flammable limit in air of 7% v/v.

| Mixture having LFL of 7% v/v (volumetric basis) | Fluorine ratio R = F/(F + H) | Composition on a weight/weight basis |
|---|---|---|
| R-32 47.5%, R-152a 47.5%, R-1234ze(E) 5% | 0.416 | R-32 40%, R-152a 51%, R-1234ze(E) 9% |
| R-32 28%, R-152a 56%, R-1234ze(E) 16% | 0.426 | R-32 21% R-152a 53% R-1234ze(E) 26% |
| R-32 19%, R-152a 57%, R-1234ze(E) 24% | 0.441 | R-32 13% R-152a 50% R-1234ze(E) 37% |

The above table shows that we have found that it is possible to generate mixtures comprising R-32, R-152a and R-1234ze(E) having an LFL of 7% v/v or higher if the fluorine ratio of the mixture is greater than about 0.41. By way of comparison, the lower flammable limit of R-1234yf in air in the same test apparatus and at the same temperature was found to be variously between 6.0 and 6.5% v/v in several repeated tests.

A similar flammability experiment was then carried out in which the fuel used was an equimolar mixture of R-32 and R-152a and the diluent was a mixture of R-134a and R-1234ze(E) in the molar proportions 1:2. The ASTM flammability apparatus was used to determine the flammable region, which is included as FIG. 4.

The minimum proportion of diluent required to ensure that mixtures of fuel+diluent with air are non flammable was found to be about 59% v/v. The non flammable composition of 59% v/v diluent and 41% v/v fuel. corresponds to an overall composition of R-32 20.5%; R-152a 20.5%; R-134a 19.7% and R-1234ze(E) 39.3% (all volumetric). This composition has a fluorine ratio of 0.569, consistent with the findings of the previous experiments for determination of a non-flammable composition.

It was concluded that quaternary mixtures of these fluids could be expected to be non-flammable at 23° C. if the fluorine ratio was greater than 0.57. Furthermore, it was found that any combination of the R-134a/R-1234ze(E) diluent and the R-32/R-152a fuel mix would have a lower flammable limit of at least 7% v/v, corresponding to a fluorine ratio of 0.4 or greater.

A further flammability experiment was carried out in which the fuel used was R-152a and the diluent was R-134a. The ASTM flammability apparatus was used to determine the flammable region, which is included as FIG. 5. This figure shows a completely different shape and unexpectedly broad region of flammability, indicating the unpredictable nature of such flammability tests.

The flammability of certain compositions of the invention in air at atmospheric pressure and controlled humidity was studied in a flame tube test as follows.

The test vessel was an upright glass cylinder having a diameter of 2 inches. The ignition electrodes were placed 60 mm above the bottom of the cylinder. The cylinder was fitted with a pressure-release opening. The apparatus was shielded to restrict any explosion damage. A standing induction spark of 0.5 second duration was used as the ignition source.

The test was performed at 23° C. (see below). A known concentration of fuel in air was introduced into the glass cylinder. A spark was passed through the mixture and it was observed whether or not a flame detached itself from the ignition source and propagated independently. The gas concentration was increased in steps of 1% vol. until ignition occurred (if at all). The results are shown below (all compositions are v/v basis unless otherwise stated).

| Fuel | Temp (° C.) | Humidity | Results |
|---|---|---|---|
| R32/R152a/R1234ze 42/7/51 (about 26/5/69 w/w) | 23 | 50% RH/23° C. | LFL 10% UFL 19% |
| R32/R152a/R1234ze 19/9/72 (about 10/6/84 w/w) | 23 | 50% RH/23° C. | LFL 9% UFL 16% |

Again, the LFL of the tested compositions was found to be considerably higher (i.e. less flammable) than R-1234yf under the same conditions (R1234yf was tested in the same apparatus and found to exhibit lower flammable limit of 6% v/v and upper flammable limit of 15% v/v).

Performance of R-32/R-152a/R-1234ze(E) Blends

The performance of selected ternary compositions of the invention was estimated using a thermodynamic property model in conjunction with an idealised vapour compression cycle. The thermodynamic model used the Peng Robinson equation of state to represent vapour phase properties and vapour-liquid equilibrium of the mixtures, together with a polynomial correlation of the variation of ideal gas enthalpy of each component of the mixtures with temperature. The principles behind use of this equation of state to model thermodynamic properties and vapour liquid equilibrium are explained more fully in *The Properties of Gases and Liquids* ($5^{th}$ edition) by BE Poling, J M Prausnitz and J M O'Connell pub. McGraw Hill 2000, in particular Chapters 4 and 8 (which is incorporated herein by reference).

The basic property data required to use this model. were: critical temperature and critical pressure; vapour pressure and the related property of Pitzer acentric factor; ideal gas enthalpy, and measured vapour liquid equilibrium data for the binary systems R-32/R-152a; R-152a/R-1234ze(E) and R-32/R1234ze(E).

The basic property data (critical properties, acentric factor, vapour pressure and ideal gas enthalpy) for R-32 and R-152a were taken from the NIST REFPROP Version 8.0 software, which is incorporated herein by reference. The critical point and vapour pressure for R-1234ze(E) were measured experimentally. The ideal gas enthalpy for R-1234ze(E) over a range of temperatures was estimated using the molecular modelling software Hyperchem 7.5, which is incorporated herein by reference.

Vapour liquid equilibrium data for the binary mixtures was regressed to the Peng Robinson equation using a binary interaction constant incorporated into van der Waal's mixing rules as follows. For the R-32 with R-152a binary pair, data was taken from Lee et al. J Chem. Eng Data 1999 (44) 190-192 (incorporated herein by reference). Vapour liquid equilibrium data for R-152a with R-1234ze(E) were taken from WO2006/094303 page 69 (incorporated herein by reference) and the interaction constant was fitted to represent the azeotropic composition implied by these data at −25° C. No vapour liquid equilibrium data were available for R-32 with R-1234ze(E) so the interaction constant for this pair was set to zero.

The refrigeration performance of selected ternary compositions of the invention was modelled using the following cycle conditions.

| | |
|---|---|
| Condensing temperature (° C.) | 60 |
| Evaporating temperature (° C.) | 0 |
| Subcool (K) | 5 |
| Superheat (K) | 5 |
| Suction temperature (° C.) | 15 |
| Isentropic efficiency | 65% |
| Clearance ratio | 4% |
| Duty (kW) | 6 |
| Suction line diameter (mm) | 16.2 |

The refrigeration performance data of these compositions are set out in Tables 1 to 10, which are found in the attached Appendix.

The data shows that compositions exhibiting reduced flammability (or non-flammability) when compared to R-1234yf could be prepared having close or superior cooling capacity, significantly enhanced energy efficiency and reduced pressure drop. The energy efficiency gain implied in use of the compositions of the invention as compared to R-1234yf will result in the air conditioning system exhibiting a lower overall total equivalent warming impact (or equivalently lower LCCP) as well as reduced power consumption, even though the direct GWP of the compositions is somewhat higher than for R-1234yf.

In addition it was found that where compositions exhibited equivalent cooling capacity to R-1234yf, the estimated suction line pressure drop was significantly lower than for R-1234yf and close to the values that would be expected if using R-134a. This is significant for automotive air conditioning systems, where the suction gas line represents a significant point of efficiency loss. It is known that R-1234yf requires a larger diameter suction hose in an automotive system than does R-134a, which is inconvenient for layout of the system. The compositions of the invention offer the opportunity to use a smaller suction line size in such systems or alternatively to realise further gains in system energy efficiency if the same line size is used.

Performance of R-32/R-152a/R-1234ze(E)/R134a Blends

The refrigeration performance of selected quaternary compositions of the invention was modelled using the same model and cycle conditions as set out above in relation to the ternary compositions of the invention. The refrigeration performance data of these compositions are set out in tables 11 to 37, which are found in the attached Appendix.

Wholly non-flammable fluids having performance close to R134a are especially desired, the data shows that it is possible to have capacity, COP and pressure drop close to those of R134a whilst achieving significant reduction in GWP (of the order of 50% reduction or more compared to pure R134a) by use of combinations of R-32, R152a, R-134a and R-1234ze (E).

The performance of a composition containing 10% by weight R-32, 5% by weight R-152a and 85% by weight R-1234ze(E) was tested in an automotive air conditioning system suitable for use with R-134a. This composition is denoted by "Blend" in the results shown below.

The test conditions used were as described in SAE Standard J2765, which is incorporated herein by reference. These conditions are summarized below.

Ambient air condition 35° C. and 40% relative humidity (RH)
Air off temperature from evaporator controlled to 3° C.
Compressor displacement variable 0-175cc per stroke
Conventional R-134a expansion valve was replaced with an electronic expansion valve to allow for ease of superheat adjustment
System used without internal heat exchanger and with equivalent superheat at evaporator exit for all fluids The results are shown below, in which I, L, M and H refer to idle, low, medium and high speed, and wherein 35 and 45 refer to the ambient temperature in ° C.

| Test point | Measured cooling capacity (kW) R134a | Blend | Relative to R-134a Blend |
|---|---|---|---|
| I35 | 4.67 | 4.65 | 100% |
| L35 | 5.86 | 5.79 | 99% |
| M35 | 6.43 | 6.18 | 96% |
| H35 | 6.65 | 6.55 | 98% |
| I45 | 3.81 | 3.76 | 99% |
| L45 | 4.76 | 4.75 | 100% |
| M45 | 5.2 | 5.17 | 99% |
| H45 | 5.41 | 5.41 | 100% |

The Blend composition of the invention represents a good match of capacity and efficiency for R-134a in an R-134a air-conditioning system across a range of conditions.

| Measured Energy Efficiency Test point | (expressed as COP) R134a | Blend | COP relative to R-134a Blend |
|---|---|---|---|
| I35 | 2.87 | 2.85 | 99% |
| L35 | 1.98 | 1.98 | 100% |
| M35 | 1.79 | 1.75 | 98% |
| H35 | 1.4 | 1.37 | 98% |
| I45 | 2.3 | 2.32 | 101% |
| L45 | 1.64 | 1.69 | 103% |
| M45 | 1.48 | 1.5 | 101% |
| H45 | 1.18 | 1.19 | 101% |

Miscibility Data

The miscibility of a composition of the invention containing about 10% by weight R-32, about 5% by weight R-152a and about 85% by weight R-1234ze(E) (referred to below as Blend) was tested with the polyalkylene glycol (PAG) lubricants ND8 and YN12. The results of these experiments were compared to the miscibility of pure R-1234yf with the same PACs. The results are shown below.

| Miscibility Results for Blend with 32H | | | | | | |
|---|---|---|---|---|---|---|
| Temp deg | Lubricant Concentration wt % | | | | | |
| C. | 4 | 7 | 10 | 20 | 30 | 50 |
| −20 | miscible | miscible | miscible | miscible | miscible | miscible |
| −10 | miscible | miscible | miscible | miscible | miscible | miscible |
| 0 | miscible | miscible | miscible | miscible | miscible | miscible |
| 10 | miscible | miscible | miscible | miscible | miscible | miscible |
| 20 | miscible | miscible | miscible | miscible | miscible | miscible |
| 30 | miscible | miscible | miscible | miscible | miscible | miscible |
| 40 | miscible | miscible | miscible | miscible | miscible | miscible |
| 50 | miscible | miscible | miscible | miscible | miscible | miscible |
| 60 | miscible | miscible | miscible | miscible | miscible | miscible |
| 70 | miscible | miscible | miscible | miscible | miscible | miscible |
| 80 | miscible | miscible | miscible | miscible | miscible | miscible |

| Miscibility Results for 1234yf with 32H | | | | | | |
|---|---|---|---|---|---|---|
| Temp deg | Lubricant Concentration wt % | | | | | |
| C. | 4 | 7 | 10 | 20 | 30 | 50 |
| −20 | miscible | miscible | miscible | miscible | miscible | miscible |
| −10 | miscible | miscible | miscible | miscible | miscible | miscible |
| 0 | miscible | miscible | miscible | miscible | miscible | miscible |
| 10 | slightly opaque | slightly opaque | miscible | miscible | miscible | miscible |
| 20 | slightly opaque | slightly opaque | miscible | miscible | miscible | miscible |
| 30 | slightly opaque | slightly opaque | miscible | miscible | miscible | miscible |
| 40 | slightly opaque | slightly opaque | miscible | miscible | miscible | miscible |
| 50 | slightly opaque | slightly opaque | miscible | miscible | slightly opaque | slightly opaque |
| 60 | slightly opaque | slightly opaque | miscible | miscible | slightly opaque | slightly opaque |
| 70 | slightly opaque | slightly opaque | miscible | miscible | slightly opaque | slightly opaque |
| 80 | Miscible | slightly opaque | miscible | Opaque 2 layers | Opaque 2 layers | Opaque |

| Miscibility Results for Blend with YN12 | | | | | | |
|---|---|---|---|---|---|---|
| Temp deg C. | Lubricant Concentration wt % | | | | | |
| | 4 | 7 | 10 | 20 | 30 | 50 |
| −20 | Opaque | Opaque | Opaque | Opaque | Opaque | Opaque |
| −10 | Opaque | Opaque | Opaque | Opaque | Opaque | Opaque |
| 0 | Slightly opaque | Slightly opaque | Slightly opaque | Slightly opaque | Slightly opaque | Slightly opaque |
| 10 | Slightly opaque | Slightly opaque | Slightly opaque | Slightly opaque | very Slightly opaque | very Slightly opaque |
| 20 | Slightly opaque | Slightly opaque | Slightly opaque | Slightly opaque | very Slightly opaque | very Slightly opaque |
| 25 | Slightly opaque | Slightly opaque | Slightly opaque | Slightly opaque | very Slightly opaque | very Slightly opaque |
| 30 | Slightly opaque | Slightly opaque | Slightly opaque | Slightly opaque | very Slightly opaque | very Slightly opaque |
| 35 | Slightly opaque | Slightly opaque | Slightly opaque | Slightly opaque | very Slightly opaque | very Slightly opaque |
| 40 | Slightly opaque | Slightly opaque | Slightly opaque | Slightly opaque | very Slightly opaque | very Slightly opaque |
| 45 | Slightly opaque | Slightly opaque | Slightly opaque | Slightly opaque | very Slightly opaque | very Slightly opaque |
| 50 | Miscible | Miscible | Miscible | Miscible | very Slightly opaque | very Slightly opaque |
| 60 | Miscible | Miscible | Miscible | Miscible | very Slightly opaque | very Slightly opaque |
| 70 | Miscible | Miscible | Miscible | opaque 2 layers | very Slightly opaque | very Slightly opaque |
| 80 | 2 layers | 2 layers | 2 layers | 2 layers | 2 layers | very Slightly opaque |

| Miscibility Results for 1234yf with YN12 | | | | | | |
|---|---|---|---|---|---|---|
| Temperature deg C. | Lubricant Concentration wt % | | | | | |
| | 4 | 7 | 10 | 20 | 30 | 50 |
| −20 | opaque | opaque | 2 layers | opaque | 2 layers | 2 layers |
| −10 | slightly opaque | slightly opaque | 2 layers | opaque | 2 layers | 2 layers |
| 0 | slightly opaque | opaque | 2 layers | opaque | opaque | opaque |
| 10 | slightly opaque | opaque | 2 layers opaque | 2 layers opaque | 2 layers opaque | 2 layers opaque |
| 20 | opaque | slightly opaque 2 layers | 2 layers opaque | 2 layers opaque | 2 layers opaque | 2 layers opaque |
| 30 | opaque | opaque | 2 layers opaque | 2 layers | 2 layers opaque | 2 layers opaque |
| 40 | clear 2 layers | clear 2 layers | 2 layers clear | 2 layers | 2 layers clear | 2 layers clear |
| 50 | clear 2 layers | clear 2 layers | 2 layers clear | 2 layers | 2 layers clear | 2 layers clear |
| 60 | clear 2 layers | clear 2 layers | 2 layers clear | 2 layers | 2 layers clear | 2 layers clear |
| 70 | clear 2 layers | clear 2 layers | 2 layers clear | 2 layers | 2 layers clear | 2 layers clear |
| 80 | clear 2 layers | clear 2 layers | 2 layers clear | 2 layers | 2 layers clear | 2 layers clear |

The results show that the compositions of the invention have improved miscibility with lubricants compared to the pure fluid R-1234yf.

In summary, the invention provides new compositions that exhibit a surprising combination of advantageous properties including good refrigeration performance, low flammability, low GWP, and/or miscibility with lubricants compared to existing refrigerants such as R-134a and the proposed refrigerant R-1234yf.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

TABLE 1

| Theoretical Performance Data of Selected R-32/R-152a/R-1234ze(E) Blends Containing 2% R32 | | | | | | | | | | |
|---|---|---|---|---|---|---|---|---|---|---|
| R32 | | | 2 | 2 | 2 | 2 | 2 | 2 | 2 | 2 | 2 |
| R152a | | | 5 | 10 | 15 | 20 | 25 | 30 | 35 | 40 | 45 |
| R1234ze(E) | | | 93 | 88 | 83 | 78 | 73 | 68 | 63 | 58 | 53 |
| Calculation results | Comparative data | | 2/5/ | 2/10/ | 2/15/ | 2/20/ | 2/25/ | 2/30/ | 2/35/ | 2/40/ | 2/45/ |
| | 134a | R1234yf | 93 | 88 | 83 | 78 | 73 | 68 | 63 | 58 | 53 |
| Pressure ratio | 5.79 | 5.24 | 5.76 | 5.73 | 5.71 | 5.69 | 5.67 | 5.65 | 5.64 | 5.63 | 5.63 |
| Volumetric efficiency | 83.6% | 84.7% | 83.0% | 83.2% | 83.5% | 83.7% | 83.9% | 84.1% | 84.3% | 84.5% | 84.6% |
| Condenser glide (K) | 0.0 | 0.0 | 1.8 | 1.8 | 1.7 | 1.6 | 1.5 | 1.4 | 1.3 | 1.1 | 1.0 |
| Evaporator glide (K) | 0.0 | 0.0 | 0.8 | 0.9 | 0.9 | 0.9 | 0.8 | 0.8 | 0.7 | 0.6 | 0.5 |

TABLE 1-continued

Theoretical Performance Data of Selected R-32/R-152a/R-1234ze(E) Blends Containing 2% R32

| | | | | | | | | | | |
|---|---|---|---|---|---|---|---|---|---|---|
| Evaporator inlet T (° C.) | 0.0 | 0.0 | −0.4 | −0.5 | −0.5 | −0.4 | −0.4 | −0.4 | −0.3 | −0.3 | −0.3 |
| Condenser exit T (° C.) | 55.0 | 55.0 | 54.1 | 54.1 | 54.1 | 54.2 | 54.2 | 54.3 | 54.4 | 54.4 | 54.5 |
| Condenser P (bar) | 16.88 | 16.46 | 13.45 | 13.79 | 14.09 | 14.35 | 14.58 | 14.78 | 14.95 | 15.10 | 15.22 |
| Evaporator P (bar) | 2.92 | 3.14 | 2.33 | 2.40 | 2.47 | 2.52 | 2.57 | 2.62 | 2.65 | 2.68 | 2.70 |
| Refrigeration effect (kJ/kg) | 123.76 | 94.99 | 116.5 | 120.9 | 125.4 | 129.9 | 134.6 | 139.4 | 144.3 | 149.3 | 154.4 |
| COP | 2.03 | 1.91 | 2.03 | 2.04 | 2.05 | 2.06 | 2.06 | 2.07 | 2.08 | 2.09 | 2.10 |
| Discharge T (° C.) | 99.15 | 92.88 | 90.5 | 92.1 | 93.7 | 95.2 | 96.7 | 98.2 | 99.7 | 101.2 | 102.7 |
| Mass flow rate (kg/hr) | 174.53 | 227.39 | 185.4 | 178.6 | 172.3 | 166.2 | 160.5 | 155.0 | 149.7 | 144.7 | 139.9 |
| Volumetric flow rate (m3/hr) | 13.16 | 14.03 | 16.7 | 16.1 | 15.6 | 15.2 | 14.8 | 14.5 | 14.3 | 14.0 | 13.8 |
| Volumetric capacity (m3/hr) | 1641 | 1540 | 1297 | 1342 | 1383 | 1421 | 1456 | 1487 | 1516 | 1541 | 1564 |
| Pressure drop (kPa/m) | 953 | 1239 | 1262 | 1186 | 1120 | 1061 | 1009 | 962 | 920 | 882 | 847 |
| GWP (TAR basis) | | | 23 | 28 | 34 | 40 | 45 | 51 | 57 | 62 | 68 |
| Fluorine ratio R = F/(F + H) | | | 0.634 | 0.609 | 0.585 | 0.563 | 0.542 | 0.522 | 0.503 | 0.486 | 0.469 |
| Capacity relative to 1234yf | 106.6% | 100.0% | 84.2% | 87.1% | 89.8% | 92.3% | 94.5% | 96.6% | 98.4% | 100.1% | 101.6% |
| Relative COP | 106.0% | 100.0% | 106.1% | 106.6% | 107.1% | 107.5% | 107.9% | 108.4% | 108.8% | 109.2% | 109.6% |
| Relative pressure drop | 76.9% | 100.0% | 101.9% | 95.8% | 90.4% | 85.7% | 81.4% | 77.7% | 74.3% | 71.2% | 68.4% |

TABLE 2

Theoretical Performance Data of Selected R-32/R-152a/R-1234ze(E) Blends Containing 4% R32

| | | | | | | | | | | |
|---|---|---|---|---|---|---|---|---|---|---|
| R32 | | | 4 | 4 | 4 | 4 | 4 | 4 | 4 | 4 | 4 |
| R152a | | | 5 | 10 | 15 | 20 | 25 | 30 | 35 | 40 | 45 |
| R1234ze(E) | | | 91 | 86 | 81 | 76 | 71 | 66 | 61 | 56 | 51 |

| Calculation results | Comparative data | | 4/5/ | 4/10/ | 4/15/ | 4/20/ | 4/25/ | 4/30/ | 4/35/ | 4/40/ | 4/45/ |
|---|---|---|---|---|---|---|---|---|---|---|
| | 134a | R1234yf | 91 | 86 | 81 | 76 | 71 | 66 | 61 | 56 | 51 |
| Pressure ratio | 5.79 | 5.24 | 5.79 | 5.75 | 5.72 | 5.70 | 5.68 | 5.66 | 5.65 | 5.64 | 5.64 |
| Volumetric efficiency | 83.6% | 84.7% | 83.0% | 83.3% | 83.5% | 83.8% | 84.0% | 84.2% | 84.4% | 84.6% | 84.7% |
| Condenser glide (K) | 0.0 | 0.0 | 3.0 | 2.9 | 2.8 | 2.6 | 2.4 | 2.2 | 2.0 | 1.9 | 1.7 |
| Evaporator glide (K) | 0.0 | 0.0 | 1.4 | 1.5 | 1.5 | 1.4 | 1.3 | 1.2 | 1.1 | 1.0 | 0.9 |
| Evaporator inlet T (° C.) | 0.0 | 0.0 | −0.7 | −0.7 | −0.7 | −0.7 | −0.7 | −0.6 | −0.5 | −0.5 | −0.5 |
| Condenser exit T (° C.) | 55.0 | 55.0 | 53.5 | 53.5 | 53.6 | 53.7 | 53.8 | 53.9 | 54.0 | 54.1 | 54.1 |
| Condenser P (bar) | 16.88 | 16.46 | 14.10 | 14.42 | 14.70 | 14.94 | 15.15 | 15.33 | 15.48 | 15.61 | 15.71 |
| Evaporator P (bar) | 2.92 | 3.14 | 2.44 | 2.51 | 2.57 | 2.62 | 2.67 | 2.71 | 2.74 | 2.77 | 2.79 |
| Refrigeration effect (kJ/kg) | 123.76 | 94.99 | 119.7 | 124.1 | 128.5 | 133.0 | 137.7 | 142.4 | 147.3 | 152.3 | 157.5 |
| COP | 2.03 | 1.91 | 2.03 | 2.04 | 2.05 | 2.06 | 2.07 | 2.07 | 2.08 | 2.09 | 2.10 |
| Discharge T (° C.) | 99.15 | 92.88 | 92.5 | 94.0 | 95.6 | 97.0 | 98.5 | 100.0 | 101.5 | 102.9 | 104.4 |
| Mass flow rate (kg/hr) | 174.53 | 227.39 | 180.4 | 174.1 | 168.1 | 162.4 | 156.9 | 151.6 | 146.6 | 141.8 | 137.1 |

TABLE 2-continued

Theoretical Performance Data of Selected R-32/R-152a/R-1234ze(E) Blends Containing 4% R32

| | | | | | | | | | | |
|---|---|---|---|---|---|---|---|---|---|---|
| Volumetric flow rate (m3/hr) | 13.16 | 14.03 | 15.8 | 15.4 | 14.9 | 14.6 | 14.3 | 14.0 | 13.7 | 13.5 | 13.3 |
| Volumetric capacity (m3/hr) | 1641 | 1540 | 1363 | 1407 | 1446 | 1483 | 1516 | 1546 | 1573 | 1597 | 1619 |
| Pressure drop (kPa/m) | 953 | 1239 | 1177 | 1110 | 1052 | 999 | 953 | 911 | 873 | 838 | 806 |
| GWP (TAR basis) | | | 33 | 39 | 45 | 51 | 56 | 62 | 68 | 73 | 79 |
| Fluorine ratio R = F/(F + H) | | | 0.630 | 0.605 | 0.581 | 0.559 | 0.539 | 0.519 | 0.501 | 0.483 | 0.467 |
| Capacity relative to 1234yf | 106.6% | 100.0% | 88.5% | 91.3% | 93.9% | 96.3% | 98.4% | 100.4% | 102.2% | 103.7% | 105.2% |
| Relative COP | 106.0% | 100.0% | 106.4% | 106.8% | 107.2% | 107.7% | 108.1% | 108.5% | 108.9% | 109.3% | 109.7% |
| Relative pressure drop | 76.9% | 100.0% | 95.0% | 89.6% | 84.9% | 80.7% | 76.9% | 73.5% | 70.4% | 67.6% | 65.1% |

TABLE 3

Theoretical Performance Data of Selected R-32/R-152a/R-1234ze(E) Blends Containing 5% R32

| | | | | | | | | | | |
|---|---|---|---|---|---|---|---|---|---|---|
| R32 | | | 5 | 5 | 5 | 5 | 5 | 5 | 5 | 5 | 5 |
| R152a | | | 5 | 10 | 15 | 20 | 25 | 30 | 35 | 40 | 45 |
| R1234ze(E) | | | 90 | 85 | 80 | 75 | 70 | 65 | 60 | 55 | 50 |
| Calculation results | Comparative data 134a | R1234yf | 5/5/90 | 5/10/85 | 5/15/80 | 5/20/75 | 5/25/70 | 5/30/65 | 5/35/60 | 5/40/55 | 5/45/50 |
| Pressure ratio | 5.79 | 5.24 | 5.79 | 5.76 | 5.73 | 5.70 | 5.68 | 5.66 | 5.65 | 5.64 | 5.64 |
| Volumetric efficiency | 83.6% | 84.7% | 83.0% | 83.3% | 83.6% | 83.8% | 84.1% | 84.3% | 84.4% | 84.6% | 84.8% |
| Condenser glide (K) | 0.0 | 0.0 | 3.6 | 3.4 | 3.2 | 3.0 | 2.8 | 2.6 | 2.4 | 2.2 | 2.1 |
| Evaporator glide (K) | 0.0 | 0.0 | 1.7 | 1.8 | 1.7 | 1.6 | 1.5 | 1.4 | 1.3 | 1.2 | 1.1 |
| Evaporator inlet T (° C.) | 0.0 | 0.0 | −0.9 | −0.9 | −0.9 | −0.8 | −0.8 | −0.7 | −0.6 | −0.6 | −0.6 |
| Condenser exit T (° C.) | 55.0 | 55.0 | 53.2 | 53.3 | 53.4 | 53.5 | 53.6 | 53.7 | 53.8 | 53.9 | 54.0 |
| Condenser P (bar) | 16.88 | 16.46 | 14.43 | 14.73 | 15.00 | 15.23 | 15.43 | 15.60 | 15.75 | 15.87 | 15.96 |
| Evaporator P (bar) | 2.92 | 3.14 | 2.49 | 2.56 | 2.62 | 2.67 | 2.72 | 2.76 | 2.79 | 2.81 | 2.83 |
| Refrigeration effect (kJ/kg) | 123.76 | 94.99 | 121.3 | 125.6 | 130.0 | 134.5 | 139.2 | 143.9 | 148.8 | 153.9 | 159.0 |
| COP | 2.03 | 1.91 | 2.04 | 2.04 | 2.05 | 2.06 | 2.07 | 2.07 | 2.08 | 2.09 | 2.10 |
| Discharge T (° C.) | 99.15 | 92.88 | 93.5 | 95.0 | 96.5 | 97.9 | 99.4 | 100.9 | 102.3 | 103.8 | 105.2 |
| Mass flow rate (kg/hr) | 174.53 | 227.39 | 178.1 | 171.9 | 166.1 | 160.5 | 155.2 | 150.1 | 145.1 | 140.4 | 135.8 |
| Volumetric flow rate (m3/hr) | 13.16 | 14.03 | 15.5 | 15.0 | 14.6 | 14.3 | 14.0 | 13.7 | 13.5 | 13.3 | 13.1 |
| Volumetric capacity (m3/hr) | 1641 | 1540 | 1396 | 1439 | 1478 | 1514 | 1546 | 1575 | 1602 | 1625 | 1646 |
| Pressure drop (kPa/m) | 953 | 1239 | 1137 | 1075 | 1020 | 971 | 927 | 887 | 851 | 818 | 787 |
| GWP (TAR basis) | | | 39 | 45 | 50 | 56 | 62 | 67 | 73 | 79 | 85 |
| Fluorine ratio R = F/(F + H) | | | 0.628 | 0.603 | 0.580 | 0.558 | 0.537 | 0.518 | 0.499 | 0.482 | 0.466 |
| Capacity relative to 1234yf | 106.6% | 100.0% | 90.7% | 93.4% | 96.0% | 98.3% | 100.4% | 102.3% | 104.0% | 105.6% | 106.9% |

TABLE 3-continued

Theoretical Performance Data of Selected R-32/R-152a/R-1234ze(E) Blends Containing 5% R32

| Relative COP | 106.0% | 100.0% | 106.5% | 106.9% | 107.3% | 107.7% | 108.1% | 108.5% | 108.9% | 109.3% | 109.7% |
| Relative pressure drop | 76.9% | 100.0% | 91.8% | 86.8% | 82.3% | 78.4% | 74.8% | 71.6% | 68.7% | 66.0% | 63.5% |

TABLE 4

Theoretical Performance Data of Selected R-32/R-152a/R-1234ze(E) Blends Containing 6% R32

| | | | | | | | | | | | |
|---|---|---|---|---|---|---|---|---|---|---|---|
| R32 | | | 6 | 6 | 6 | 6 | 6 | 6 | 6 | 6 | 6 |
| R152a | | | 5 | 10 | 15 | 20 | 25 | 30 | 35 | 40 | 45 |
| R1234ze(E) | | | 89 | 84 | 79 | 74 | 69 | 64 | 59 | 54 | 49 |
| Calculation results | Comparative data 134a | R1234yf | 6/5/ 89 | 6/10/ 84 | 6/15/ 79 | 6/20/ 74 | 6/25/ 69 | 6/30/ 64 | 6/35/ 59 | 6/40/ 54 | 6/45/ 49 |
| Pressure ratio | 5.79 | 5.24 | 5.80 | 5.76 | 5.73 | 5.70 | 5.68 | 5.66 | 5.65 | 5.64 | 5.64 |
| Volumetric efficiency | 83.6% | 84.7% | 83.1% | 83.4% | 83.6% | 83.9% | 84.1% | 84.3% | 84.5% | 84.7% | 84.8% |
| Condenser glide (K) | 0.0 | 0.0 | 4.1 | 3.9 | 3.6 | 3.4 | 3.2 | 2.9 | 2.7 | 2.5 | 2.4 |
| Evaporator glide (K) | 0.0 | 0.0 | 2.0 | 2.0 | 2.0 | 1.9 | 1.7 | 1.6 | 1.5 | 1.4 | 1.3 |
| Evaporator inlet T (° C.) | 0.0 | 0.0 | −1.0 | −1.0 | −1.0 | −0.9 | −0.9 | −0.8 | −0.7 | −0.7 | −0.6 |
| Condenser exit T (° C.) | 55.0 | 55.0 | 52.9 | 53.1 | 53.2 | 53.3 | 53.4 | 53.5 | 53.6 | 53.7 | 53.8 |
| Condenser P (bar) | 16.88 | 16.46 | 14.75 | 15.04 | 15.30 | 15.52 | 15.71 | 15.87 | 16.01 | 16.12 | 16.21 |
| Evaporator P (bar) | 2.92 | 3.14 | 2.54 | 2.61 | 2.67 | 2.72 | 2.77 | 2.80 | 2.83 | 2.86 | 2.87 |
| Refrigeration effect (kJ/kg) | 123.76 | 94.99 | 122.8 | 127.1 | 131.5 | 136.0 | 140.7 | 145.4 | 150.3 | 155.4 | 160.5 |
| COP | 2.03 | 1.91 | 2.04 | 2.05 | 2.05 | 2.06 | 2.07 | 2.08 | 2.08 | 2.09 | 2.10 |
| Discharge T (° C.) | 99.15 | 92.88 | 94.4 | 95.9 | 97.4 | 98.8 | 100.3 | 101.7 | 103.2 | 104.6 | 106.1 |
| Mass flow rate (kg/hr) | 174.53 | 227.39 | 175.8 | 169.9 | 164.2 | 158.8 | 153.6 | 148.5 | 143.7 | 139.0 | 134.6 |
| Volumetric flow rate (m3/hr) | 13.16 | 14.03 | 15.1 | 14.7 | 14.3 | 14.0 | 13.7 | 13.5 | 13.3 | 13.1 | 12.9 |
| Volumetric capacity (m3/hr) | 1641 | 1540 | 1429 | 1471 | 1510 | 1544 | 1576 | 1604 | 1630 | 1653 | 1673 |
| Pressure drop (kPa/m) | 953 | 1239 | 1101 | 1042 | 990 | 944 | 902 | 864 | 829 | 798 | 769 |
| GWP (TAR basis) | | | 44 | 50 | 56 | 61 | 67 | 73 | 79 | 84 | 90 |
| Fluorine ratio R = F/(F + H) | | | 0.626 | 0.601 | 0.578 | 0.556 | 0.536 | 0.516 | 0.498 | 0.481 | 0.465 |
| Capacity relative to 1234yf | 106.6% | 100.0% | 92.8% | 95.6% | 98.0% | 100.3% | 102.4% | 104.2% | 105.9% | 107.4% | 108.7% |
| Relative COP | 106.0% | 100.0% | 106.6% | 107.0% | 107.4% | 107.8% | 108.2% | 108.6% | 108.9% | 109.3% | 109.7% |
| Relative pressure drop | 76.9% | 100.0% | 88.8% | 84.1% | 79.9% | 76.2% | 72.8% | 69.7% | 66.9% | 64.4% | 62.1% |

TABLE 5

Theoretical Performance Data of Selected R-32/R-152a/R-1234ze(E) Blends Containing 7% R32

| | | | | | | | | | | | |
|---|---|---|---|---|---|---|---|---|---|---|---|
| R32 | | | 7 | 7 | 7 | 7 | 7 | 7 | 7 | 7 | 7 |
| R152a | | | 5 | 10 | 15 | 20 | 25 | 30 | 35 | 40 | 45 |
| R1234ze(E) | | | 88 | 83 | 78 | 73 | 68 | 63 | 58 | 53 | 48 |
| Calculation | Comparative data | | 7/5/ | 7/10/ | 7/15/ | 7/20/ | 7/25/ | 7/30/ | 7/35/ | 7/40/ | 7/45/ |
| results | 134a | R1234yf | 88 | 83 | 78 | 73 | 68 | 63 | 58 | 53 | 48 |
| Pressure ratio | 5.79 | 5.24 | 5.80 | 5.76 | 5.73 | 5.70 | 5.68 | 5.66 | 5.65 | 5.64 | 5.64 |
| Volumetric efficiency | 83.6% | 84.7% | 83.1% | 83.4% | 83.7% | 83.9% | 84.2% | 84.4% | 84.5% | 84.7% | 84.9% |
| Condenser glide (K) | 0.0 | 0.0 | 4.6 | 4.3 | 4.0 | 3.8 | 3.5 | 3.3 | 3.0 | 2.8 | 2.7 |
| Evaporator glide (K) | 0.0 | 0.0 | 2.3 | 2.3 | 2.2 | 2.1 | 2.0 | 1.8 | 1.7 | 1.6 | 1.5 |
| Evaporator inlet T (° C.) | 0.0 | 0.0 | −1.2 | −1.1 | −1.1 | −1.0 | −1.0 | −0.9 | −0.8 | −0.8 | −0.7 |
| Condenser exit T (° C.) | 55.0 | 55.0 | 52.7 | 52.8 | 53.0 | 53.1 | 53.3 | 53.4 | 53.5 | 53.6 | 53.7 |
| Condenser P (bar) | 16.88 | 16.46 | 15.06 | 15.35 | 15.59 | 15.80 | 15.99 | 16.14 | 16.27 | 16.37 | 16.45 |
| Evaporator P (bar) | 2.92 | 3.14 | 2.60 | 2.66 | 2.72 | 2.77 | 2.82 | 2.85 | 2.88 | 2.90 | 2.92 |
| Refrigeration effect (kJ/kg) | 123.76 | 94.99 | 124.3 | 128.6 | 133.0 | 137.5 | 142.1 | 146.9 | 151.8 | 156.8 | 162.0 |
| COP | 2.03 | 1.91 | 2.04 | 2.05 | 2.05 | 2.06 | 2.07 | 2.08 | 2.08 | 2.09 | 2.10 |
| Discharge T (° C.) | 99.15 | 92.88 | 95.3 | 96.8 | 98.2 | 99.7 | 101.1 | 102.6 | 104.0 | 105.4 | 106.9 |
| Mass flow rate (kg/hr) | 174.53 | 227.39 | 173.7 | 167.9 | 162.4 | 157.1 | 152.0 | 147.1 | 142.3 | 137.7 | 133.3 |
| Volumetric flow rate (m3/hr) | 13.16 | 14.03 | 14.8 | 14.4 | 14.0 | 13.7 | 13.4 | 13.2 | 13.0 | 12.8 | 12.7 |
| Volumetric capacity (m3/hr) | 1641 | 1540 | 1463 | 1504 | 1541 | 1575 | 1606 | 1634 | 1659 | 1681 | 1701 |
| Pressure drop (kPa/m) | 953 | 1239 | 1066 | 1011 | 962 | 918 | 878 | 842 | 809 | 779 | 752 |
| GWP (TAR basis) | | | 50 | 55 | 61 | 67 | 73 | 78 | 84 | 90 | 95 |
| Fluorine ratio R = F/(F + H) | | | 0.624 | 0.599 | 0.576 | 0.554 | 0.534 | 0.515 | 0.497 | 0.480 | 0.464 |
| Capacity relative to 1234yf | 106.6% | 100.0% | 95.0% | 97.7% | 100.1% | 102.3% | 104.3% | 106.1% | 107.7% | 109.2% | 110.5% |
| Relative COP | 106.0% | 100.0% | 106.7% | 107.1% | 107.5% | 107.8% | 108.2% | 108.6% | 109.0% | 109.4% | 109.8% |
| Relative pressure drop | 76.9% | 100.0% | 86.0% | 81.6% | 77.6% | 74.1% | 70.9% | 68.0% | 65.3% | 62.9% | 60.7% |

TABLE 6

Theoretical Performance Data of Selected R-32/R-152a/R-1234ze(E) Blends Containing 8% R32

| | | | | | | | | | | | |
|---|---|---|---|---|---|---|---|---|---|---|---|
| R32 | | | 8 | 8 | 8 | 8 | 8 | 8 | 8 | 8 | 8 |
| R152a | | | 5 | 10 | 15 | 20 | 25 | 30 | 35 | 40 | 45 |
| R1234ze(E) | | | 87 | 82 | 77 | 72 | 67 | 62 | 57 | 52 | 47 |
| Calculation | Comparative data | | 8/5/ | 8/10/ | 8/15/ | 8/20/ | 8/25/ | 8/30/ | 8/35/ | 8/40/ | 8/45/ |
| results | 134a | R1234yf | 87 | 82 | 77 | 72 | 67 | 62 | 57 | 52 | 47 |
| Pressure ratio | 5.79 | 5.24 | 5.80 | 5.76 | 5.73 | 5.70 | 5.68 | 5.66 | 5.65 | 5.64 | 5.64 |
| Volumetric efficiency | 83.6% | 84.7% | 83.2% | 83.5% | 83.8% | 84.0% | 84.2% | 84.4% | 84.6% | 84.8% | 84.9% |
| Condenser glide (K) | 0.0 | 0.0 | 5.0 | 4.7 | 4.4 | 4.1 | 3.8 | 3.6 | 3.3 | 3.1 | 3.0 |
| Evaporator glide (K) | 0.0 | 0.0 | 2.6 | 2.5 | 2.4 | 2.3 | 2.2 | 2.0 | 1.9 | 1.8 | 1.7 |

TABLE 6-continued

Theoretical Performance Data of Selected R-32/R-152a/R-1234ze(E) Blends Containing 8% R32

| | | | | | | | | | | | |
|---|---|---|---|---|---|---|---|---|---|---|---|
| Evaporator inlet T (° C.) | 0.0 | 0.0 | −1.3 | −1.3 | −1.2 | −1.2 | −1.1 | −1.0 | −0.9 | −0.9 | −0.8 |
| Condenser exit T (° C.) | 55.0 | 55.0 | 52.5 | 52.6 | 52.8 | 53.0 | 53.1 | 53.2 | 53.3 | 53.4 | 53.5 |
| Condenser P (bar) | 16.88 | 16.46 | 15.38 | 15.65 | 15.89 | 16.09 | 16.26 | 16.41 | 16.53 | 16.62 | 16.70 |
| Evaporator P (bar) | 2.92 | 3.14 | 2.65 | 2.72 | 2.77 | 2.82 | 2.86 | 2.90 | 2.93 | 2.95 | 2.96 |
| Refrigeration effect (kJ/kg) | 123.76 | 94.99 | 125.8 | 130.1 | 134.4 | 138.9 | 143.6 | 148.3 | 153.2 | 158.3 | 163.5 |
| COP | 2.03 | 1.91 | 2.04 | 2.05 | 2.06 | 2.06 | 2.07 | 2.08 | 2.08 | 2.09 | 2.10 |
| Discharge T (° C.) | 99.15 | 92.88 | 96.2 | 97.7 | 99.1 | 100.5 | 102.0 | 103.4 | 104.8 | 106.3 | 107.7 |
| Mass flow rate (kg/hr) | 174.53 | 227.39 | 171.7 | 166.1 | 160.7 | 155.5 | 150.5 | 145.6 | 141.0 | 136.4 | 132.1 |
| Volumetric flow rate (m3/hr) | 13.16 | 14.03 | 14.4 | 14.1 | 13.7 | 13.4 | 13.2 | 13.0 | 12.8 | 12.6 | 12.5 |
| Volumetric capacity (m3/hr) | 1641 | 1540 | 1496 | 1536 | 1573 | 1606 | 1636 | 1663 | 1687 | 1709 | 1728 |
| Pressure drop (kPa/m) | 953 | 1239 | 1033 | 981 | 935 | 893 | 855 | 821 | 790 | 761 | 735 |
| GWP (TAR basis) | | | 55 | 61 | 67 | 72 | 78 | 84 | 89 | 95 | 101 |
| Fluorine ratio R = F/(F + H) | | | 0.622 | 0.597 | 0.574 | 0.553 | 0.533 | 0.514 | 0.496 | 0.479 | 0.462 |
| Capacity relative to 1234yf | 106.6% | 100.0% | 97.1% | 99.8% | 102.1% | 104.3% | 106.3% | 108.0% | 109.6% | 111.0% | 112.2% |
| Relative COP | 106.0% | 100.0% | 106.8% | 107.1% | 107.5% | 107.9% | 108.2% | 108.6% | 109.0% | 109.4% | 109.8% |
| Relative pressure drop | 76.9% | 100.0% | 83.4% | 79.2% | 75.4% | 72.1% | 69.0% | 66.3% | 63.7% | 61.4% | 59.3% |

TABLE 7

Theoretical Performance Data of Selected R-32/R-152a/R-1234ze(E) Blends Containing 9% R32

| | | | | | | | | | | |
|---|---|---|---|---|---|---|---|---|---|---|
| R32 | | | 9 | 9 | 9 | 9 | 9 | 9 | 9 | 9 | 9 |
| R152a | | | 5 | 10 | 15 | 20 | 25 | 30 | 35 | 40 | 45 |
| R1234ze(E) | | | 86 | 81 | 76 | 71 | 66 | 61 | 56 | 51 | 46 |

| Calculation results | Comparative data | | 9/5/ | 9/10/ | 9/15/ | 9/20/ | 9/25/ | 9/30/ | 9/35/ | 9/40/ | 9/45/ |
|---|---|---|---|---|---|---|---|---|---|---|
| | 134a | R1234yf | 86 | 81 | 76 | 71 | 66 | 61 | 56 | 51 | 46 |
| Pressure ratio | 5.79 | 5.24 | 5.80 | 5.76 | 5.73 | 5.70 | 5.68 | 5.66 | 5.65 | 5.64 | 5.64 |
| Volumetric efficiency | 83.6% | 84.7% | 83.3% | 83.6% | 83.8% | 84.1% | 84.3% | 84.5% | 84.7% | 84.8% | 85.0% |
| Condenser glide (K) | 0.0 | 0.0 | 5.4 | 5.1 | 4.7 | 4.4 | 4.1 | 3.8 | 3.6 | 3.4 | 3.2 |
| Evaporator glide (K) | 0.0 | 0.0 | 2.9 | 2.8 | 2.7 | 2.5 | 2.4 | 2.2 | 2.1 | 1.9 | 1.8 |
| Evaporator inlet T (° C.) | 0.0 | 0.0 | −1.4 | −1.4 | −1.3 | −1.3 | −1.2 | −1.1 | −1.0 | −1.0 | −0.9 |
| Condenser exit T (° C.) | 55.0 | 55.0 | 52.3 | 52.5 | 52.6 | 52.8 | 52.9 | 53.1 | 53.2 | 53.3 | 53.4 |
| Condenser P (bar) | 16.88 | 16.46 | 15.69 | 15.95 | 16.18 | 16.37 | 16.54 | 16.67 | 16.78 | 16.87 | 16.94 |
| Evaporator P (bar) | 2.92 | 3.14 | 2.71 | 2.77 | 2.83 | 2.87 | 2.91 | 2.95 | 2.97 | 2.99 | 3.00 |
| Refrigeration effect (kJ/kg) | 123.76 | 94.99 | 127.3 | 131.5 | 135.9 | 140.4 | 145.0 | 149.8 | 154.7 | 159.8 | 165.0 |
| COP | 2.03 | 1.91 | 2.04 | 2.05 | 2.06 | 2.06 | 2.07 | 2.08 | 2.08 | 2.09 | 2.10 |
| Discharge T (° C.) | 99.15 | 92.88 | 97.1 | 98.6 | 100.0 | 101.4 | 102.8 | 104.2 | 105.6 | 107.1 | 108.5 |
| Mass flow rate (kg/hr) | 174.53 | 227.39 | 169.7 | 164.3 | 159.0 | 153.9 | 149.0 | 144.2 | 139.6 | 135.2 | 130.9 |

TABLE 7-continued

Theoretical Performance Data of Selected R-32/R-152a/R-1234ze(E) Blends Containing 9% R32

| | | | | | | | | | | | |
|---|---|---|---|---|---|---|---|---|---|---|---|
| Volumetric flow rate (m3/hr) | 13.16 | 14.03 | 14.1 | 13.8 | 13.5 | 13.2 | 13.0 | 12.8 | 12.6 | 12.4 | 12.3 |
| Volumetric capacity (m3/hr) | 1641 | 1540 | 1529 | 1569 | 1604 | 1637 | 1666 | 1692 | 1716 | 1737 | 1755 |
| Pressure drop (kPa/m) | 953 | 1239 | 1002 | 953 | 909 | 870 | 834 | 801 | 771 | 744 | 719 |
| GWP (TAR basis) | | | 61 | 66 | 72 | 78 | 83 | 89 | 95 | 101 | 106 |
| Fluorine ratio R = F/(F + H) | | | 0.620 | 0.595 | 0.573 | 0.551 | 0.531 | 0.512 | 0.494 | 0.477 | 0.461 |
| Capacity relative to 1234yf | 106.6% | 100.0% | 99.3% | 101.9% | 104.2% | 106.3% | 108.2% | 109.9% | 111.4% | 112.8% | 114.0% |
| Relative COP | 106.0% | 100.0% | 106.9% | 107.2% | 107.6% | 107.9% | 108.3% | 108.6% | 109.0% | 109.4% | 109.8% |
| Relative pressure drop | 76.9% | 100.0% | 80.9% | 76.9% | 73.4% | 70.2% | 67.3% | 64.7% | 62.2% | 60.0% | 58.0% |

TABLE 8

Theoretical Performance Data of Selected R-32/R-152a/R-1234ze(E) Blends Containing 10% R32

| | | | | | | | | | | |
|---|---|---|---|---|---|---|---|---|---|---|
| R32 | | | 10 | 10 | 10 | 10 | 10 | 10 | 10 | 10 | 10 |
| R152a | | | 5 | 10 | 15 | 20 | 25 | 30 | 35 | 40 | 45 |
| R1234ze(E) | | | 85 | 80 | 75 | 70 | 65 | 60 | 55 | 50 | 45 |
| Calculation results | Comparative data 134a | R1234yf | 10/5/ 85 | 10/10/ 80 | 10/15/ 75 | 10/20/ 70 | 10/25/ 65 | 10/30/ 60 | 10/35/ 55 | 10/40/ 50 | 10/45/ 45 |
| Pressure ratio | 5.79 | 5.24 | 5.80 | 5.76 | 5.72 | 5.69 | 5.67 | 5.66 | 5.65 | 5.64 | 5.64 |
| Volumetric efficiency | 83.6% | 84.7% | 83.3% | 83.6% | 83.9% | 84.1% | 84.4% | 84.6% | 84.7% | 84.9% | 85.0% |
| Condenser glide (K) | 0.0 | 0.0 | 5.8 | 5.4 | 5.0 | 4.7 | 4.4 | 4.1 | 3.8 | 3.6 | 3.4 |
| Evaporator glide (K) | 0.0 | 0.0 | 3.1 | 3.0 | 2.9 | 2.7 | 2.5 | 2.4 | 2.2 | 2.1 | 2.0 |
| Evaporator inlet T (° C.) | 0.0 | 0.0 | −1.6 | −1.5 | −1.4 | −1.4 | −1.3 | −1.2 | −1.1 | −1.0 | −1.0 |
| Condenser exit T (° C.) | 55.0 | 55.0 | 52.1 | 52.3 | 52.5 | 52.7 | 52.8 | 53.0 | 53.1 | 53.2 | 53.3 |
| Condenser P (bar) | 16.88 | 16.46 | 16.00 | 16.25 | 16.47 | 16.66 | 16.81 | 16.94 | 17.04 | 17.12 | 17.18 |
| Evaporator P (bar) | 2.92 | 3.14 | 2.76 | 2.82 | 2.88 | 2.92 | 2.96 | 2.99 | 3.02 | 3.04 | 3.05 |
| Refrigeration effect (kJ/kg) | 123.76 | 94.99 | 128.7 | 132.9 | 137.3 | 141.8 | 146.4 | 151.2 | 156.1 | 161.2 | 166.4 |
| COP | 2.03 | 1.91 | 2.04 | 2.05 | 2.06 | 2.06 | 2.07 | 2.08 | 2.08 | 2.09 | 2.10 |
| Discharge T (° C.) | 99.15 | 92.88 | 98.0 | 99.4 | 100.8 | 102.2 | 103.6 | 105.0 | 106.4 | 107.9 | 109.3 |
| Mass flow rate (kg/hr) | 174.53 | 227.39 | 167.9 | 162.5 | 157.4 | 152.4 | 147.6 | 142.9 | 138.4 | 134.0 | 129.8 |
| Volumetric flow rate (m3/hr) | 13.16 | 14.03 | 13.8 | 13.5 | 13.2 | 13.0 | 12.7 | 12.5 | 12.4 | 12.2 | 12.1 |
| Volumetric capacity (m3/hr) | 1641 | 1540 | 1562 | 1601 | 1636 | 1668 | 1696 | 1722 | 1744 | 1765 | 1782 |
| Pressure drop (kPa/m) | 953 | 1239 | 972 | 926 | 885 | 847 | 813 | 782 | 753 | 727 | 703 |
| GWP (TAR basis) | | | 66 | 72 | 78 | 83 | 89 | 95 | 100 | 106 | 112 |
| Fluorine ratio R = F/(F + H) | | | 0.618 | 0.593 | 0.571 | 0.550 | 0.530 | 0.511 | 0.493 | 0.476 | 0.460 |
| Capacity relative to 1234yf | 106.6% | 100.0% | 101.5% | 104.0% | 106.3% | 108.3% | 110.2% | 111.8% | 113.3% | 114.6% | 115.7% |

TABLE 8-continued

Theoretical Performance Data of Selected R-32/R-152a/R-1234ze(E) Blends Containing 10% R32

| | | | | | | | | | | |
|---|---|---|---|---|---|---|---|---|---|---|
| Relative COP | 106.0% | 100.0% | 106.9% | 107.3% | 107.6% | 107.9% | 108.3% | 108.7% | 109.0% | 109.4% | 109.8% |
| Relative pressure drop | 76.9% | 100.0% | 78.5% | 74.8% | 71.4% | 68.4% | 65.6% | 63.1% | 60.8% | 58.7% | 56.7% |

TABLE 9

Theoretical Performance Data of Selected R-32/R-152a/R-1234ze(E) Blends Containing 11% R32

| | | | | | | | | | | |
|---|---|---|---|---|---|---|---|---|---|---|
| R32 | | | 11 | 11 | 11 | 11 | 11 | 11 | 11 | 11 | 11 |
| R152a | | | 5 | 10 | 15 | 20 | 25 | 30 | 35 | 40 | 45 |
| R1234ze(E) | | | 84 | 79 | 74 | 69 | 64 | 59 | 54 | 49 | 44 |

| | Comparative data | | 11/5/ | 11/10/ | 11/15/ | 11/20/ | 11/25/ | 11/30/ | 11/35/ | 11/40/ | 11/45/ |
|---|---|---|---|---|---|---|---|---|---|---|---|
| Calculation results | 134a | R1234yf | 84 | 79 | 74 | 69 | 64 | 59 | 54 | 49 | 44 |
| Pressure ratio | 5.79 | 5.24 | 5.79 | 5.75 | 5.72 | 5.69 | 5.67 | 5.65 | 5.64 | 5.64 | 5.63 |
| Volumetric efficiency | 83.6% | 84.7% | 83.4% | 83.7% | 84.0% | 84.2% | 84.4% | 84.6% | 84.8% | 85.0% | 85.1% |
| Condenser glide (K) | 0.0 | 0.0 | 6.1 | 5.7 | 5.3 | 5.0 | 4.6 | 4.3 | 4.1 | 3.9 | 3.7 |
| Evaporator glide (K) | 0.0 | 0.0 | 3.4 | 3.3 | 3.1 | 2.9 | 2.7 | 2.6 | 2.4 | 2.3 | 2.2 |
| Evaporator inlet T (° C.) | 0.0 | 0.0 | −1.7 | −1.6 | −1.6 | −1.5 | −1.4 | −1.3 | −1.2 | −1.1 | −1.1 |
| Condenser exit T (° C.) | 55.0 | 55.0 | 51.9 | 52.1 | 52.3 | 52.5 | 52.7 | 52.8 | 53.0 | 53.1 | 53.2 |
| Condenser P (bar) | 16.88 | 16.46 | 16.31 | 16.55 | 16.76 | 16.94 | 17.08 | 17.20 | 17.30 | 17.37 | 17.42 |
| Evaporator P (bar) | 2.92 | 3.14 | 2.82 | 2.88 | 2.93 | 2.98 | 3.01 | 3.04 | 3.07 | 3.08 | 3.09 |
| Refrigeration effect (kJ/kg) | 123.76 | 94.99 | 130.1 | 134.3 | 138.6 | 143.1 | 147.8 | 152.6 | 157.5 | 162.6 | 167.9 |
| COP | 2.03 | 1.91 | 2.05 | 2.05 | 2.06 | 2.06 | 2.07 | 2.08 | 2.08 | 2.09 | 2.10 |
| Discharge T (° C.) | 99.15 | 92.88 | 98.9 | 100.3 | 101.7 | 103.1 | 104.4 | 105.8 | 107.2 | 108.7 | 110.1 |
| Mass flow rate (kg/hr) | 174.53 | 227.39 | 166.1 | 160.8 | 155.8 | 150.9 | 146.2 | 141.6 | 137.1 | 132.8 | 128.7 |
| Volumetric flow rate (m3/hr) | 13.16 | 14.03 | 13.5 | 13.2 | 13.0 | 12.7 | 12.5 | 12.3 | 12.2 | 12.1 | 11.9 |
| Volumetric capacity (m3/hr) | 1641 | 1540 | 1596 | 1633 | 1668 | 1698 | 1726 | 1751 | 1773 | 1792 | 1809 |
| Pressure drop (kPa/m) | 953 | 1239 | 945 | 901 | 861 | 826 | 793 | 764 | 736 | 711 | 688 |
| GWP (TAR basis) | | | 72 | 77 | 83 | 89 | 94 | 100 | 106 | 111 | 117 |
| Fluorine ratio R = F/(F + H) | | | 0.616 | 0.592 | 0.569 | 0.548 | 0.528 | 0.509 | 0.492 | 0.475 | 0.459 |
| Capacity relative to 1234yf | 106.6% | 100.0% | 103.6% | 106.1% | 108.3% | 110.3% | 112.1% | 113.7% | 115.1% | 116.4% | 117.5% |
| Relative COP | 106.0% | 100.0% | 107.0% | 107.3% | 107.6% | 108.0% | 108.3% | 108.7% | 109.0% | 109.4% | 109.8% |
| Relative pressure drop | 76.9% | 100.0% | 76.2% | 72.7% | 69.5% | 66.7% | 64.0% | 61.6% | 59.4% | 57.4% | 55.5% |

TABLE 10

Theoretical Performance Data of Selected R-32/R-152a/R-1234ze(E) Blends Containing 12% R32

| | | | | | | | | | | |
|---|---|---|---|---|---|---|---|---|---|---|
| R32 | | | 12 | 12 | 12 | 12 | 12 | 12 | 12 | 12 | 12 |
| R152a | | | 5 | 10 | 15 | 20 | 25 | 30 | 35 | 38 | 45 |
| R1234ze(E) | | | 83 | 78 | 73 | 68 | 63 | 58 | 53 | 50 | 43 |

| | Comparative data | | 12/5/ | 12/10/ | 12/15/ | 12/20/ | 12/25/ | 12/30/ | 12/35/ | 12/38/ | 12/45/ |
|---|---|---|---|---|---|---|---|---|---|---|---|
| Calculation results | 134a | R1234yf | 83 | 78 | 73 | 68 | 63 | 58 | 53 | 50 | 43 |
| Pressure ratio | 5.79 | 5.24 | 5.79 | 5.75 | 5.72 | 5.69 | 5.67 | 5.65 | 5.64 | 5.64 | 5.64 |
| Volumetric efficiency | 83.6% | 84.7% | 83.5% | 83.8% | 84.0% | 84.3% | 84.5% | 84.7% | 84.8% | 84.9% | 85.1% |
| Condenser glide (K) | 0.0 | 0.0 | 6.5 | 6.1 | 5.8 | 5.5 | 5.2 | 4.9 | 4.7 | 4.6 | 4.3 |
| Evaporator glide (K) | 0.0 | 0.0 | 3.7 | 3.6 | 3.4 | 3.3 | 3.1 | 2.9 | 2.8 | 2.7 | 2.6 |
| Evaporator inlet T (° C.) | 0.0 | 0.0 | −1.8 | −1.8 | −1.7 | −1.6 | −1.6 | −1.5 | −1.4 | −1.4 | −1.3 |

TABLE 10-continued

Theoretical Performance Data of Selected R-32/R-152a/R-1234ze(E) Blends Containing 12% R32

| | | | | | | | | | | | |
|---|---|---|---|---|---|---|---|---|---|---|---|
| Condenser exit T (° C.) | 55.0 | 55.0 | 51.8 | 51.9 | 52.1 | 52.3 | 52.4 | 52.5 | 52.7 | 52.7 | 52.8 |
| Condenser P (bar) | 16.88 | 16.46 | 16.65 | 16.91 | 17.13 | 17.32 | 17.48 | 17.61 | 17.71 | 17.76 | 17.85 |
| Evaporator P (bar) | 2.92 | 3.14 | 2.88 | 2.94 | 3.00 | 3.04 | 3.08 | 3.11 | 3.14 | 3.15 | 3.17 |
| Refrigeration effect (kJ/kg) | 123.76 | 94.99 | 131.4 | 135.6 | 139.9 | 144.4 | 149.0 | 153.7 | 158.6 | 161.6 | 168.9 |
| COP | 2.03 | 1.91 | 2.05 | 2.05 | 2.06 | 2.06 | 2.07 | 2.08 | 2.08 | 2.09 | 2.10 |
| Discharge T (° C.) | 99.15 | 92.88 | 99.8 | 101.2 | 102.6 | 103.9 | 105.3 | 106.7 | 108.1 | 109.0 | 110.9 |
| Mass flow rate (kg/hr) | 174.53 | 227.39 | 164.4 | 159.3 | 154.4 | 149.6 | 145.0 | 140.5 | 136.2 | 133.6 | 127.9 |
| Volumetric flow rate (m3/hr) | 13.16 | 14.03 | 13.2 | 12.9 | 12.7 | 12.4 | 12.2 | 12.1 | 11.9 | 11.8 | 11.7 |
| Volumetric capacity (m3/hr) | 1641 | 1540 | 1631 | 1670 | 1705 | 1737 | 1766 | 1791 | 1814 | 1827 | 1852 |
| Pressure drop (kPa/m) | 953 | 1239 | 917 | 875 | 837 | 802 | 771 | 742 | 716 | 701 | 669 |
| GWP (TAR basis) | | | 77 | 83 | 88 | 94 | 100 | 105 | 111 | 115 | 123 |
| Fluorine ratio R = F/(F + H) | | | 0.614 | 0.590 | 0.567 | 0.546 | 0.527 | 0.508 | 0.491 | 0.480 | 0.458 |
| Capacity relative to 1234yf | 106.6% | 100.0% | 105.9% | 108.5% | 110.8% | 112.8% | 114.7% | 116.3% | 117.8% | 118.6% | 120.3% |
| Relative COP | 106.0% | 100.0% | 107.0% | 107.3% | 107.6% | 107.9% | 108.2% | 108.5% | 108.9% | 109.1% | 109.6% |
| Relative pressure drop | 76.9% | 100.0% | 74.0% | 70.6% | 67.5% | 64.8% | 62.2% | 59.9% | 57.8% | 56.6% | 54.0% |

TABLE 11

Theoretical Performance Data of Selected R-32/R-152a/R-1234ze(E)/R-134a Blends Containing 4% R32 and 25% R134a

| | | | | | | | | | | | |
|---|---|---|---|---|---|---|---|---|---|---|---|
| R-32 (% b/w) | | | 4 | 4 | 4 | 4 | 4 | 4 | 4 | 4 | 4 |
| R-134a (% b/w) | | | 25 | 25 | 25 | 25 | 25 | 25 | 25 | 25 | 25 |
| R-152a (% b/w) | | | 5 | 10 | 15 | 20 | 25 | 30 | 35 | 40 | 45 |
| R-1234ze(E) (% b/w) | | | 66 | 61 | 56 | 51 | 46 | 41 | 36 | 31 | 26 |

| Calculation results | | COMPARATIVE | | | | | | | | | | |
|---|---|---|---|---|---|---|---|---|---|---|---|---|
| | | R134a | R1234yf | | | | | | | | | |
| Pressure ratio | | 5.79 | 5.24 | 5.72 | 5.70 | 5.69 | 5.69 | 5.68 | 5.68 | 5.68 | 5.69 | 5.70 |
| Volumetric efficiency | | 83.6% | 84.7% | 83.4% | 83.6% | 83.8% | 84.0% | 84.2% | 84.4% | 84.5% | 84.7% | 84.8% |
| condenser glide | K | 0.0 | 0.0 | 2.8 | 2.6 | 2.4 | 2.3 | 2.1 | 2.0 | 1.9 | 1.8 | 1.8 |
| Evaporator glide | K | 0.0 | 0.0 | 1.5 | 1.4 | 1.3 | 1.2 | 1.1 | 1.1 | 1.0 | 1.0 | 0.9 |
| Evaporator inlet T | ° C. | 0.0 | 0.0 | −0.8 | −0.7 | −0.7 | −0.6 | −0.6 | −0.5 | −0.5 | −0.5 | −0.5 |
| Condenser exit T | ° C. | 55.0 | 55.0 | 53.6 | 53.7 | 53.8 | 53.9 | 53.9 | 54.0 | 54.0 | 54.1 | 54.1 |
| Condenser pressure | bar | 16.88 | 16.46 | 15.52 | 15.70 | 15.85 | 15.98 | 16.09 | 16.17 | 16.24 | 16.30 | 16.34 |
| Evaporator pressure | bar | 2.92 | 3.14 | 2.71 | 2.75 | 2.78 | 2.81 | 2.83 | 2.85 | 2.86 | 2.87 | 2.87 |
| Refrigeration effect | kJ/kg | 123.76 | 94.99 | 121.58 | 126.41 | 131.35 | 136.41 | 141.57 | 146.85 | 152.23 | 157.71 | 163.29 |
| COP | | 2.03 | 1.91 | 2.03 | 2.04 | 2.05 | 2.06 | 2.07 | 2.08 | 2.09 | 2.10 | 2.10 |
| Discharge T | ° C. | 99.15 | 92.88 | 95.12 | 96.71 | 98.30 | 99.87 | 101.44 | 103.00 | 104.55 | 106.09 | 107.63 |
| Mass flow rate | kg/hr | 174.53 | 227.39 | 177.67 | 170.87 | 164.44 | 158.35 | 152.57 | 147.09 | 141.89 | 136.96 | 132.28 |
| Volumetric flow rate | m3/hr | 13.16 | 14.03 | 14.35 | 14.05 | 13.79 | 13.56 | 13.36 | 13.18 | 13.03 | 12.90 | 12.78 |
| Volumetric capacity | kJ/m3 | 1641 | 1540 | 1505 | 1537 | 1566 | 1593 | 1617 | 1638 | 1658 | 1675 | 1690 |
| Pressure drop | kPa/m | 953 | 1239 | 1054 | 1002 | 955 | 913 | 875 | 840 | 808 | 779 | 752 |
| GWP (TAR basis) | | | | 357 | 363 | 368 | 374 | 380 | 385 | 391 | 397 | 403 |
| F/(F + H) | | | | 0.631 | 0.607 | 0.584 | 0.562 | 0.542 | 0.523 | 0.504 | 0.487 | 0.471 |

TABLE 11-continued

Theoretical Performance Data of Selected R-32/R-152a/R-1234ze(E)/R-134a Blends Containing 4% R32 and 25% R134a

| Capacity relative to 1234yf | 106.6% | 100.0% | 97.7% | 99.8% | 101.7% | 103.4% | 105.0% | 106.4% | 107.7% | 108.8% | 109.8% |
| Relative COP | 106.0% | 100.0% | 106.0% | 106.6% | 107.1% | 107.6% | 108.1% | 108.6% | 109.1% | 109.6% | 110.1% |
| Relative pressure drop | 76.9% | 100.0% | 85.0% | 80.9% | 77.1% | 73.7% | 70.6% | 67.8% | 65.2% | 62.8% | 60.7% |

TABLE 12

Theoretical Performance Data of Selected R-32/R-152a/R-1234ze(E)/R-134a Blends Containing 6% R32 and 25% R134a

| | | | | | | | | | | | |
|---|---|---|---|---|---|---|---|---|---|---|---|
| R-32 (% b/w) | | | | 6 | 6 | 6 | 6 | 6 | 6 | 6 | 6 | 6 |
| R-134a (% b/w) | | | | 25 | 25 | 25 | 25 | 25 | 25 | 25 | 25 | 25 |
| R-152a (% b/w) | | | | 5 | 10 | 15 | 20 | 25 | 30 | 35 | 40 | 45 |
| R-1234ze (E) (% b/w) | | | | 64 | 59 | 54 | 49 | 44 | 39 | 34 | 29 | 24 |

| Calculation results | | COMPARATIVE DATA | | 6/25/ | 6/25/ | 6/25/ | 6/25/ | 6/25/ | 6/25/ | 6/25/ | 6/25/ | 6/25/ |
|---|---|---|---|---|---|---|---|---|---|---|---|---|
| | | 134a | R1234yf | 5/64 | 10/59 | 15/54 | 20/49 | 25/44 | 30/39 | 35/34 | 40/29 | 45/24 |
| Pressure ratio | | 5.79 | 5.24 | 5.72 | 5.71 | 5.69 | 5.69 | 5.68 | 5.68 | 5.69 | 5.69 | 5.70 |
| Volumetric efficiency | | 83.6% | 84.7% | 83.5% | 83.8% | 84.0% | 84.2% | 84.3% | 84.5% | 84.6% | 84.8% | 84.9% |
| condenser glide | K | 0.0 | 0.0 | 3.6 | 3.4 | 3.2 | 3.0 | 2.8 | 2.7 | 2.6 | 2.5 | 2.4 |
| Evaporator glide | K | 0.0 | 0.0 | 2.0 | 1.9 | 1.7 | 1.6 | 1.5 | 1.5 | 1.4 | 1.4 | 1.3 |
| Evaporator inlet T | °C. | 0.0 | 0.0 | −1.0 | −0.9 | −0.9 | −0.8 | −0.8 | −0.7 | −0.7 | −0.7 | −0.7 |
| Condenser exit T | °C. | 55.0 | 55.0 | 53.2 | 53.3 | 53.4 | 53.5 | 53.6 | 53.7 | 53.7 | 53.8 | 53.8 |
| Condenser pressure | bar | 16.88 | 16.46 | 16.15 | 16.31 | 16.45 | 16.56 | 16.66 | 16.73 | 16.79 | 16.83 | 16.86 |
| Evaporator pressure | bar | 2.92 | 3.14 | 2.82 | 2.86 | 2.89 | 2.91 | 2.93 | 2.94 | 2.95 | 2.96 | 2.96 |
| Refrigeration effect | kJ/kg | 123.76 | 94.99 | 124.46 | 129.29 | 134.24 | 139.30 | 144.48 | 149.77 | 155.17 | 160.67 | 166.27 |
| COP | | 2.03 | 1.91 | 2.03 | 2.04 | 2.05 | 2.06 | 2.07 | 2.08 | 2.09 | 2.10 | 2.10 |
| Discharge T | °C. | 99.15 | 92.88 | 96.94 | 98.51 | 100.07 | 101.63 | 103.17 | 104.72 | 106.25 | 107.78 | 109.31 |
| Mass flow rate | kg/hr | 174.53 | 227.39 | 173.55 | 167.07 | 160.91 | 155.06 | 149.51 | 144.22 | 139.20 | 134.44 | 129.91 |
| Volumetric flow rate | m3/hr | 13.16 | 14.03 | 13.75 | 13.49 | 13.25 | 13.05 | 12.87 | 12.72 | 12.58 | 12.47 | 12.36 |
| Volumetric capacity | kJ/m3 | 1641 | 1540 | 1571 | 1602 | 1630 | 1655 | 1678 | 1698 | 1716 | 1733 | 1747 |
| Pressure drop | kPa/m | 953 | 1239 | 992 | 945 | 903 | 865 | 830 | 798 | 769 | 742 | 718 |
| GWP (TAR BASIS) | | | | 368 | 374 | 379 | 385 | 391 | 396 | 402 | 408 | 413 |
| F/(F + H) | | | | 0.627 | 0.603 | 0.580 | 0.559 | 0.539 | 0.520 | 0.502 | 0.485 | 0.469 |
| Capacity relative to 1234yf | | 106.6% | 100.0% | 102.0% | 104.0% | 105.8% | 107.5% | 109.0% | 110.3% | 111.5% | 112.5% | 113.5% |
| Relative COP | | 106.0% | 100.0% | 106.1% | 106.7% | 107.2% | 107.7% | 108.2% | 108.7% | 109.1% | 109.6% | 110.0% |
| Relative pressure drop | | 76.9% | 100.0% | 80.0% | 76.3% | 72.9% | 69.8% | 67.0% | 64.4% | 62.1% | 59.9% | 57.9% |

TABLE 13

Theoretical Performance Data of Selected R-32/R-152a/R-1234ze(E)/R-134a Blends Containing 8% R32 and 25% R134a

| | | 8 | 8 | 8 | 8 | 8 | 8 | 8 | 8 | 8 |
|---|---|---|---|---|---|---|---|---|---|---|
| R-32 (% b/w) | | | | | | | | | | |
| R-134a (% b/w) | | 25 | 25 | 25 | 25 | 25 | 25 | 25 | 25 | 25 |
| R-152a (% b/w) | | 5 | 10 | 15 | 20 | 25 | 30 | 35 | 40 | 45 |
| R-1234ze (E) (% b/w) | | 62 | 57 | 52 | 47 | 42 | 37 | 32 | 27 | 22 |

| Calculation results | | COMPARATIVE DATA | | 8/25/ 5/62 | 8/25/ 10/57 | 8/25/ 15/52 | 8/25/ 20/47 | 8/25/ 25/42 | 8/25/ 30/37 | 8/25/ 35/32 | 8/25/ 40/27 | 8/25/ 45/22 |
|---|---|---|---|---|---|---|---|---|---|---|---|---|
| | | 134a | R1234yf | | | | | | | | | |
| Pressure ratio | | 5.79 | 5.24 | 5.72 | 5.70 | 5.69 | 5.68 | 5.68 | 5.68 | 5.68 | 5.69 | 5.70 |
| Volumetric efficiency | | 83.6% | 84.7% | 83.7% | 83.9% | 84.1% | 84.3% | 84.5% | 84.6% | 84.7% | 84.9% | 85.0% |
| condenser glide | K | 0.0 | 0.0 | 4.2 | 4.0 | 3.8 | 3.6 | 3.4 | 3.3 | 3.2 | 3.1 | 3.0 |
| Evaporator glide | K | 0.0 | 0.0 | 2.4 | 2.3 | 2.1 | 2.0 | 1.9 | 1.9 | 1.8 | 1.8 | 1.7 |
| Evaporator inlet T | °C. | 0.0 | 0.0 | −1.2 | −1.1 | −1.1 | −1.0 | −1.0 | −0.9 | −0.9 | −0.9 | −0.9 |
| Condenser exit T | °C. | 55.0 | 55.0 | 52.9 | 53.0 | 53.1 | 53.2 | 53.3 | 53.4 | 53.4 | 53.5 | 53.5 |
| Condenser pressure | bar | 16.88 | 16.46 | 16.77 | 16.92 | 17.04 | 17.14 | 17.22 | 17.28 | 17.32 | 17.35 | 17.37 |
| Evaporator pressure | bar | 2.92 | 3.14 | 2.93 | 2.97 | 2.99 | 3.02 | 3.03 | 3.04 | 3.05 | 3.05 | 3.05 |
| Refrigeration effect | kJ/kg | 123.76 | 94.99 | 127.25 | 132.08 | 137.03 | 142.11 | 147.30 | 152.61 | 158.03 | 163.56 | 169.18 |
| COP | | 2.03 | 1.91 | 2.03 | 2.04 | 2.05 | 2.06 | 2.07 | 2.08 | 2.09 | 2.10 | 2.10 |
| Discharge T | °C. | 99.15 | 92.88 | 98.72 | 100.26 | 101.80 | 103.34 | 104.87 | 106.40 | 107.92 | 109.44 | 110.95 |
| Mass flow rate | kg/hr | 174.53 | 227.39 | 169.74 | 163.54 | 157.63 | 152.00 | 146.64 | 141.54 | 136.68 | 132.06 | 127.67 |
| Volumetric flow rate | m3/hr | 13.16 | 14.03 | 13.19 | 12.96 | 12.76 | 12.58 | 12.42 | 12.29 | 12.17 | 12.07 | 11.98 |
| Volumetric capacity | kJ/m3 | 1641 | 1540 | 1637 | 1667 | 1693 | 1717 | 1739 | 1758 | 1775 | 1790 | 1803 |
| Pressure drop | kPa/m | 953 | 1239 | 936 | 894 | 856 | 821 | 790 | 760 | 734 | 709 | 686 |
| GWP (TAR BASIS) | | | | 379 | 384 | 390 | 396 | 402 | 407 | 413 | 419 | 424 |
| F/(F + H) | | | | 0.623 | 0.599 | 0.577 | 0.556 | 0.536 | 0.517 | 0.499 | 0.483 | 0.467 |
| Capacity relative to 1234yf | | 106.6% | 100.0% | 106.3% | 108.2% | 110.0% | 111.5% | 112.9% | 114.2% | 115.3% | 116.3% | 117.1% |
| Relative COP | | 106.0% | 100.0% | 106.2% | 106.7% | 107.2% | 107.7% | 108.2% | 108.7% | 109.1% | 109.6% | 110.0% |
| Relative pressure drop | | 76.9% | 100.0% | 75.5% | 72.2% | 69.1% | 66.3% | 63.7% | 61.4% | 59.2% | 57.2% | 55.4% |

TABLE 14

Theoretical Performance Data of Selected R-32/R-152a/R-1234ze(E)/R-134a Blends Containing 10% R32 and 25% R134a

| | 10 | 10 | 10 | 10 | 10 | 10 | 10 | 10 | 10 |
|---|---|---|---|---|---|---|---|---|---|
| R-32 (% b/w) | | | | | | | | | |
| R-134a (% b/w) | 25 | 25 | 25 | 25 | 25 | 25 | 25 | 25 | 25 |
| R-152a (% b/w) | 5 | 10 | 15 | 20 | 25 | 30 | 35 | 40 | 45 |
| R-1234ze (E) (% b/w) | 60 | 55 | 50 | 45 | 40 | 35 | 30 | 25 | 20 |

TABLE 14-continued

Theoretical Performance Data of Selected R-32/R-152a/R-1234ze(E)/R-134a Blends Containing 10% R32 and 25% R134a

| Calculation results | | COMPARATIVE DATA | | 10/25/ 5/60 | 10/25/ 10/55 | 10/25/ 15/50 | 10/25/ 20/45 | 10/25/ 25/40 | 10/25/ 30/35 | 10/25/ 35/30 | 10/25/ 40/25 | 10/25/ 45/20 |
|---|---|---|---|---|---|---|---|---|---|---|---|---|
| | | 134a | R1234yf | | | | | | | | | |
| Pressure ratio | | 5.79 | 5.24 | 5.71 | 5.69 | 5.68 | 5.68 | 5.67 | 5.68 | 5.68 | 5.69 | 5.69 |
| Volumetric efficiency | | 83.6% | 84.7% | 83.8% | 84.1% | 84.3% | 84.4% | 84.6% | 84.7% | 84.9% | 85.0% | 85.1% |
| condenser glide | K | 0.0 | 0.0 | 4.8 | 4.5 | 4.3 | 4.1 | 3.9 | 3.8 | 3.7 | 3.6 | 3.5 |
| Evaporator glide | K | 0.0 | 0.0 | 2.8 | 2.7 | 2.5 | 2.4 | 2.3 | 2.2 | 2.2 | 2.1 | 2.1 |
| Evaporator inlet T | °C. | 0.0 | 0.0 | −1.4 | −1.3 | −1.3 | −1.2 | −1.2 | −1.1 | −1.1 | −1.1 | −1.1 |
| Condenser exit T | °C. | 55.0 | 55.0 | 52.6 | 52.7 | 52.9 | 53.0 | 53.0 | 53.1 | 53.2 | 53.2 | 53.2 |
| Condenser pressure | bar | 16.88 | 16.46 | 17.39 | 17.52 | 17.63 | 17.71 | 17.78 | 17.83 | 17.86 | 17.87 | 17.88 |
| Evaporator pressure | bar | 2.92 | 3.14 | 3.05 | 3.08 | 3.10 | 3.12 | 3.13 | 3.14 | 3.14 | 3.14 | 3.14 |
| Refrigeration effect | kJ/kg | 123.76 | 94.99 | 129.95 | 134.79 | 139.75 | 144.84 | 150.05 | 155.38 | 160.83 | 166.38 | 172.04 |
| COP | | 2.03 | 1.91 | 2.03 | 2.04 | 2.05 | 2.06 | 2.07 | 2.08 | 2.09 | 2.09 | 2.10 |
| Discharge T | °C. | 99.15 | 92.88 | 100.45 | 101.97 | 103.49 | 105.01 | 106.53 | 108.05 | 109.56 | 111.07 | 112.57 |
| Mass flow rate | kg/hr | 174.53 | 227.39 | 166.21 | 160.25 | 154.56 | 149.13 | 143.95 | 139.01 | 134.30 | 129.82 | 125.56 |
| Volumetric flow rate | m3/hr | 13.16 | 14.03 | 12.68 | 12.48 | 12.30 | 12.14 | 12.00 | 11.88 | 11.78 | 11.69 | 11.62 |
| Volumetric capacity | kJ/m3 | 1641 | 1540 | 1703 | 1731 | 1757 | 1779 | 1800 | 1818 | 1834 | 1847 | 1860 |
| Pressure drop | kPa/m | 953 | 1239 | 886 | 848 | 813 | 781 | 752 | 726 | 701 | 678 | 657 |
| GWP (TAR) | | | | 390 | 395 | 401 | 407 | 412 | 418 | 424 | 430 | 435 |
| F/(F + H) | | | | 0.619 | 0.595 | 0.573 | 0.552 | 0.533 | 0.514 | 0.497 | 0.480 | 0.465 |
| Capacity relative to 1234yf | | 106.6% | 100.0% | 110.6% | 112.4% | 114.1% | 115.6% | 116.9% | 118.1% | 119.1% | 120.0% | 120.8% |
| Relative COP | | 106.0% | 100.0% | 106.3% | 106.8% | 107.2% | 107.7% | 108.2% | 108.6% | 109.1% | 109.5% | 110.0% |
| Relative pressure drop | | 76.9% | 100.0% | 71.5% | 68.4% | 65.6% | 63.1% | 60.7% | 58.6% | 56.6% | 54.7% | 53.0% |

TABLE 14A

Theoretical Performance Data of Selected R-32/R-152a/R-1234ze(E)/R-134a Blends Containing 12% R32 and 25% R134a

| | | | | | | | | | | | | |
|---|---|---|---|---|---|---|---|---|---|---|---|---|
| R-32 (% b/w) | | | | 12 | 12 | 12 | 12 | 12 | 12 | 12 | 12 | 12 |
| R-134a (% b/w) | | | | 25 | 25 | 25 | 25 | 25 | 25 | 25 | 25 | 25 |
| R-152a (% b/w) | | | | 5 | 10 | 15 | 20 | 25 | 30 | 35 | 40 | 45 |
| R-1234ze (E) (% b/w) | | | | 58 | 53 | 48 | 43 | 38 | 33 | 28 | 23 | 18 |

| Calculation results | | COMPARATIVE DATA | | 12/25/ 5/58 | 12/25/ 10/53 | 12/25/ 15/48 | 12/25/ 20/43 | 12/25/ 25/38 | 12/25/ 30/33 | 12/25/ 35/28 | 12/25/ 40/23 | 12/25/ 45/18 |
|---|---|---|---|---|---|---|---|---|---|---|---|---|
| | | 134a | R1234yf | | | | | | | | | |
| Pressure ratio | | 5.79 | 5.24 | 5.70 | 5.68 | 5.67 | 5.67 | 5.67 | 5.67 | 5.67 | 5.68 | 5.69 |
| Volumetric efficiency | | 83.6% | 84.7% | 84.0% | 84.2% | 84.4% | 84.6% | 84.7% | 84.9% | 85.0% | 85.1% | 85.2% |
| condenser glide | K | 0.0 | 0.0 | 5.2 | 5.0 | 4.7 | 4.5 | 4.3 | 4.2 | 4.1 | 4.0 | 4.0 |
| Evaporator glide | K | 0.0 | 0.0 | 3.2 | 3.0 | 2.9 | 2.7 | 2.6 | 2.6 | 2.5 | 2.5 | 2.5 |
| Evaporator inlet T | °C. | 0.0 | 0.0 | −1.6 | −1.5 | −1.4 | −1.4 | −1.3 | −1.3 | −1.3 | −1.2 | −1.2 |

TABLE 14A-continued

Theoretical Performance Data of Selected R-32/R-152a/R-1234ze(E)/R-134a Blends Containing 12% R32 and 25% R134a

| | | | | | | | | | | | |
|---|---|---|---|---|---|---|---|---|---|---|---|
| Condenser exit T | °C. | 55.0 | 55.0 | 52.4 | 52.5 | 52.6 | 52.7 | 52.8 | 52.9 | 52.9 | 53.0 | 53.0 |
| Condenser pressure | bar | 16.88 | 16.46 | 18.00 | 18.12 | 18.21 | 18.28 | 18.33 | 18.36 | 18.38 | 18.39 | 18.38 |
| Evaporator pressure | bar | 2.92 | 3.14 | 3.16 | 3.19 | 3.21 | 3.23 | 3.24 | 3.24 | 3.24 | 3.24 | 3.23 |
| Refrigeration effect | kJ/kg | 123.76 | 94.99 | 132.58 | 137.42 | 142.40 | 147.51 | 152.74 | 158.10 | 163.57 | 169.15 | 174.83 |
| COP | | 2.03 | 1.91 | 2.03 | 2.04 | 2.05 | 2.06 | 2.07 | 2.08 | 2.09 | 2.09 | 2.10 |
| Discharge temperature | °C. | 99.15 | 92.88 | 102.14 | 103.64 | 105.15 | 106.65 | 108.16 | 109.66 | 111.16 | 112.66 | 114.15 |
| Mass flow rate | kg/hr | 174.53 | 227.39 | 162.92 | 157.18 | 151.69 | 146.44 | 141.42 | 136.63 | 132.05 | 127.70 | 123.55 |
| Volumetric flow rate | m3/hr | 13.16 | 14.03 | 12.21 | 12.03 | 11.87 | 11.73 | 11.61 | 11.51 | 11.42 | 11.34 | 11.28 |
| Volumetric capacity | kJ/m3 | 1641 | 1540 | 1769 | 1796 | 1820 | 1841 | 1860 | 1877 | 1892 | 1905 | 1916 |
| Pressure drop | kPa/m | 953 | 1239 | 840 | 805 | 774 | 745 | 718 | 694 | 671 | 650 | 630 |
| GWP (TAR BASIS) | | | | 400 | 406 | 412 | 418 | 423 | 429 | 435 | 440 | 446 |
| F/(F + H) | | | | 0.615 | 0.592 | 0.570 | 0.549 | 0.530 | 0.512 | 0.494 | 0.478 | 0.462 |
| Capacity relative to 1234yf | | 106.6% | 100.0% | 114.9% | 116.6% | 118.2% | 119.6% | 120.8% | 121.9% | 122.9% | 123.7% | 124.4% |
| Relative COP | | 106.0% | 100.0% | 106.3% | 106.8% | 107.2% | 107.7% | 108.2% | 108.6% | 109.0% | 109.5% | 109.9% |
| Relative pressure drop | | 76.9% | 100.0% | 67.8% | 65.0% | 62.5% | 60.1% | 58.0% | 56.0% | 54.1% | 52.4% | 50.9% |

TABLE 15

Theoretical Performance Data of Selected R-32/R-152a/R-1234ze(E)/R-134a Blends Containing 15% R32 and 25% R134a

| | | | | | | | | | |
|---|---|---|---|---|---|---|---|---|---|
| R-32 (% b/w) | 15 | 15 | 15 | 15 | 15 | 15 | 15 | 15 | 15 |
| R-134a (% b/w) | 25 | 25 | 25 | 25 | 25 | 25 | 25 | 25 | 25 |
| R-152a (% b/w) | 5 | 10 | 15 | 20 | 25 | 30 | 35 | 40 | 45 |
| R-1234ze (E) (% b/w) | 55 | 50 | 45 | 40 | 35 | 30 | 25 | 20 | 15 |

| Calculation results | | COMPARATIVE DATA | | 15/25/ 5/55 | 15/25/ 10/50 | 15/25/ 15/45 | 15/25/ 20/40 | 15/25/ 25/35 | 15/25/ 30/30 | 15/25/ 35/25 | 15/25/ 40/20 | 15/25/ 45/15 |
|---|---|---|---|---|---|---|---|---|---|---|---|---|
| | | 134a | R1234yf | | | | | | | | | |
| Pressure ratio | | 5.79 | 5.24 | 5.67 | 5.66 | 5.65 | 5.65 | 5.65 | 5.65 | 5.66 | 5.67 | 5.68 |
| Volumetric efficiency | | 83.6% | 84.7% | 84.3% | 84.5% | 84.7% | 84.8% | 85.0% | 85.1% | 85.2% | 85.3% | 85.4% |
| condenser glide | K | 0.0 | 0.0 | 5.8 | 5.5 | 5.2 | 5.0 | 4.9 | 4.7 | 4.6 | 4.6 | 4.5 |
| Evaporator glide | K | 0.0 | 0.0 | 3.7 | 3.5 | 3.4 | 3.2 | 3.1 | 3.0 | 3.0 | 3.0 | 3.0 |
| Evaporator inlet T | °C. | 0.0 | 0.0 | −1.8 | −1.8 | −1.7 | −1.6 | −1.6 | −1.5 | −1.5 | −1.5 | −1.5 |
| Condenser exit T | °C. | 55.0 | 55.0 | 52.1 | 52.3 | 52.4 | 52.5 | 52.6 | 52.6 | 52.7 | 52.7 | 52.7 |
| Condenser pressure | bar | 16.88 | 16.46 | 18.90 | 19.00 | 19.07 | 19.12 | 19.15 | 19.16 | 19.16 | 19.15 | 19.12 |
| Evaporator pressure | bar | 2.92 | 3.14 | 3.33 | 3.36 | 3.37 | 3.38 | 3.39 | 3.39 | 3.39 | 3.38 | 3.37 |
| Refrigeration effect | kJ/kg | 123.76 | 94.99 | 136.38 | 141.24 | 146.25 | 151.39 | 156.66 | 162.06 | 167.58 | 173.20 | 178.93 |
| COP | | 2.03 | 1.91 | 2.03 | 2.04 | 2.05 | 2.06 | 2.07 | 2.07 | 2.08 | 2.09 | 2.10 |
| Discharge temperature | °C. | 99.15 | 92.88 | 104.61 | 106.09 | 107.58 | 109.06 | 110.55 | 112.04 | 113.53 | 115.01 | 116.49 |

TABLE 15-continued

Theoretical Performance Data of Selected R-32/R-152a/R-1234ze(E)/R-134a Blends Containing 15% R32 and 25% R134a

| | | | | | | | | | | | |
|---|---|---|---|---|---|---|---|---|---|---|---|
| Mass flow rate | kg/hr | 174.53 | 227.39 | 158.38 | 152.93 | 147.69 | 142.68 | 137.88 | 133.28 | 128.90 | 124.71 | 120.72 |
| Volumetric flow rate | m3/hr | 13.16 | 14.03 | 11.57 | 11.42 | 11.29 | 11.17 | 11.07 | 10.99 | 10.92 | 10.86 | 10.80 |
| Volumetric capacity | kJ/m3 | 1641 | 1540 | 1867 | 1892 | 1914 | 1934 | 1951 | 1966 | 1979 | 1990 | 1999 |
| Pressure drop | kPa/m | 953 | 1239 | 779 | 749 | 721 | 696 | 672 | 650 | 630 | 611 | 593 |
| GWP (TAR BASIS) | | | | 417 | 423 | 428 | 434 | 440 | 445 | 451 | 457 | 462 |
| F/(F + H) | | | | 0.609 | 0.586 | 0.565 | 0.545 | 0.526 | 0.508 | 0.491 | 0.475 | 0.459 |
| Capacity relative to 1234yf | | 106.6% | 100.0% | 121.2% | 122.9% | 124.3% | 125.6% | 126.7% | 127.7% | 128.5% | 129.2% | 129.8% |
| Relative COP | | 106.0% | 100.0% | 106.3% | 106.8% | 107.2% | 107.6% | 108.1% | 108.5% | 108.9% | 109.4% | 109.8% |
| Relative pressure drop | | 76.9% | 100.0% | 62.9% | 60.4% | 58.2% | 56.1% | 54.2% | 52.5% | 50.8% | 49.3% | 47.9% |

TABLE 16

Theoretical Performance Data of Selected R-32/R-152a/R-1234ze(E)/R-134a Blends Containing 4% R32 and 30% R134a

| | | | | | | | | | | |
|---|---|---|---|---|---|---|---|---|---|---|
| R-32 (% b/w) | | | | 4 | 4 | 4 | 4 | 4 | 4 | 4 | 4 | 4 |
| R-134a (% b/w) | | | | 30 | 30 | 30 | 30 | 30 | 30 | 30 | 30 | 30 |
| R-152a (% b/w) | | | | 5 | 10 | 15 | 20 | 25 | 30 | 35 | 40 | 45 |
| R-1234ze(E) (% b/w) | | | | 61 | 56 | 51 | 46 | 41 | 36 | 31 | 26 | 21 |

| Calculation results | | COMPARATIVE DATA | | 4/30/ | 4/30/ | 4/30/ | 4/30/ | 4/30/ | 4/30/ | 4/30/ | 4/30/ | 4/30/ |
| | | 134a | R1234yf | 5/61 | 10/56 | 15/51 | 20/46 | 25/41 | 30/36 | 35/31 | 40/26 | 45/21 |
|---|---|---|---|---|---|---|---|---|---|---|---|---|
| Pressure ratio | | 5.79 | 5.24 | 5.71 | 5.70 | 5.69 | 5.68 | 5.68 | 5.68 | 5.69 | 5.70 | 5.70 |
| Volumetric efficiency | | 83.6% | 84.7% | 83.5% | 83.7% | 83.9% | 84.1% | 84.3% | 84.4% | 84.6% | 84.7% | 84.8% |
| condenser glide | K | 0.0 | 0.0 | 2.7 | 2.5 | 2.3 | 2.2 | 2.0 | 1.9 | 1.8 | 1.8 | 1.7 |
| Evaporator glide | K | 0.0 | 0.0 | 1.5 | 1.3 | 1.2 | 1.1 | 1.1 | 1.0 | 1.0 | 0.9 | 0.9 |
| Evaporator inlet T | °C. | 0.0 | 0.0 | −0.7 | −0.7 | −0.6 | −0.6 | −0.5 | −0.5 | −0.5 | −0.5 | −0.5 |
| Condenser exit T | °C. | 55.0 | 55.0 | 53.7 | 53.8 | 53.8 | 53.9 | 54.0 | 54.0 | 54.1 | 54.1 | 54.1 |
| Condenser pressure | bar | 16.88 | 16.46 | 15.78 | 15.94 | 16.07 | 16.18 | 16.27 | 16.34 | 16.40 | 16.44 | 16.46 |
| Evaporator pressure | bar | 2.92 | 3.14 | 2.76 | 2.80 | 2.83 | 2.85 | 2.86 | 2.88 | 2.88 | 2.89 | 2.89 |
| Refrigeration effect | kJ/kg | 123.76 | 94.99 | 121.98 | 126.90 | 131.92 | 137.07 | 142.33 | 147.69 | 153.16 | 158.73 | 164.40 |
| COP | | 2.03 | 1.91 | 2.03 | 2.04 | 2.05 | 2.06 | 2.07 | 2.08 | 2.09 | 2.10 | 2.11 |
| Discharge T | °C. | 99.15 | 92.88 | 95.65 | 97.25 | 98.85 | 100.43 | 102.01 | 103.59 | 105.15 | 106.71 | 108.26 |
| Mass flow rate | kg/hr | 174.53 | 227.39 | 177.07 | 170.22 | 163.73 | 157.59 | 151.76 | 146.25 | 141.02 | 136.08 | 131.39 |
| Volumetric flow rate | m3/hr | 13.16 | 14.03 | 14.11 | 13.83 | 13.59 | 13.38 | 13.20 | 13.04 | 12.90 | 12.78 | 12.67 |
| Volumetric capacity | kJ/m3 | 1641 | 1540 | 1531 | 1562 | 1589 | 1614 | 1637 | 1657 | 1675 | 1691 | 1705 |
| Pressure drop | kPa/m | 953 | 1239 | 1033 | 983 | 938 | 898 | 861 | 827 | 796 | 768 | 742 |
| Capacity relative to 1234yf | | 106.6% | 100.0% | 99.4% | 101.4% | 103.2% | 104.8% | 106.3% | 107.6% | 108.8% | 109.8% | 110.7% |
| Relative COP | | 106.0% | 100.0% | 105.9% | 106.5% | 107.1% | 107.6% | 108.1% | 108.7% | 109.2% | 109.7% | 110.1% |
| Relative pressure drop | | 76.9% | 100.0% | 83.4% | 79.3% | 75.7% | 72.5% | 69.5% | 66.7% | 64.3% | 62.0% | 59.9% |

TABLE 17

Theoretical Performance Data of Selected R-32/R-152a/R-1234ze(E)/R-134a Blends Containing 6% R32 and 30% R134a

| | | | | | | | | | | | |
|---|---|---|---|---|---|---|---|---|---|---|---|
| R-32 (% b/w) | | | | 6 | 6 | 6 | 6 | 6 | 6 | 6 | 6 | 6 |
| R-134a (% b/w) | | | | 30 | 30 | 30 | 30 | 30 | 30 | 30 | 30 | 30 |
| R-152a (% b/w) | | | | 5 | 10 | 15 | 20 | 25 | 30 | 35 | 40 | 45 |
| R-1234ze(E) (% b/w) | | | | 59 | 54 | 49 | 44 | 39 | 34 | 29 | 24 | 19 |

| Calculation results | | COMPARATIVE DATA | | 6/30/ | 6/30/ | 6/30/ | 6/30/ | 6/30/ | 6/30/ | 6/30/ | 6/30/ | 6/30/ |
|---|---|---|---|---|---|---|---|---|---|---|---|---|
| | | 134a | R1234yf | 5/59 | 10/54 | 15/49 | 20/44 | 25/39 | 30/34 | 35/29 | 40/24 | 45/19 |
| Pressure ratio | | 5.79 | 5.24 | 5.71 | 5.70 | 5.69 | 5.68 | 5.68 | 5.69 | 5.69 | 5.70 | 5.71 |
| Volumetric efficiency | | 83.6% | 84.7% | 83.6% | 83.8% | 84.0% | 84.2% | 84.4% | 84.5% | 84.7% | 84.8% | 84.9% |
| condenser glide | K | 0.0 | 0.0 | 3.4 | 3.2 | 3.0 | 2.8 | 2.7 | 2.6 | 2.5 | 2.4 | 2.4 |
| Evaporator glide | K | 0.0 | 0.0 | 1.9 | 1.8 | 1.7 | 1.6 | 1.5 | 1.4 | 1.4 | 1.3 | 1.3 |
| Evaporator inlet T | °C. | 0.0 | 0.0 | −0.9 | −0.9 | −0.8 | −0.8 | −0.7 | −0.7 | −0.7 | −0.7 | −0.7 |
| Condenser exit T | °C. | 55.0 | 55.0 | 53.3 | 53.4 | 53.5 | 53.6 | 53.7 | 53.7 | 53.8 | 53.8 | 53.8 |
| Condenser pressure | bar | 16.88 | 16.46 | 16.41 | 16.55 | 16.67 | 16.76 | 16.84 | 16.90 | 16.94 | 16.96 | 16.98 |
| Evaporator pressure | bar | 2.92 | 3.14 | 2.87 | 2.90 | 2.93 | 2.95 | 2.96 | 2.97 | 2.98 | 2.98 | 2.97 |
| Refrigeration effect | kJ/kg | 123.76 | 94.99 | 124.84 | 129.76 | 134.80 | 139.95 | 145.23 | 150.61 | 156.11 | 161.70 | 167.39 |
| COP | | 2.03 | 1.91 | 2.03 | 2.04 | 2.05 | 2.06 | 2.07 | 2.08 | 2.09 | 2.10 | 2.11 |
| Discharge temperature | °C. | 99.15 | 92.88 | 97.46 | 99.04 | 100.62 | 102.19 | 103.75 | 105.31 | 106.86 | 108.40 | 109.94 |
| Mass flow rate | kg/hr | 174.53 | 227.39 | 173.02 | 166.46 | 160.24 | 154.34 | 148.73 | 143.41 | 138.37 | 133.58 | 129.04 |
| Volumetric flow rate | m3/hr | 13.16 | 14.03 | 13.52 | 13.28 | 13.07 | 12.89 | 12.72 | 12.58 | 12.46 | 12.36 | 12.27 |
| Volumetric capacity | kJ/m3 | 1641 | 1540 | 1597 | 1626 | 1653 | 1676 | 1697 | 1716 | 1733 | 1748 | 1761 |
| Pressure drop | kPa/m | 953 | 1239 | 973 | 928 | 888 | 851 | 817 | 787 | 758 | 732 | 708 |
| Capacity relative to 1234yf | | 106.6% | 100.0% | 103.7% | 105.6% | 107.3% | 108.9% | 110.2% | 111.5% | 112.6% | 113.5% | 114.4% |
| Relative COP | | 106.0% | 100.0% | 106.0% | 106.6% | 107.1% | 107.6% | 108.2% | 108.7% | 109.2% | 109.6% | 110.1% |
| Relative pressure drop | | 76.9% | 100.0% | 78.5% | 74.9% | 71.7% | 68.7% | 66.0% | 63.5% | 61.2% | 59.1% | 57.2% |

TABLE 18

Theoretical Performance Data of Selected R-32/R-152a/R-1234ze(E)/R-134a Blends Containing 8% R32 and 30% R134a

| | | | | | | | | | | | |
|---|---|---|---|---|---|---|---|---|---|---|---|
| R-32 (% b/w) | | | | 8 | 8 | 8 | 8 | 8 | 8 | 8 | 8 | 8 |
| R-134a (% b/w) | | | | 30 | 30 | 30 | 30 | 30 | 30 | 30 | 30 | 30 |
| R-152a (% b/w) | | | | 5 | 10 | 15 | 20 | 25 | 30 | 35 | 40 | 45 |
| R-1234ze(E) (% b/w) | | | | 57 | 52 | 47 | 42 | 37 | 32 | 27 | 22 | 17 |

| Calculation results | | COMPARATIVE DATA | | 8/30/ | 8/30/ | 8/30/ | 8/30/ | 8/30/ | 8/30/ | 8/30/ | 8/30/ | 8/30/ |
|---|---|---|---|---|---|---|---|---|---|---|---|---|
| | | 134a | R1234yf | 5/57 | 10/52 | 15/47 | 20/42 | 25/37 | 30/32 | 35/27 | 40/22 | 45/17 |
| Pressure ratio | | 5.79 | 5.24 | 5.71 | 5.69 | 5.68 | 5.68 | 5.68 | 5.68 | 5.69 | 5.70 | 5.71 |
| Volumetric efficiency | | 83.6% | 84.7% | 83.8% | 84.0% | 84.2% | 84.3% | 84.5% | 84.7% | 84.8% | 84.9% | 85.0% |
| condenser glide | K | 0.0 | 0.0 | 4.0 | 3.8 | 3.6 | 3.4 | 3.3 | 3.1 | 3.0 | 3.0 | 2.9 |
| Evaporator glide | K | 0.0 | 0.0 | 2.3 | 2.2 | 2.0 | 1.9 | 1.9 | 1.8 | 1.7 | 1.7 | 1.7 |
| Evaporator inlet T | °C. | 0.0 | 0.0 | −1.2 | −1.1 | −1.0 | −1.0 | −0.9 | −0.9 | −0.9 | −0.9 | −0.9 |
| Condenser exit T | °C. | 55.0 | 55.0 | 53.0 | 53.1 | 53.2 | 53.3 | 53.4 | 53.4 | 53.5 | 53.5 | 53.5 |
| Condenser pressure | bar | 16.88 | 16.46 | 17.03 | 17.15 | 17.26 | 17.34 | 17.40 | 17.44 | 17.47 | 17.48 | 17.49 |
| Evaporator pressure | bar | 2.92 | 3.14 | 2.98 | 3.01 | 3.04 | 3.05 | 3.06 | 3.07 | 3.07 | 3.07 | 3.06 |
| Refrigeration effect | kJ/kg | 123.76 | 94.99 | 127.62 | 132.54 | 137.59 | 142.76 | 148.05 | 153.46 | 158.98 | 164.60 | 170.32 |
| COP | | 2.03 | 1.91 | 2.03 | 2.04 | 2.05 | 2.06 | 2.07 | 2.08 | 2.09 | 2.10 | 2.10 |
| Discharge temperature | °C. | 99.15 | 92.88 | 99.23 | 100.79 | 102.34 | 103.90 | 105.45 | 106.99 | 108.53 | 110.06 | 111.59 |

TABLE 18-continued

Theoretical Performance Data of Selected R-32/R-152a/R-1234ze(E)/R-134a Blends Containing 8% R32 and 30% R134a

| | | | | | | | | | | | |
|---|---|---|---|---|---|---|---|---|---|---|---|
| Mass flow rate | kg/hr | 174.53 | 227.39 | 169.26 | 162.97 | 156.99 | 151.30 | 145.89 | 140.75 | 135.87 | 131.23 | 126.82 |
| Volumetric flow rate | m3/hr | 13.16 | 14.03 | 12.99 | 12.78 | 12.59 | 12.43 | 12.29 | 12.16 | 12.06 | 11.97 | 11.89 |
| Volumetric capacity | kJ/m3 | 1641 | 1540 | 1663 | 1691 | 1716 | 1738 | 1758 | 1776 | 1792 | 1805 | 1817 |
| Pressure drop | kPa/m | 953 | 1239 | 919 | 879 | 842 | 809 | 778 | 750 | 724 | 700 | 678 |
| Capacity relative to 1234yf | | 106.6% | 100.0% | 108.0% | 109.8% | 111.4% | 112.9% | 114.2% | 115.3% | 116.4% | 117.2% | 118.0% |
| Relative COP | | 106.0% | 100.0% | 106.1% | 106.6% | 107.2% | 107.7% | 108.2% | 108.7% | 109.1% | 109.6% | 110.1% |
| Relative pressure drop | | 76.9% | 100.0% | 74.2% | 70.9% | 68.0% | 65.3% | 62.8% | 60.5% | 58.4% | 56.5% | 54.7% |

TABLE 19

Theoretical Performance Data of Selected R-32/R-152a/R-1234ze(E)/R-134a Blends Containing 10% R32 and 30% R134a

| | | | | | | | | | | | |
|---|---|---|---|---|---|---|---|---|---|---|---|
| R-32 (% b/w) | | | | 10 | 10 | 10 | 10 | 10 | 10 | 10 | 10 | 10 |
| R-134a (% b/w) | | | | 30 | 30 | 30 | 30 | 30 | 30 | 30 | 30 | 30 |
| R-152a (% b/w) | | | | 5 | 10 | 15 | 20 | 25 | 30 | 35 | 40 | 45 |
| R-1234ze (E) (% b/w) | | | | 55 | 50 | 45 | 40 | 35 | 30 | 25 | 20 | 15 |

| Calculation results | | COMPARATIVE DATA | | 10/30/ | 10/30/ | 10/30/ | 10/30/ | 10/30/ | 10/30/ | 10/30/ | 10/30/ | 10/30/ |
|---|---|---|---|---|---|---|---|---|---|---|---|---|
| | | 134a | R1234yf | 5/55 | 10/50 | 15/45 | 20/40 | 25/35 | 30/30 | 35/25 | 40/20 | 45/15 |
| Pressure ratio | | 5.79 | 5.24 | 5.70 | 5.68 | 5.68 | 5.67 | 5.67 | 5.68 | 5.68 | 5.69 | 5.70 |
| Volumetric efficiency | | 83.6% | 84.7% | 83.9% | 84.1% | 84.3% | 84.5% | 84.6% | 84.8% | 84.9% | 85.0% | 85.1% |
| condenser glide | K | 0.0 | 0.0 | 4.5 | 4.3 | 4.1 | 3.9 | 3.8 | 3.6 | 3.5 | 3.5 | 3.4 |
| Evaporator glide | K | 0.0 | 0.0 | 2.7 | 2.5 | 2.4 | 2.3 | 2.2 | 2.2 | 2.1 | 2.1 | 2.1 |
| Evaporator inlet T | °C. | 0.0 | 0.0 | −1.3 | −1.3 | −1.2 | −1.2 | −1.1 | −1.1 | −1.1 | −1.0 | −1.0 |
| Condenser exit T | °C. | 55.0 | 55.0 | 52.7 | 52.9 | 53.0 | 53.0 | 53.1 | 53.2 | 53.2 | 53.3 | 53.3 |
| Condenser pressure | bar | 16.88 | 16.46 | 17.64 | 17.75 | 17.84 | 17.91 | 17.95 | 17.98 | 18.00 | 18.00 | 17.99 |
| Evaporator pressure | bar | 2.92 | 3.14 | 3.10 | 3.12 | 3.14 | 3.16 | 3.16 | 3.17 | 3.17 | 3.16 | 3.15 |
| Refrigeration effect | kJ/kg | 123.76 | 94.99 | 130.30 | 135.24 | 140.30 | 145.49 | 150.81 | 156.24 | 161.79 | 167.44 | 173.18 |
| COP | | 2.03 | 1.91 | 2.03 | 2.04 | 2.05 | 2.06 | 2.07 | 2.08 | 2.09 | 2.09 | 2.10 |
| Discharge temperature | °C. | 99.15 | 92.88 | 100.95 | 102.49 | 104.03 | 105.57 | 107.11 | 108.64 | 110.17 | 111.69 | 113.21 |
| Mass flow rate | kg/hr | 174.53 | 227.39 | 165.77 | 159.72 | 153.95 | 148.46 | 143.23 | 138.24 | 133.51 | 129.00 | 124.72 |
| Volumetric flow rate | m3/hr | 13.16 | 14.03 | 12.50 | 12.31 | 12.14 | 12.00 | 11.88 | 11.77 | 11.68 | 11.60 | 11.53 |
| Volumetric capacity | kJ/m3 | 1641 | 1540 | 1729 | 1755 | 1779 | 1800 | 1819 | 1835 | 1850 | 1862 | 1873 |
| Pressure drop | kPa/m | 953 | 1239 | 871 | 834 | 800 | 770 | 742 | 716 | 692 | 670 | 649 |
| GWP (TAR) | | | | 454 | 460 | 466 | 471 | 477 | 483 | 489 | 494 | 500 |
| F/(F + H) | | | | 0.619 | 0.596 | 0.574 | 0.553 | 0.533 | 0.515 | 0.498 | 0.481 | 0.465 |
| Capacity relative to 1234yf | | 106.6% | 100.0% | 112.3% | 114.0% | 115.5% | 116.9% | 118.1% | 119.2% | 120.1% | 120.9% | 121.6% |
| Relative COP | | 106.0% | 100.0% | 106.2% | 106.7% | 107.2% | 107.7% | 108.2% | 108.6% | 109.1% | 109.6% | 110.0% |
| Relative pressure drop | | 76.9% | 100.0% | 70.3% | 67.3% | 64.6% | 62.1% | 59.9% | 57.8% | 55.8% | 54.0% | 52.4% |

TABLE 20

Theoretical Performance Data of Selected R-32/R-152a/R-1234ze(E)/R-134a Blends Containing 12% R32 and 30% R134a

| | | | | 12 | 12 | 12 | 12 | 12 | 12 | 12 | 12 | 12 |
|---|---|---|---|---|---|---|---|---|---|---|---|---|
| R-32 (% b/w) | | | | | | | | | | | | |
| R-134a (% b/w) | | | | 30 | 30 | 30 | 30 | 30 | 30 | 30 | 30 | 30 |
| R-152a (% b/w) | | | | 5 | 10 | 15 | 20 | 25 | 30 | 35 | 40 | 45 |
| R-1234ze(E) (% b/w) | | | | 53 | 48 | 43 | 38 | 33 | 28 | 23 | 18 | 13 |

| Calculation results | | COMPARATIVE DATA | | 12/30/ 5/53 | 12/30/ 10/48 | 12/30/ 15/43 | 12/30/ 20/38 | 12/30/ 25/33 | 12/30/ 30/28 | 12/30/ 35/23 | 12/30/ 40/18 | 12/30/ 45/13 |
|---|---|---|---|---|---|---|---|---|---|---|---|---|
| | | 134a | R1234yf | | | | | | | | | |
| Pressure ratio | | 5.79 | 5.24 | 5.68 | 5.67 | 5.67 | 5.66 | 5.67 | 5.67 | 5.68 | 5.69 | 5.70 |
| Volumetric efficiency | | 83.6% | 84.7% | 84.1% | 84.3% | 84.5% | 84.6% | 84.8% | 84.9% | 85.0% | 85.2% | 85.3% |
| condenser glide | K | 0.0 | 0.0 | 5.0 | 4.7 | 4.5 | 4.3 | 4.2 | 4.1 | 4.0 | 3.9 | 3.9 |
| Evaporator glide | K | 0.0 | 0.0 | 3.0 | 2.9 | 2.7 | 2.6 | 2.6 | 2.5 | 2.5 | 2.4 | 2.4 |
| Evaporator inlet T | °C. | 0.0 | 0.0 | −1.5 | −1.4 | −1.4 | −1.3 | −1.3 | −1.2 | −1.2 | −1.2 | −1.2 |
| Condenser exit T | °C. | 55.0 | 55.0 | 52.5 | 52.6 | 52.7 | 52.8 | 52.9 | 53.0 | 53.0 | 53.0 | 53.1 |
| Condenser pressure | bar | 16.88 | 16.46 | 18.25 | 18.34 | 18.42 | 18.47 | 18.50 | 18.52 | 18.52 | 18.51 | 18.49 |
| Evaporator pressure | bar | 2.92 | 3.14 | 3.21 | 3.23 | 3.25 | 3.26 | 3.27 | 3.27 | 3.26 | 3.25 | 3.24 |
| Refrigeration effect | kJ/kg | 123.76 | 94.99 | 132.92 | 137.87 | 142.95 | 148.17 | 153.51 | 158.97 | 164.54 | 170.22 | 176.00 |
| COP | | 2.03 | 1.91 | 2.03 | 2.04 | 2.05 | 2.06 | 2.07 | 2.08 | 2.09 | 2.09 | 2.10 |
| Discharge temperature | °C. | 99.15 | 92.88 | 102.64 | 104.17 | 105.69 | 107.22 | 108.74 | 110.26 | 111.78 | 113.30 | 114.80 |
| Mass flow rate | kg/hr | 174.53 | 227.39 | 162.50 | 156.67 | 151.10 | 145.78 | 140.71 | 135.87 | 131.27 | 126.89 | 122.73 |
| Volumetric flow rate | m3/hr | 13.16 | 14.03 | 12.04 | 11.87 | 11.73 | 11.60 | 11.49 | 11.40 | 11.32 | 11.26 | 11.20 |
| Volumetric capacity | kJ/m3 | 1641 | 1540 | 1794 | 1819 | 1842 | 1862 | 1879 | 1894 | 1908 | 1919 | 1929 |
| Pressure drop | kPa/m | 953 | 1239 | 826 | 793 | 762 | 734 | 708 | 684 | 662 | 642 | 623 |
| GWP (TAR) | | | | 465 | 471 | 477 | 482 | 488 | 494 | 499 | 505 | 511 |
| F/(F + H) | | | | 0.615 | 0.592 | 0.570 | 0.550 | 0.531 | 0.512 | 0.495 | 0.479 | 0.463 |
| Capacity relative to 1234yf | | 106.6% | 100.0% | 116.5% | 118.2% | 119.6% | 120.9% | 122.0% | 123.0% | 123.9% | 124.6% | 125.3% |
| Relative COP | | 106.0% | 100.0% | 106.2% | 106.7% | 107.2% | 107.7% | 108.1% | 108.6% | 109.1% | 109.5% | 109.9% |
| Relative pressure drop | | 76.9% | 100.0% | 66.7% | 64.0% | 61.5% | 59.3% | 57.2% | 55.2% | 53.5% | 51.8% | 50.3% |

TABLE 20A

Theoretical Performance Data of Selected R-32/R-152a/R-1234ze(E)/R-134a Blends Containing 15% R32 and 30% R134a

| | | | | 15 | 15 | 15 | 15 | 15 | 15 | 15 | 15 | 15 |
|---|---|---|---|---|---|---|---|---|---|---|---|---|
| R-32 (% b/w) | | | | | | | | | | | | |
| R-134a (% b/w) | | | | 30 | 30 | 30 | 30 | 30 | 30 | 30 | 30 | 30 |
| R-152a (% b/w) | | | | 30 | 30 | 30 | 30 | 30 | 30 | 30 | 30 | 30 |
| R-1234ze(E) (% b/w) | | | | 50 | 45 | 40 | 35 | 30 | 25 | 20 | 15 | 10 |

| Calculation results | | COMPARATIVE DATA | | 15/30/ 5/50 | 15/30/ 10/45 | 15/30/ 15/40 | 15/30/ 20/35 | 15/30/ 25/30 | 15/30/ 30/25 | 15/30/ 35/20 | 15/30/ 40/15 | 15/30/ 45/10 |
|---|---|---|---|---|---|---|---|---|---|---|---|---|
| | | 134a | R1234yf | | | | | | | | | |
| Pressure ratio | | 5.79 | 5.24 | 5.66 | 5.65 | 5.65 | 5.65 | 5.65 | 5.65 | 5.66 | 5.67 | 5.69 |

TABLE 20A-continued

Theoretical Performance Data of Selected R-32/R-152a/R-1234ze(E)/R-134a Blends Containing 15% R32 and 30% R134a

| | | | | | | | | | | | | |
|---|---|---|---|---|---|---|---|---|---|---|---|---|
| Volumetric efficiency | | 83.6% | 84.7% | 84.4% | 84.6% | 84.7% | 84.9% | 85.0% | 85.1% | 85.3% | 85.4% | 85.5% |
| condenser glide | K | 0.0 | 0.0 | 5.5 | 5.2 | 5.0 | 4.8 | 4.7 | 4.6 | 4.5 | 4.5 | 4.4 |
| Evaporator glide | K | 0.0 | 0.0 | 3.5 | 3.3 | 3.2 | 3.1 | 3.0 | 3.0 | 2.9 | 2.9 | 2.9 |
| Evaporator inlet temperature | °C. | 0.0 | 0.0 | −1.8 | −1.7 | −1.6 | −1.5 | −1.5 | −1.5 | −1.5 | −1.5 | −1.5 |
| Condenser exit temperature | °C. | 55.0 | 55.0 | 52.3 | 52.4 | 52.5 | 52.6 | 52.7 | 52.7 | 52.7 | 52.8 | 52.8 |
| Condenser pressure | bar | 16.88 | 16.46 | 19.15 | 19.22 | 19.27 | 19.30 | 19.31 | 19.31 | 19.29 | 19.27 | 19.23 |
| Evaporator pressure | bar | 2.92 | 3.14 | 3.38 | 3.40 | 3.41 | 3.42 | 3.42 | 3.42 | 3.41 | 3.40 | 3.38 |
| Refrigeration effect | kJ/kg | 123.76 | 94.99 | 136.71 | 141.69 | 146.81 | 152.06 | 157.45 | 162.96 | 168.58 | 174.31 | 180.13 |
| COP | | 2.03 | 1.91 | 2.03 | 2.04 | 2.05 | 2.06 | 2.07 | 2.07 | 2.08 | 2.09 | 2.10 |
| Discharge temperature | °C. | 99.15 | 92.88 | 105.12 | 106.62 | 108.12 | 109.63 | 111.14 | 112.65 | 114.15 | 115.65 | 117.15 |
| Mass flow rate | kg/hr | 174.53 | 227.39 | 157.99 | 152.44 | 147.13 | 142.05 | 137.19 | 132.55 | 128.13 | 123.92 | 119.91 |
| Volumetric flow rate | m3/hr | 13.16 | 14.03 | 11.42 | 11.28 | 11.16 | 11.06 | 10.97 | 10.89 | 10.83 | 10.78 | 10.74 |
| Volumetric capacity | kJ/m3 | 1641 | 1540 | 1892 | 1915 | 1935 | 1953 | 1969 | 1983 | 1994 | 2004 | 2012 |
| Pressure drop | kPa/m | 953 | 1239 | 767 | 738 | 711 | 686 | 663 | 642 | 622 | 604 | 587 |
| GWP (TAR BASIS) | | | | 482 | 487 | 493 | 499 | 504 | 510 | 516 | 521 | 527 |
| F/(F + H) | | | | 0.609 | 0.587 | 0.565 | 0.545 | 0.526 | 0.508 | 0.492 | 0.475 | 0.460 |
| Capacity relative to 1234yf | | 106.6% | 100.0% | 122.9% | 124.4% | 125.7% | 126.9% | 127.9% | 128.8% | 129.5% | 130.1% | 130.7% |
| Relative COP | | 106.0% | 100.0% | 106.2% | 106.7% | 107.1% | 107.6% | 108.1% | 108.5% | 109.0% | 109.4% | 109.8% |
| Relative pressure drop | | 76.9% | 100.0% | 61.9% | 59.6% | 57.4% | 55.4% | 53.5% | 51.8% | 50.2% | 48.7% | 47.4% |

TABLE 21

Theoretical Performance Data of Selected R-32/R-152a/R-1234ze(E)/R-134a Blends Containing 4% R32 and 35% R134a

| | | | | | | | | | | |
|---|---|---|---|---|---|---|---|---|---|---|
| R-32 (% b/w) | | | | 4 | 4 | 4 | 4 | 4 | 4 | 4 | 4 | 4 |
| R-134a (% b/w) | | | | 35 | 35 | 35 | 35 | 35 | 35 | 35 | 35 | 35 |
| R-152a (% b/w) | | | | 5 | 10 | 15 | 20 | 25 | 30 | 35 | 40 | 45 |
| R-1234ze(E) (% b/w) | | | | 56 | 51 | 46 | 41 | 36 | 31 | 26 | 21 | 16 |

| Calculation results | | COMPARATIVE DATA | | 4/35/ | 4/35/ | 4/35/ | 4/35/ | 4/35/ | 4/35/ | 4/35/ | 4/35/ | 4/35/ |
|---|---|---|---|---|---|---|---|---|---|---|---|---|
| | | 134a | R1234yf | 5/56 | 10/51 | 15/46 | 20/41 | 25/36 | 30/31 | 35/26 | 40/21 | 45/16 |
| Pressure ratio | | 5.79 | 5.24 | 5.70 | 5.69 | 5.68 | 5.68 | 5.68 | 5.69 | 5.70 | 5.70 | 5.72 |
| Volumetric efficiency | | 83.6% | 84.7% | 83.6% | 83.8% | 84.0% | 84.1% | 84.3% | 84.5% | 84.6% | 84.7% | 84.8% |
| condenser glide | K | 0.0 | 0.0 | 2.5 | 2.4 | 2.2 | 2.0 | 1.9 | 1.8 | 1.8 | 1.7 | 1.7 |
| Evaporator glide | K | 0.0 | 0.0 | 1.4 | 1.3 | 1.2 | 1.1 | 1.0 | 1.0 | 0.9 | 0.9 | 0.9 |
| Evaporator inlet T | °C. | 0.0 | 0.0 | −0.7 | −0.6 | −0.6 | −0.5 | −0.5 | −0.5 | −0.5 | −0.5 | −0.5 |
| Condenser exit T | °C. | 55.0 | 55.0 | 53.7 | 53.8 | 53.9 | 54.0 | 54.0 | 54.1 | 54.1 | 54.1 | 54.2 |
| Condenser pressure | bar | 16.88 | 16.46 | 16.03 | 16.17 | 16.28 | 16.37 | 16.44 | 16.50 | 16.54 | 16.56 | 16.57 |
| Evaporator pressure | bar | 2.92 | 3.14 | 2.81 | 2.84 | 2.86 | 2.88 | 2.89 | 2.90 | 2.90 | 2.90 | 2.90 |

TABLE 21-continued

Theoretical Performance Data of Selected R-32/R-152a/R-1234ze(E)/R-134a Blends Containing 4% R32 and 35% R134a

| | | | | | | | | | | | |
|---|---|---|---|---|---|---|---|---|---|---|---|
| Refrigeration effect | kJ/kg | 123.76 | 94.99 | 122.44 | 127.44 | 132.56 | 137.80 | 143.15 | 148.61 | 154.18 | 159.83 | 165.58 |
| COP | | 2.03 | 1.91 | 2.02 | 2.04 | 2.05 | 2.06 | 2.07 | 2.08 | 2.09 | 2.10 | 2.11 |
| Discharge temperature | °C. | 99.15 | 92.88 | 96.18 | 97.80 | 99.41 | 101.01 | 102.61 | 104.19 | 105.77 | 107.34 | 108.90 |
| Mass flow rate | kg/hr | 174.53 | 227.39 | 176.41 | 169.49 | 162.94 | 156.75 | 150.89 | 145.34 | 140.10 | 135.14 | 130.45 |
| Volumetric flow rate | m3/hr | 13.16 | 14.03 | 13.88 | 13.63 | 13.41 | 13.21 | 13.05 | 12.90 | 12.78 | 12.67 | 12.57 |
| Volumetric capacity | kJ/m3 | 1641 | 1540 | 1557 | 1585 | 1611 | 1635 | 1656 | 1674 | 1691 | 1705 | 1718 |
| Pressure drop | kPa/m | 953 | 1239 | 1013 | 965 | 922 | 883 | 847 | 815 | 785 | 757 | 732 |
| GWP (TAR) | | | | 486 | 492 | 498 | 503 | 509 | 515 | 521 | 526 | 532 |
| F/(F + H) | | | | 0.632 | 0.607 | 0.584 | 0.563 | 0.543 | 0.524 | 0.506 | 0.489 | 0.473 |
| Capacity relative to 1234yf | | 106.6% | 100.0% | 101.1% | 103.0% | 104.6% | 106.2% | 107.5% | 108.7% | 109.8% | 110.8% | 111.6% |
| Relative COP | | 106.0% | 100.0% | 105.9% | 106.4% | 107.0% | 107.6% | 108.1% | 108.7% | 109.2% | 109.7% | 110.2% |
| Relative pressure drop | | 76.9% | 100.0% | 81.8% | 77.9% | 74.4% | 71.3% | 68.4% | 65.7% | 63.3% | 61.1% | 59.1% |

TABLE 22

Theoretical Performance Data of Selected R-32/R-152a/R-1234ze(E)/R-134a Blends Containing 6% R32 and 35% R134a

| | | | | | | | | | | |
|---|---|---|---|---|---|---|---|---|---|---|
| R-32 (% b/w) | | | | 6 | 6 | 6 | 6 | 6 | 6 | 6 | 6 | 6 |
| R-134a (% b/w) | | | | 35 | 35 | 35 | 35 | 35 | 35 | 35 | 35 | 35 |
| R-152a (% b/w) | | | | 5 | 10 | 15 | 20 | 25 | 30 | 35 | 40 | 45 |
| R-1234ze (E) (% b/w) | | | | 54 | 49 | 44 | 39 | 34 | 29 | 24 | 19 | 14 |

| Calculation results | | COMPARATIVE DATA | | 6/35/ 5/54 | 6/35/ 10/49 | 6/35/ 15/44 | 6/35/ 20/39 | 6/35/ 25/34 | 6/35/ 30/29 | 6/35/ 35/24 | 6/35/ 40/19 | 6/35/ 45/14 |
|---|---|---|---|---|---|---|---|---|---|---|---|---|
| | | 134a | R1234yf | | | | | | | | | |
| Pressure ratio | | 5.79 | 5.24 | 5.70 | 5.69 | 5.68 | 5.68 | 5.69 | 5.69 | 5.70 | 5.71 | 5.72 |
| Volumetric efficiency | | 83.6% | 84.7% | 83.7% | 83.9% | 84.1% | 84.3% | 84.4% | 84.6% | 84.7% | 84.8% | 84.9% |
| condenser glide | K | 0.0 | 0.0 | 3.2 | 3.0 | 2.8 | 2.7 | 2.6 | 2.5 | 2.4 | 2.3 | 2.3 |
| Evaporator glide | K | 0.0 | 0.0 | 1.8 | 1.7 | 1.6 | 1.5 | 1.4 | 1.4 | 1.3 | 1.3 | 1.3 |
| Evaporator inlet T | °C. | 0.0 | 0.0 | −0.9 | −0.8 | −0.8 | −0.7 | −0.7 | −0.7 | −0.7 | −0.7 | −0.7 |
| Condenser exit T | °C. | 55.0 | 55.0 | 53.4 | 53.5 | 53.6 | 53.7 | 53.7 | 53.8 | 53.8 | 53.8 | 53.8 |
| Condenser pressure | bar | 16.88 | 16.46 | 16.65 | 16.78 | 16.87 | 16.95 | 17.01 | 17.05 | 17.07 | 17.09 | 17.09 |
| Evaporator pressure | bar | 2.92 | 3.14 | 2.92 | 2.95 | 2.97 | 2.98 | 2.99 | 3.00 | 3.00 | 2.99 | 2.99 |
| Refrigeration effect | kJ/kg | 123.76 | 94.99 | 125.29 | 130.29 | 135.43 | 140.68 | 146.06 | 151.54 | 157.13 | 162.81 | 168.59 |
| COP | | 2.03 | 1.91 | 2.03 | 2.04 | 2.05 | 2.06 | 2.07 | 2.08 | 2.09 | 2.10 | 2.11 |
| Discharge temperature | °C. | 99.15 | 92.88 | 97.99 | 99.59 | 101.18 | 102.76 | 104.34 | 105.92 | 107.48 | 109.04 | 110.59 |
| Mass flow rate | kg/hr | 174.53 | 227.39 | 172.41 | 165.78 | 159.49 | 153.54 | 147.89 | 142.54 | 137.47 | 132.67 | 128.12 |
| Volumetric flow rate | m3/hr | 13.16 | 14.03 | 13.31 | 13.09 | 12.90 | 12.73 | 12.59 | 12.46 | 12.35 | 12.26 | 12.18 |
| Volumetric capacity | kJ/m3 | 1641 | 1540 | 1622 | 1650 | 1674 | 1696 | 1716 | 1734 | 1749 | 1762 | 1774 |
| Pressure drop | kPa/m | 953 | 1239 | 955 | 912 | 873 | 838 | 805 | 775 | 748 | 723 | 699 |
| GWP (TAR) | | | | 497 | 503 | 509 | 514 | 520 | 526 | 531 | 537 | 543 |
| F/(F + H) | | | | 0.627 | 0.603 | 0.581 | 0.560 | 0.540 | 0.521 | 0.503 | 0.487 | 0.471 |

TABLE 22-continued

Theoretical Performance Data of Selected R-32/R-152a/R-1234ze(E)/R-134a Blends Containing 6% R32 and 35% R134a

| | | | | | | | | | | |
|---|---|---|---|---|---|---|---|---|---|---|
| Capacity relative to 1234yf | 106.6% | 100.0% | 105.4% | 107.1% | 108.7% | 110.2% | 111.5% | 112.6% | 113.6% | 114.5% | 115.2% |
| Relative COP | 106.0% | 100.0% | 106.0% | 106.5% | 107.1% | 107.6% | 108.2% | 108.7% | 109.2% | 109.7% | 110.2% |
| Relative pressure drop | 76.9% | 100.0% | 77.1% | 73.6% | 70.5% | 67.6% | 65.0% | 62.6% | 60.4% | 58.3% | 56.4% |

TABLE 23

Theoretical Performance Data of Selected R-32/R-152a/R-1234ze(E)/R-134a Blends Containing 8% R32 and 35% R134a

| | | | | | | | | | | |
|---|---|---|---|---|---|---|---|---|---|---|
| R-32 (% b/w) | | | 8 | 8 | 8 | 8 | 8 | 8 | 8 | 8 | 8 |
| R-134a (% b/w) | | | 35 | 35 | 35 | 35 | 35 | 35 | 35 | 35 | 35 |
| R-152a (% b/w) | | | 5 | 10 | 15 | 20 | 25 | 30 | 35 | 40 | 45 |
| R-1234ze (E) (% b/w) | | | 52 | 47 | 42 | 37 | 32 | 27 | 22 | 17 | 12 |

| Calculation results | | COMPARATIVE DATA | | 8/35/ 5/52 | 8/35/ 10/47 | 8/35/ 15/42 | 8/35/ 20/37 | 8/35/ 25/32 | 8/35/ 30/27 | 8/35/ 35/22 | 8/35/ 40/17 | 8/35/ 45/12 |
|---|---|---|---|---|---|---|---|---|---|---|---|---|
| | | 134a | R1234yf | | | | | | | | | |
| Pressure ratio | | 5.79 | 5.24 | 5.69 | 5.69 | 5.68 | 5.68 | 5.68 | 5.69 | 5.70 | 5.71 | 5.72 |
| Volumetric efficiency | | 83.6% | 84.7% | 83.8% | 84.0% | 84.2% | 84.4% | 84.5% | 84.7% | 84.8% | 84.9% | 85.0% |
| condenser glide | K | 0.0 | 0.0 | 3.8 | 3.6 | 3.4 | 3.3 | 3.1 | 3.0 | 3.0 | 2.9 | 2.9 |
| Evaporator glide | K | 0.0 | 0.0 | 2.2 | 2.1 | 1.9 | 1.9 | 1.8 | 1.7 | 1.7 | 1.7 | 1.7 |
| Evaporator inlet T | °C. | 0.0 | 0.0 | −1.1 | −1.0 | −1.0 | −0.9 | −0.9 | −0.9 | −0.9 | −0.8 | −0.8 |
| Condenser exit T | °C. | 55.0 | 55.0 | 53.1 | 53.2 | 53.3 | 53.4 | 53.4 | 53.5 | 53.5 | 53.5 | 53.6 |
| Condenser pressure | bar | 16.88 | 16.46 | 17.27 | 17.38 | 17.46 | 17.52 | 17.57 | 17.59 | 17.61 | 17.60 | 17.59 |
| Evaporator pressure | bar | 2.92 | 3.14 | 3.03 | 3.06 | 3.07 | 3.08 | 3.09 | 3.09 | 3.09 | 3.08 | 3.08 |
| Refrigeration effect | kJ/kg | 123.76 | 94.99 | 128.04 | 133.07 | 138.22 | 143.49 | 148.89 | 154.40 | 160.01 | 165.73 | 171.53 |
| COP | | 2.03 | 1.91 | 2.03 | 2.04 | 2.05 | 2.06 | 2.07 | 2.08 | 2.09 | 2.10 | 2.11 |
| Discharge temperature | °C. | 99.15 | 92.88 | 99.75 | 101.33 | 102.90 | 104.47 | 106.04 | 107.60 | 109.16 | 110.71 | 112.25 |
| Mass flow rate | kg/hr | 174.53 | 227.39 | 168.69 | 162.33 | 156.28 | 150.53 | 145.07 | 139.90 | 134.99 | 130.33 | 125.92 |
| Volumetric flow rate | m3/hr | 13.16 | 14.03 | 12.80 | 12.60 | 12.43 | 12.29 | 12.16 | 12.05 | 11.95 | 11.87 | 11.80 |
| Volumetric capacity | kJ/m3 | 1641 | 1540 | 1688 | 1714 | 1737 | 1758 | 1777 | 1793 | 1807 | 1819 | 1830 |
| Pressure drop | kPa/m | 953 | 1239 | 903 | 864 | 829 | 796 | 767 | 739 | 714 | 691 | 669 |
| GWP (TAR BASIS) | | | | 508 | 514 | 520 | 525 | 531 | 537 | 542 | 548 | 554 |
| F/(F + H) | | | | 0.623 | 0.600 | 0.578 | 0.557 | 0.537 | 0.518 | 0.501 | 0.484 | 0.468 |
| Capacity relative to 1234yf | | 106.6% | 100.0% | 109.6% | 111.3% | 112.8% | 114.2% | 115.4% | 116.4% | 117.4% | 118.2% | 118.8% |
| Relative COP | | 106.0% | 100.0% | 106.0% | 106.6% | 107.1% | 107.7% | 108.2% | 108.7% | 109.2% | 109.7% | 110.1% |
| Relative pressure drop | | 76.9% | 100.0% | 72.9% | 69.8% | 66.9% | 64.3% | 61.9% | 59.7% | 57.6% | 55.8% | 54.0% |

TABLE 24

Theoretical Performance Data of Selected R-32/R-152a/R-1234ze(E)/R-134a Blends Containing 10% R32 and 35% R134a

| | | | | 10/35/ | 10/35/ | 10/35/ | 10/35/ | 10/35/ | 10/35/ | 10/35/ | 10/35/ | 10/35/ |
|---|---|---|---|---|---|---|---|---|---|---|---|---|
| R-32 (% b/w) | | | | 10 | 10 | 10 | 10 | 10 | 10 | 10 | 10 | 10 |
| R-134a (% b/w) | | | | 35 | 35 | 35 | 35 | 35 | 35 | 35 | 35 | 35 |
| R-152a (% b/w) | | | | 5 | 10 | 15 | 20 | 25 | 30 | 35 | 40 | 45 |
| R-1234ze(E) (% b/w) | | | | 50 | 45 | 40 | 35 | 30 | 25 | 20 | 15 | 10 |
| Calculation results | | COMPARATIVE DATA 134a | R1234yf | 5/50 | 10/45 | 15/40 | 20/35 | 25/30 | 30/25 | 35/20 | 40/15 | 45/10 |
| Pressure ratio | | 5.79 | 5.24 | 5.69 | 5.68 | 5.67 | 5.67 | 5.68 | 5.68 | 5.69 | 5.70 | 5.72 |
| Volumetric efficiency | | 83.6% | 84.7% | 84.0% | 84.2% | 84.4% | 84.5% | 84.7% | 84.8% | 84.9% | 85.0% | 85.1% |
| condenser glide | K | 0.0 | 0.0 | 4.3 | 4.1 | 3.9 | 3.7 | 3.6 | 3.5 | 3.4 | 3.4 | 3.4 |
| Evaporator glide | K | 0.0 | 0.0 | 2.6 | 2.4 | 2.3 | 2.2 | 2.1 | 2.1 | 2.1 | 2.1 | 2.1 |
| Evaporator inlet T | °C. | 0.0 | 0.0 | −1.3 | −1.2 | −1.1 | −1.1 | −1.1 | −1.0 | −1.0 | −1.0 | −1.0 |
| Condenser exit T | °C. | 55.0 | 55.0 | 52.8 | 53.0 | 53.1 | 53.1 | 53.2 | 53.2 | 53.3 | 53.3 | 53.3 |
| Condenser pressure | bar | 16.88 | 16.46 | 17.88 | 17.97 | 18.04 | 18.09 | 18.12 | 18.13 | 18.13 | 18.12 | 18.09 |
| Evaporator pressure | bar | 2.92 | 3.14 | 3.14 | 3.17 | 3.18 | 3.19 | 3.19 | 3.19 | 3.18 | 3.18 | 3.17 |
| Refrigeration effect | kJ/kg | 123.76 | 94.99 | 130.73 | 135.76 | 140.93 | 146.24 | 151.66 | 157.20 | 162.84 | 168.58 | 174.42 |
| COP | | 2.03 | 1.91 | 2.03 | 2.04 | 2.05 | 2.06 | 2.07 | 2.08 | 2.09 | 2.10 | 2.10 |
| Discharge temperature | °C. | 99.15 | 92.88 | 101.48 | 103.04 | 104.59 | 106.15 | 107.71 | 109.26 | 110.80 | 112.34 | 113.87 |
| Mass flow rate | kg/hr | 174.53 | 227.39 | 165.23 | 159.10 | 153.26 | 147.71 | 142.43 | 137.41 | 132.65 | 128.13 | 123.84 |
| Volumetric flow rate | m3/hr | 13.16 | 14.03 | 12.32 | 12.15 | 12.00 | 11.87 | 11.76 | 11.66 | 11.58 | 11.51 | 11.46 |
| Volumetric capacity | kJ/m3 | 1641 | 1540 | 1753 | 1778 | 1800 | 1820 | 1837 | 1852 | 1865 | 1876 | 1885 |
| Pressure drop | kPa/m | 953 | 1239 | 856 | 821 | 788 | 759 | 731 | 706 | 683 | 661 | 641 |
| GWP (TAR) | | | | 519 | 525 | 530 | 536 | 542 | 548 | 553 | 559 | 565 |
| F/(F + H) | | | | 0.619 | 0.596 | 0.574 | 0.554 | 0.534 | 0.516 | 0.498 | 0.482 | 0.466 |
| Capacity relative to 1234yf | | 106.6% | 100.0% | 113.9% | 115.5% | 116.9% | 118.2% | 119.3% | 120.3% | 121.1% | 121.8% | 122.5% |
| Relative COP | | 106.0% | 100.0% | 106.1% | 106.6% | 107.1% | 107.7% | 108.2% | 108.7% | 109.1% | 109.6% | 110.1% |
| Relative pressure drop | | 76.9% | 100.0% | 69.1% | 66.2% | 63.6% | 61.2% | 59.0% | 57.0% | 55.1% | 53.4% | 51.8% |

TABLE 25

Theoretical Performance Data of Selected R-32/R-152a/R-1234ze(E)/R-134a Blends Containing 12% R32 and 35% R134a

| | | | 12/35/ | 12/35/ | 12/35/ | 12/35/ | 12/35/ | 12/35/ | 12/35/ | 12/35/ | 12/35/ |
|---|---|---|---|---|---|---|---|---|---|---|---|
| R-32 (% b/w) | | | 12 | 12 | 12 | 12 | 12 | 12 | 12 | 12 | 12 |
| R-134a (% b/w) | | | 35 | 35 | 35 | 35 | 35 | 35 | 35 | 35 | 35 |
| R-152a (% b/w) | | | 5 | 10 | 15 | 20 | 25 | 30 | 35 | 40 | 45 |
| R-1234ze(E) (% b/w) | | | 48 | 43 | 38 | 33 | 28 | 23 | 18 | 13 | 8 |
| Calculation results | COMPARATIVE DATA 134a | R1234yf | 5/48 | 10/43 | 15/38 | 20/33 | 25/28 | 30/23 | 35/18 | 40/13 | 45/8 |
| Pressure ratio | 5.79 | 5.24 | 5.67 | 5.67 | 5.66 | 5.66 | 5.67 | 5.68 | 5.69 | 5.70 | 5.71 |

TABLE 25-continued

Theoretical Performance Data of Selected R-32/R-152a/R-1234ze(E)/R-134a Blends Containing 12% R32 and 35% R134a

| | | | | | | | | | | | |
|---|---|---|---|---|---|---|---|---|---|---|---|
| Volumetric efficiency | | 83.6% | 84.7% | 84.2% | 84.4% | 84.5% | 84.7% | 84.8% | 85.0% | 85.1% | 85.2% | 85.3% |
| condenser glide | K | 0.0 | 0.0 | 4.7 | 4.5 | 4.3 | 4.1 | 4.0 | 3.9 | 3.9 | 3.8 | 3.8 |
| Evaporator glide | K | 0.0 | 0.0 | 2.9 | 2.7 | 2.6 | 2.5 | 2.5 | 2.4 | 2.4 | 2.4 | 2.4 |
| Evaporator inlet T | °C. | 0.0 | 0.0 | −1.4 | −1.4 | −1.3 | −1.3 | −1.2 | −1.2 | −1.2 | −1.2 | −1.2 |
| Condenser exit T | °C. | 55.0 | 55.0 | 52.6 | 52.8 | 52.9 | 52.9 | 53.0 | 53.0 | 53.1 | 53.1 | 53.1 |
| Condenser pressure | bar | 16.88 | 16.46 | 18.48 | 18.56 | 18.61 | 18.65 | 18.66 | 18.66 | 18.65 | 18.62 | 18.59 |
| Evaporator pressure | bar | 2.92 | 3.14 | 3.26 | 3.28 | 3.29 | 3.29 | 3.29 | 3.29 | 3.28 | 3.27 | 3.25 |
| Refrigeration effect | kJ/kg | 123.76 | 94.99 | 133.34 | 138.39 | 143.59 | 148.92 | 154.37 | 159.94 | 165.61 | 171.39 | 177.25 |
| COP | | 2.03 | 1.91 | 2.03 | 2.04 | 2.05 | 2.06 | 2.07 | 2.08 | 2.09 | 2.09 | 2.10 |
| Discharge temperature | °C. | 99.15 | 92.88 | 103.16 | 104.71 | 106.25 | 107.80 | 109.34 | 110.88 | 112.42 | 113.95 | 115.47 |
| Mass flow rate | kg/hr | 174.53 | 227.39 | 162.00 | 156.08 | 150.43 | 145.05 | 139.93 | 135.05 | 130.43 | 126.03 | 121.86 |
| Volumetric flow rate | m3/hr | 13.16 | 14.03 | 11.88 | 11.73 | 11.60 | 11.48 | 11.39 | 11.31 | 11.24 | 11.18 | 11.13 |
| Volumetric capacity | kJ/m3 | 1641 | 1540 | 1818 | 1842 | 1863 | 1881 | 1897 | 1911 | 1922 | 1932 | 1941 |
| Pressure drop | kPa/m | 953 | 1239 | 814 | 781 | 751 | 724 | 699 | 675 | 654 | 634 | 616 |
| GWP (TAR) | | | | 530 | 536 | 541 | 547 | 553 | 558 | 564 | 570 | 575 |
| F/(F + H) | | | | 0.615 | 0.592 | 0.571 | 0.550 | 0.531 | 0.513 | 0.496 | 0.480 | 0.464 |
| Capacity relative to 1234yf | | 106.6% | 100.0% | 118.1% | 119.6% | 121.0% | 122.2% | 123.2% | 124.1% | 124.9% | 125.5% | 126.0% |
| Relative COP | | 106.0% | 100.0% | 106.1% | 106.6% | 107.1% | 107.6% | 108.1% | 108.6% | 109.1% | 109.6% | 110.0% |
| Relative pressure drop | | 76.9% | 100.0% | 65.7% | 63.0% | 60.6% | 58.4% | 56.4% | 54.5% | 52.8% | 51.2% | 49.7% |

TABLE 26

Theoretical Performance Data of Selected R-32/R-152a/R-1234ze(E)/R-134a Blends Containing 15% R32 and 35% R134a

| | | | | | | | | | | |
|---|---|---|---|---|---|---|---|---|---|---|
| R-32 (% b/w) | | | 15 | 15 | 15 | 15 | 15 | 15 | 15 | 15 | 15 |
| R-134a (% b/w) | | | 35 | 35 | 35 | 35 | 35 | 35 | 35 | 35 | 35 |
| R-152a (% b/w) | | | 5 | 10 | 15 | 20 | 25 | 30 | 35 | 40 | 45 |
| R-1234ze(E) (% b/w) | | | 45 | 40 | 35 | 30 | 25 | 20 | 15 | 10 | 5 |

| Calculation results | | COMPARATIVE DATA | | 15/35/ | 15/35/ | 15/35/ | 15/35/ | 15/35/ | 15/35/ | 15/35/ | 15/35/ | 15/35/ |
| | | 134a | R1234yf | 5/45 | 10/40 | 15/35 | 20/30 | 25/25 | 30/20 | 35/15 | 40/10 | 45/5 |
|---|---|---|---|---|---|---|---|---|---|---|---|---|
| Pressure ratio | | 5.79 | 5.24 | 5.65 | 5.65 | 5.64 | 5.65 | 5.65 | 5.66 | 5.67 | 5.69 | 5.70 |
| Volumetric efficiency | | 83.6% | 84.7% | 84.4% | 84.6% | 84.8% | 84.9% | 85.1% | 85.2% | 85.3% | 85.4% | 85.5% |
| condenser glide | K | 0.0 | 0.0 | 5.2 | 5.0 | 4.8 | 4.6 | 4.5 | 4.5 | 4.4 | 4.4 | 4.4 |
| Evaporator glide | K | 0.0 | 0.0 | 3.3 | 3.2 | 3.1 | 3.0 | 2.9 | 2.9 | 2.9 | 2.9 | 2.9 |
| Evaporator inlet T | °C. | 0.0 | 0.0 | −1.7 | −1.6 | −1.5 | −1.5 | −1.5 | −1.5 | −1.4 | −1.5 | −1.5 |
| Condenser exit T | °C. | 55.0 | 55.0 | 52.4 | 52.5 | 52.6 | 52.7 | 52.7 | 52.8 | 52.8 | 52.8 | 52.8 |
| Condenser pressure | bar | 16.88 | 16.46 | 19.38 | 19.43 | 19.46 | 19.47 | 19.47 | 19.45 | 19.42 | 19.37 | 19.32 |
| Evaporator pressure | bar | 2.92 | 3.14 | 3.43 | 3.44 | 3.45 | 3.45 | 3.44 | 3.44 | 3.42 | 3.41 | 3.39 |
| Refrigeration effect | kJ/kg | 123.76 | 94.99 | 137.13 | 142.23 | 147.46 | 152.83 | 158.33 | 163.95 | 169.68 | 175.50 | 181.42 |
| COP | | 2.03 | 1.91 | 2.03 | 2.04 | 2.05 | 2.06 | 2.07 | 2.08 | 2.08 | 2.09 | 2.10 |

TABLE 26-continued

Theoretical Performance Data of Selected R-32/R-152a/R-1234ze(E)/R-134a Blends Containing 15% R32 and 35% R134a

| | | | | | | | | | | | |
|---|---|---|---|---|---|---|---|---|---|---|---|
| Discharge temperature | °C. | 99.15 | 92.88 | 105.64 | 107.17 | 108.69 | 110.22 | 111.75 | 113.28 | 114.80 | 116.32 | 117.83 |
| Mass flow rate | kg/hr | 174.53 | 227.39 | 157.51 | 151.87 | 146.48 | 141.33 | 136.42 | 131.75 | 127.30 | 123.07 | 119.06 |
| Volumetric flow rate | m3/hr | 13.16 | 14.03 | 11.28 | 11.15 | 11.04 | 10.95 | 10.87 | 10.81 | 10.75 | 10.71 | 10.68 |
| Volumetric capacity | kJ/m3 | 1641 | 1540 | 1916 | 1937 | 1956 | 1972 | 1986 | 1998 | 2008 | 2017 | 2023 |
| Pressure drop | kPa/m | 953 | 1239 | 756 | 728 | 701 | 677 | 655 | 634 | 615 | 597 | 580 |
| GWP (TAR BASIS) | | | | 546 | 552 | 558 | 563 | 569 | 575 | 580 | 586 | 592 |
| F/(F + H) | | | | 0.610 | 0.587 | 0.566 | 0.546 | 0.527 | 0.509 | 0.492 | 0.476 | 0.461 |
| Capacity relative to 1234yf | | 106.6% | 100.0% | 124.4% | 125.8% | 127.0% | 128.1% | 129.0% | 129.8% | 130.4% | 131.0% | 131.4% |
| Relative COP | | 106.0% | 100.0% | 106.1% | 106.6% | 107.1% | 107.6% | 108.0% | 108.5% | 109.0% | 109.5% | 109.9% |
| Relative pressure drop | | 76.9% | 100.0% | 61.0% | 58.7% | 56.6% | 54.6% | 52.8% | 51.2% | 49.6% | 48.2% | 46.8% |

TABLE 27

Theoretical Performance Data of Selected R-32/R-152a/R-1234ze(E)/R-134a Blends Containing 4% R32 and 40% R134a

| | | | | | | | | | | |
|---|---|---|---|---|---|---|---|---|---|---|
| R-32 (% b/w) | | | | 4 | 4 | 4 | 4 | 4 | 4 | 4 | 4 | 4 |
| R-134a (% b/w) | | | | 40 | 40 | 40 | 40 | 40 | 40 | 40 | 40 | 40 |
| R-152a (% b/w) | | | | 5 | 10 | 15 | 20 | 25 | 30 | 35 | 40 | 45 |
| R-1234ze (E) (% b/w) | | | | 51 | 46 | 41 | 36 | 31 | 26 | 21 | 16 | 11 |

| Calculation results | | COMPARATIVE DATA | | 4/40/ 5/51 | 4/40/ 10/46 | 4/40/ 15/41 | 4/40/ 20/36 | 4/40/ 25/31 | 4/40/ 30/26 | 4/40/ 35/21 | 4/40/ 40/16 | 4/40/ 45/11 |
|---|---|---|---|---|---|---|---|---|---|---|---|---|
| | | 134a | R1234yf | | | | | | | | | |
| Pressure ratio | | 5.79 | 5.24 | 5.69 | 5.69 | 5.68 | 5.68 | 5.69 | 5.70 | 5.70 | 5.72 | 5.73 |
| Volumetric efficiency | | 83.6% | 84.7% | 83.6% | 83.8% | 84.0% | 84.2% | 84.3% | 84.5% | 84.6% | 84.7% | 84.8% |
| condenser glide | K | 0.0 | 0.0 | 2.4 | 2.2 | 2.1 | 1.9 | 1.8 | 1.8 | 1.7 | 1.7 | 1.6 |
| Evaporator glide | K | 0.0 | 0.0 | 1.3 | 1.2 | 1.1 | 1.0 | 1.0 | 0.9 | 0.9 | 0.9 | 0.9 |
| Evaporator inlet T | °C. | 0.0 | 0.0 | −0.6 | −0.6 | −0.5 | −0.5 | −0.5 | −0.5 | −0.5 | −0.4 | −0.4 |
| Condenser exit T | °C. | 55.0 | 55.0 | 53.8 | 53.9 | 54.0 | 54.0 | 54.1 | 54.1 | 54.2 | 54.2 | 54.2 |
| Condenser pressure | bar | 16.88 | 16.46 | 16.27 | 16.38 | 16.48 | 16.55 | 16.61 | 16.64 | 16.67 | 16.68 | 16.68 |
| Evaporator pressure | bar | 2.92 | 3.14 | 2.86 | 2.88 | 2.90 | 2.91 | 2.92 | 2.92 | 2.92 | 2.92 | 2.91 |
| Refrigeration effect | kJ/kg | 123.76 | 94.99 | 122.96 | 128.06 | 133.27 | 138.61 | 144.06 | 149.61 | 155.27 | 161.01 | 166.84 |
| COP | | 2.03 | 1.91 | 2.02 | 2.03 | 2.05 | 2.06 | 2.07 | 2.08 | 2.09 | 2.10 | 2.11 |
| Discharge temperature | °C. | 99.15 | 92.88 | 96.73 | 98.36 | 99.99 | 101.60 | 103.22 | 104.82 | 106.41 | 108.00 | 109.57 |
| Mass flow rate | kg/hr | 174.53 | 227.39 | 175.67 | 168.68 | 162.07 | 155.83 | 149.94 | 144.37 | 139.11 | 134.15 | 129.46 |
| Volumetric flow rate | m3/hr | 13.16 | 14.03 | 13.66 | 13.43 | 13.23 | 13.06 | 12.91 | 12.78 | 12.66 | 12.57 | 12.48 |
| Volumetric capacity | kJ/m3 | 1641 | 1540 | 1581 | 1608 | 1632 | 1654 | 1673 | 1691 | 1706 | 1719 | 1730 |
| Pressure drop | kPa/m | 953 | 1239 | 994 | 948 | 907 | 869 | 834 | 803 | 774 | 747 | 723 |
| GWP (TAR) | | | | 551 | 557 | 562 | 568 | 574 | 580 | 585 | 591 | 597 |
| F/(F + H) | | | | 0.632 | 0.608 | 0.585 | 0.564 | 0.543 | 0.525 | 0.507 | 0.490 | 0.474 |
| Capacity relative to 1234yf | | 106.6% | 100.0% | 102.7% | 104.4% | 106.0% | 107.4% | 108.7% | 109.8% | 110.8% | 111.6% | 112.4% |

TABLE 27-continued

Theoretical Performance Data of Selected R-32/R-152a/R-1234ze(E)/R-134a Blends Containing 4% R32 and 40% R134a

| | | | | | | | | | | |
|---|---|---|---|---|---|---|---|---|---|---|
| Relative COP | 106.0% | 100.0% | 105.8% | 106.4% | 107.0% | 107.6% | 108.2% | 108.7% | 109.3% | 109.8% | 110.3% |
| Relative pressure drop | 76.9% | 100.0% | 80.3% | 76.5% | 73.2% | 70.1% | 67.3% | 64.8% | 62.4% | 60.3% | 58.3% |

TABLE 28

Theoretical Performance Data of Selected R-32/R-152a/R-1234ze(E)/R-134a Blends Containing 6% R32 and 40% R134a

| | | | | | | | | | | | |
|---|---|---|---|---|---|---|---|---|---|---|---|
| R-32 (% b/w) | | | 6 | 6 | 6 | 6 | 6 | 6 | 6 | 6 | 6 |
| R-134a (% b/w) | | | 40 | 40 | 40 | 40 | 40 | 40 | 40 | 40 | 40 |
| R-152a (% b/w) | | | 5 | 10 | 15 | 20 | 25 | 30 | 35 | 40 | 45 |
| R-1234ze (E) (% b/w) | | | 49 | 44 | 39 | 34 | 29 | 24 | 19 | 14 | 9 |

| Calculation results | | COMPARATIVE DATA | | 6/40/ | 6/40/ | 6/40/ | 6/40/ | 6/40/ | 6/40/ | 6/40/ | 6/40/ | 6/40/ |
|---|---|---|---|---|---|---|---|---|---|---|---|---|
| | | 134a | R1234yf | 5/49 | 10/44 | 15/39 | 20/34 | 25/29 | 30/24 | 35/19 | 40/14 | 45/9 |
| Pressure ratio | | 5.79 | 5.24 | 5.69 | 5.69 | 5.68 | 5.69 | 5.69 | 5.70 | 5.71 | 5.72 | 5.73 |
| Volumetric efficiency | | 83.6% | 84.7% | 83.8% | 84.0% | 84.1% | 84.3% | 84.5% | 84.6% | 84.7% | 84.8% | 84.9% |
| condenser glide | K | 0.0 | 0.0 | 3.0 | 2.9 | 2.7 | 2.6 | 2.5 | 2.4 | 2.3 | 2.3 | 2.3 |
| Evaporator glide | K | 0.0 | 0.0 | 1.7 | 1.6 | 1.5 | 1.4 | 1.4 | 1.3 | 1.3 | 1.3 | 1.3 |
| Evaporator inlet T | °C. | 0.0 | 0.0 | −0.8 | −0.8 | −0.7 | −0.7 | −0.7 | −0.7 | −0.7 | −0.7 | −0.7 |
| Condenser exit T | °C. | 55.0 | 55.0 | 53.5 | 53.6 | 53.7 | 53.7 | 53.8 | 53.8 | 53.8 | 53.9 | 53.9 |
| Condenser pressure | bar | 16.88 | 16.46 | 16.89 | 16.99 | 17.07 | 17.13 | 17.17 | 17.19 | 17.20 | 17.20 | 17.19 |
| Evaporator pressure | bar | 2.92 | 3.14 | 2.97 | 2.99 | 3.00 | 3.01 | 3.02 | 3.02 | 3.01 | 3.01 | 3.00 |
| Refrigeration effect | kJ/kg | 123.76 | 94.99 | 125.79 | 130.90 | 136.14 | 141.50 | 146.97 | 152.55 | 158.23 | 164.01 | 169.87 |
| COP | | 2.03 | 1.91 | 2.02 | 2.04 | 2.05 | 2.06 | 2.07 | 2.08 | 2.09 | 2.10 | 2.11 |
| Discharge temperature | °C. | 99.15 | 92.88 | 98.54 | 100.15 | 101.75 | 103.36 | 104.95 | 106.54 | 108.13 | 109.70 | 111.26 |
| Mass flow rate | kg/hr | 174.53 | 227.39 | 171.71 | 165.01 | 158.66 | 152.65 | 146.97 | 141.59 | 136.51 | 131.70 | 127.16 |
| Volumetric flow rate | m3/hr | 13.16 | 14.03 | 13.12 | 12.92 | 12.74 | 12.59 | 12.46 | 12.35 | 12.25 | 12.16 | 12.09 |
| Volumetric capacity | kJ/m3 | 1641 | 1540 | 1646 | 1672 | 1695 | 1716 | 1734 | 1750 | 1764 | 1776 | 1786 |
| Pressure drop | kPa/m | 953 | 1239 | 939 | 897 | 859 | 825 | 793 | 764 | 738 | 713 | 691 |
| GWP (TAR) | | | | 562 | 568 | 573 | 579 | 585 | 590 | 596 | 602 | 608 |
| F/(F + H) | | | | 0.628 | 0.604 | 0.581 | 0.560 | 0.540 | 0.522 | 0.504 | 0.487 | 0.471 |
| Capacity relative to 1234yf | | 106.6% | 100.0% | 106.9% | 108.6% | 110.1% | 111.4% | 112.6% | 113.6% | 114.5% | 115.3% | 116.0% |
| Relative COP | | 106.0% | 100.0% | 105.9% | 106.5% | 107.1% | 107.6% | 108.2% | 108.7% | 109.3% | 109.8% | 110.3% |
| Relative pressure drop | | 76.9% | 100.0% | 75.8% | 72.4% | 69.3% | 66.6% | 64.0% | 61.7% | 59.5% | 57.6% | 55.7% |

TABLE 29

Theoretical Performance Data of Selected R-32/R-152a/R-1234ze(E)/R-134a Blends Containing 8% R32 and 40% R134a

| | | | | | | | | | |
|---|---|---|---|---|---|---|---|---|---|
| R-32 (% b/w) | 8 | 8 | 8 | 8 | 8 | 8 | 8 | 8 | 8 |
| R-134a (% b/w) | 40 | 40 | 40 | 40 | 40 | 40 | 40 | 40 | 40 |

TABLE 29-continued

Theoretical Performance Data of Selected R-32/R-152a/R-1234ze(E)/R-134a Blends Containing 8% R32 and 40% R134a

| | | | | 5 | 10 | 15 | 20 | 25 | 30 | 35 | 40 | 45 |
|---|---|---|---|---|---|---|---|---|---|---|---|---|
| R-152a (% b/w) | | | | | | | | | | | | |
| R-1234ze(E) (% b/w) | | | | 47 | 42 | 37 | 32 | 27 | 22 | 17 | 12 | 7 |

| Calculation | | COMPARATIVE DATA | | 8/40/ | 8/40/ | 8/40/ | 8/40/ | 8/40/ | 8/40/ | 8/40/ | 8/40/ | 8/40/ |
|---|---|---|---|---|---|---|---|---|---|---|---|---|
| results | | 134a | R1234yf | 5/47 | 10/42 | 15/37 | 20/32 | 25/27 | 30/22 | 35/17 | 40/12 | 45/7 |
| Pressure ratio | | 5.79 | 5.24 | 5.69 | 5.68 | 5.68 | 5.68 | 5.69 | 5.70 | 5.71 | 5.72 | 5.73 |
| Volumetric efficiency | | 83.6% | 84.7% | 83.9% | 84.1% | 84.3% | 84.4% | 84.6% | 84.7% | 84.8% | 84.9% | 85.0% |
| condenser glide | K | 0.0 | 0.0 | 3.6 | 3.4 | 3.2 | 3.1 | 3.0 | 2.9 | 2.9 | 2.8 | 2.8 |
| Evaporator glide | K | 0.0 | 0.0 | 2.1 | 1.9 | 1.9 | 1.8 | 1.7 | 1.7 | 1.7 | 1.7 | 1.7 |
| Evaporator inlet T | ° C. | 0.0 | 0.0 | −1.0 | −1.0 | −0.9 | −0.9 | −0.9 | −0.9 | −0.8 | −0.8 | −0.8 |
| Condenser exit T | ° C. | 55.0 | 55.0 | 53.2 | 53.3 | 53.4 | 53.4 | 53.5 | 53.5 | 53.6 | 53.6 | 53.6 |
| Condenser pressure | bar | 16.88 | 16.46 | 17.50 | 17.59 | 17.65 | 17.69 | 17.72 | 17.73 | 17.73 | 17.71 | 17.69 |
| Evaporator pressure | bar | 2.92 | 3.14 | 3.08 | 3.10 | 3.11 | 3.11 | 3.12 | 3.11 | 3.11 | 3.10 | 3.09 |
| Refrigeration effect | kJ/kg | 123.76 | 94.99 | 128.55 | 133.67 | 138.93 | 144.31 | 149.81 | 155.42 | 161.14 | 166.94 | 172.83 |
| COP | | 2.03 | 1.91 | 2.03 | 2.04 | 2.05 | 2.06 | 2.07 | 2.08 | 2.09 | 2.10 | 2.11 |
| Discharge temperature | ° C. | 99.15 | 92.88 | 100.30 | 101.89 | 103.48 | 105.07 | 106.65 | 108.23 | 109.81 | 111.37 | 112.92 |
| Mass flow rate | kg/hr | 174.53 | 227.39 | 168.03 | 161.59 | 155.47 | 149.67 | 144.18 | 138.97 | 134.05 | 129.39 | 124.98 |
| Volumetric flow rate | m3/hr | 13.16 | 14.03 | 12.62 | 12.44 | 12.29 | 12.16 | 12.04 | 11.94 | 11.86 | 11.79 | 11.73 |
| Volumetric capacity | kJ/m3 | 1641 | 1540 | 1712 | 1736 | 1758 | 1777 | 1794 | 1809 | 1821 | 1832 | 1841 |
| Pressure drop | kPa/m | 953 | 1239 | 888 | 850 | 816 | 785 | 756 | 729 | 705 | 682 | 661 |
| GWP (TAR BASIS) | | | | 573 | 579 | 584 | 590 | 596 | 601 | 607 | 613 | 618 |
| F/(F + H) | | | | 0.624 | 0.600 | 0.578 | 0.557 | 0.538 | 0.519 | 0.502 | 0.485 | 0.469 |
| Capacity relative to 1234yf | | 106.6% | 100.0% | 111.2% | 112.8% | 114.2% | 115.4% | 116.5% | 117.5% | 118.3% | 119.0% | 119.6% |
| Relative COP | | 106.0% | 100.0% | 106.0% | 106.5% | 107.1% | 107.7% | 108.2% | 108.7% | 109.2% | 109.7% | 110.2% |
| Relative pressure drop | | 76.9% | 100.0% | 71.7% | 68.6% | 65.9% | 63.3% | 61.0% | 58.8% | 56.9% | 55.1% | 53.4% |

TABLE 30

Theoretical Performance Data of Selected R-32/R-152a/R-1234ze(E)/R-134a Blends Containing 10% R32 and 40% R134a

| | | | | | | | | | | | |
|---|---|---|---|---|---|---|---|---|---|---|---|
| R-32 (% b/w) | | | 10 | 10 | 10 | 10 | 10 | 10 | 10 | 10 | 10 |
| R-134a (% b/w) | | | 40 | 40 | 40 | 40 | 40 | 40 | 40 | 40 | 40 |
| R-152a (% b/w) | | | 5 | 10 | 15 | 20 | 25 | 30 | 35 | 40 | 45 |
| R-1234ze(E) (% b/w) | | | 45 | 40 | 35 | 30 | 25 | 20 | 15 | 10 | 5 |

| Calculation | | COMPARATIVE DATA | | 10/40/ | 10/40/ | 10/40/ | 10/40/ | 10/40/ | 10/40/ | 10/40/ | 10/40/ | 10/40/ |
|---|---|---|---|---|---|---|---|---|---|---|---|---|
| results | | 134a | R1234yf | 5/45 | 10/40 | 15/35 | 20/30 | 25/25 | 30/20 | 35/15 | 40/10 | 45/5 |
| Pressure ratio | | 5.79 | 5.24 | 5.68 | 5.67 | 5.67 | 5.68 | 5.68 | 5.69 | 5.70 | 5.72 | 5.73 |
| Volumetric efficiency | | 83.6% | 84.7% | 84.1% | 84.3% | 84.4% | 84.6% | 84.7% | 84.8% | 85.0% | 85.1% | 85.2% |
| condenser glide | K | 0.0 | 0.0 | 4.1 | 3.9 | 3.7 | 3.6 | 3.5 | 3.4 | 3.4 | 3.3 | 3.3 |

TABLE 30-continued

Theoretical Performance Data of Selected R-32/R-152a/R-1234ze(E)/R-134a Blends Containing 10% R32 and 40% R134a

| | | | | | | | | | | | |
|---|---|---|---|---|---|---|---|---|---|---|---|
| Evaporator glide | K | 0.0 | 0.0 | 2.4 | 2.3 | 2.2 | 2.1 | 2.1 | 2.1 | 2.0 | 2.1 | 2.1 |
| Evaporator inlet T | °C. | 0.0 | 0.0 | −1.2 | −1.1 | −1.1 | −1.1 | −1.0 | −1.0 | −1.0 | −1.0 | −1.0 |
| Condenser exit T | °C. | 55.0 | 55.0 | 53.0 | 53.1 | 53.1 | 53.2 | 53.3 | 53.3 | 53.3 | 53.3 | 53.3 |
| Condenser pressure | bar | 16.88 | 16.46 | 18.11 | 18.18 | 18.23 | 18.26 | 18.27 | 18.27 | 18.25 | 18.22 | 18.19 |
| Evaporator pressure | bar | 2.92 | 3.14 | 3.19 | 3.20 | 3.21 | 3.22 | 3.21 | 3.21 | 3.20 | 3.19 | 3.17 |
| Refrigeration effect | kJ/kg | 123.76 | 94.99 | 131.23 | 136.37 | 141.66 | 147.07 | 152.60 | 158.24 | 163.98 | 169.82 | 175.74 |
| COP | | 2.03 | 1.91 | 2.03 | 2.04 | 2.05 | 2.06 | 2.07 | 2.08 | 2.09 | 2.10 | 2.11 |
| Discharge temperature | °C. | 99.15 | 92.88 | 102.02 | 103.60 | 105.17 | 106.75 | 108.32 | 109.89 | 111.46 | 113.01 | 114.55 |
| Mass flow rate | kg/hr | 174.53 | 227.39 | 164.60 | 158.39 | 152.48 | 146.87 | 141.55 | 136.50 | 131.72 | 127.20 | 122.91 |
| Volumetric flow rate | m3/hr | 13.16 | 14.03 | 12.16 | 12.00 | 11.87 | 11.75 | 11.65 | 11.57 | 11.50 | 11.44 | 11.39 |
| Volumetric capacity | kJ/m3 | 1641 | 1540 | 1777 | 1800 | 1820 | 1838 | 1854 | 1867 | 1879 | 1889 | 1897 |
| Pressure drop | kPa/m | 953 | 1239 | 843 | 808 | 777 | 748 | 721 | 697 | 674 | 653 | 634 |
| GWP (TAR) | | | | 584 | 589 | 595 | 601 | 607 | 612 | 618 | 624 | 629 |
| F/(F + H) | | | | 0.620 | 0.596 | 0.575 | 0.554 | 0.535 | 0.516 | 0.499 | 0.483 | 0.467 |
| Capacity relative to 1234yf | | 106.6% | 100.0% | 115.4% | 116.9% | 118.2% | 119.4% | 120.4% | 121.3% | 122.0% | 122.7% | 123.2% |
| Relative COP | | 106.0% | 100.0% | 106.0% | 106.6% | 107.1% | 107.7% | 108.2% | 108.7% | 109.2% | 109.7% | 110.2% |
| Relative pressure drop | | 76.9% | 100.0% | 68.0% | 65.2% | 62.7% | 60.3% | 58.2% | 56.2% | 54.4% | 52.7% | 51.2% |

TABLE 31

Theoretical Performance Data of Selected R-32/R-152a/R-1234ze(E)/R-134a Blends Containing 12% R32 and 40% R134a

| | | | | | | | | | | |
|---|---|---|---|---|---|---|---|---|---|---|
| R-32 (% b/w) | | | 12 | 12 | 12 | 12 | 12 | 12 | 12 | 12 | 12 |
| R-134a (% b/w) | | | 40 | 40 | 40 | 40 | 40 | 40 | 40 | 40 | 40 |
| R-152a (% b/w) | | | 5 | 10 | 15 | 20 | 25 | 30 | 35 | 40 | 45 |
| R-1234ze(E) (% b/w) | | | 43 | 38 | 33 | 28 | 23 | 18 | 13 | 8 | 3 |

| Calculation results | | COMPARATIVE DATA | | 12/40/ 5/43 | 12/40/ 10/38 | 12/40/ 15/33 | 12/40/ 20/28 | 12/40/ 25/23 | 12/40/ 30/18 | 12/40/ 35/13 | 12/40/ 40/8 | 12/40/ 45/3 |
|---|---|---|---|---|---|---|---|---|---|---|---|---|
| | | 134a | R1234yf | | | | | | | | | |
| Pressure ratio | | 5.79 | 5.24 | 5.67 | 5.66 | 5.66 | 5.67 | 5.67 | 5.68 | 5.70 | 5.71 | 5.72 |
| Volumetric efficiency | | 83.6% | 84.7% | 84.2% | 84.4% | 84.6% | 84.7% | 84.9% | 85.0% | 85.1% | 85.2% | 85.3% |
| condenser glide | K | 0.0 | 0.0 | 4.5 | 4.3 | 4.1 | 4.0 | 3.9 | 3.8 | 3.8 | 3.8 | 3.8 |
| Evaporator glide | K | 0.0 | 0.0 | 2.7 | 2.6 | 2.5 | 2.5 | 2.4 | 2.4 | 2.4 | 2.4 | 2.4 |
| Evaporator inlet T | °C. | 0.0 | 0.0 | −1.4 | −1.3 | −1.3 | −1.2 | −1.2 | −1.2 | −1.2 | −1.2 | −1.2 |
| Condenser exit T | °C. | 55.0 | 55.0 | 52.8 | 52.9 | 53.0 | 53.0 | 53.1 | 53.1 | 53.1 | 53.1 | 53.1 |
| Condenser pressure | bar | 16.88 | 16.46 | 18.71 | 18.76 | 18.80 | 18.81 | 18.81 | 18.79 | 18.76 | 18.73 | 18.68 |
| Evaporator pressure | bar | 2.92 | 3.14 | 3.30 | 3.31 | 3.32 | 3.32 | 3.31 | 3.31 | 3.29 | 3.28 | 3.26 |
| Refrigeration effect | kJ/kg | 123.76 | 94.99 | 133.84 | 139.01 | 144.32 | 149.76 | 155.32 | 161.00 | 166.77 | 172.64 | 178.60 |
| COP | | 2.03 | 1.91 | 2.03 | 2.04 | 2.05 | 2.06 | 2.07 | 2.08 | 2.09 | 2.10 | 2.11 |
| Discharge temperature | °C. | 99.15 | 92.88 | 103.71 | 105.27 | 106.84 | 108.40 | 109.97 | 111.53 | 113.08 | 114.62 | 116.16 |
| Mass flow rate | kg/hr | 174.53 | 227.39 | 161.39 | 155.38 | 149.66 | 144.23 | 139.06 | 134.16 | 129.52 | 125.11 | 120.94 |

TABLE 31-continued

Theoretical Performance Data of Selected R-32/R-152a/R-1234ze(E)/R-134a Blends Containing 12% R32 and 40% R134a

| | | | | | | | | | | | |
|---|---|---|---|---|---|---|---|---|---|---|---|
| Volumetric flow rate | m3/hr | 13.16 | 14.03 | 11.73 | 11.59 | 11.47 | 11.37 | 11.29 | 11.22 | 11.16 | 11.11 | 11.07 |
| Volumetric capacity | kJ/m3 | 1641 | 1540 | 1842 | 1863 | 1882 | 1899 | 1913 | 1926 | 1936 | 1945 | 1952 |
| Pressure drop | kPa/m | 953 | 1239 | 801 | 769 | 741 | 714 | 689 | 667 | 646 | 627 | 609 |
| GWP (TAR) | | | | 595 | 600 | 606 | 612 | 617 | 623 | 629 | 634 | 640 |
| F/(F + H) | | | | 0.616 | 0.593 | 0.571 | 0.551 | 0.532 | 0.514 | 0.497 | 0.480 | 0.465 |
| Capacity relative to 1234yf | | 106.6% | 100.0% | 119.6% | 121.0% | 122.3% | 123.3% | 124.3% | 125.1% | 125.7% | 126.3% | 126.8% |
| Relative COP | | 106.0% | 100.0% | 106.0% | 106.6% | 107.1% | 107.6% | 108.1% | 108.7% | 109.1% | 109.6% | 110.1% |
| Relative pressure drop | | 76.9% | 100.0% | 64.6% | 62.1% | 59.8% | 57.6% | 55.6% | 53.8% | 52.1% | 50.6% | 49.1% |

TABLE 32

Theoretical Performance Data of Selected R-32/R-152a/R-1234ze(E)/R-134a Blends Containing 15% R32 and 40% R134a

| | | | | | | | | | | |
|---|---|---|---|---|---|---|---|---|---|---|
| R-32 (% b/w) | | | | 15 | 15 | 15 | 15 | 15 | 15 | 15 | 15 | 15 |
| R-134a (% b/w) | | | | 40 | 40 | 40 | 40 | 40 | 40 | 40 | 40 | 40 |
| R-152a (% b/w) | | | | 5 | 10 | 15 | 20 | 25 | 30 | 35 | 40 | 45 |
| R-1234ze(E) (% b/w) | | | | 40 | 35 | 30 | 25 | 20 | 15 | 10 | 5 | 0 |

| Calculation results | | COMPARATIVE DATA | | 15/40/ 5/40 | 15/40/ 10/35 | 15/40/ 15/30 | 15/40/ 20/25 | 15/40/ 25/20 | 15/40/ 30/15 | 15/40/ 35/10 | 15/40/ 40/5 | 15/40/ 45/0 |
|---|---|---|---|---|---|---|---|---|---|---|---|---|
| | | 134a | R1234yf | | | | | | | | | |
| Pressure ratio | | 5.79 | 5.24 | 5.64 | 5.64 | 5.65 | 5.65 | 5.66 | 5.67 | 5.68 | 5.70 | 5.71 |
| Volumetric efficiency | | 83.6% | 84.7% | 84.5% | 84.7% | 84.8% | 85.0% | 85.1% | 85.2% | 85.3% | 85.4% | 85.5% |
| condenser glide | K | 0.0 | 0.0 | 4.9 | 4.7 | 4.6 | 4.5 | 4.4 | 4.3 | 4.3 | 4.3 | 4.3 |
| Evaporator glide | K | 0.0 | 0.0 | 3.2 | 3.0 | 3.0 | 2.9 | 2.9 | 2.9 | 2.9 | 2.9 | 2.9 |
| Evaporator inlet T | °C. | 0.0 | 0.0 | -1.6 | -1.5 | -1.5 | -1.4 | -1.4 | -1.4 | -1.4 | -1.4 | -1.5 |
| Condenser exit T | °C. | 55.0 | 55.0 | 52.5 | 52.6 | 52.7 | 52.8 | 52.8 | 52.8 | 52.8 | 52.8 | 52.8 |
| Condenser pressure | bar | 16.88 | 16.46 | 19.60 | 19.63 | 19.64 | 19.63 | 19.61 | 19.57 | 19.53 | 19.47 | 19.40 |
| Evaporator pressure | bar | 2.92 | 3.14 | 3.47 | 3.48 | 3.48 | 3.47 | 3.46 | 3.45 | 3.44 | 3.42 | 3.40 |
| Refrigeration effect | kJ/kg | 123.76 | 94.99 | 137.65 | 142.86 | 148.22 | 153.71 | 159.32 | 165.04 | 170.87 | 176.79 | 182.80 |
| COP | | 2.03 | 1.91 | 2.03 | 2.04 | 2.05 | 2.06 | 2.07 | 2.08 | 2.09 | 2.09 | 2.10 |
| Discharge temperature | °C. | 99.15 | 92.88 | 106.19 | 107.73 | 109.28 | 110.84 | 112.39 | 113.93 | 115.47 | 117.01 | 118.53 |
| Mass flow rate | kg/hr | 174.53 | 227.39 | 156.92 | 151.20 | 145.73 | 140.53 | 135.58 | 130.87 | 126.41 | 122.18 | 118.16 |
| Volumetric flow rate | m3/hr | 13.16 | 14.03 | 11.14 | 11.03 | 10.94 | 10.85 | 10.79 | 10.73 | 10.69 | 10.65 | 10.62 |
| Volumetric capacity | kJ/m3 | 1641 | 1540 | 1938 | 1958 | 1975 | 1990 | 2002 | 2013 | 2022 | 2028 | 2034 |
| Pressure drop | kPa/m | 953 | 1239 | 745 | 717 | 692 | 668 | 646 | 626 | 608 | 590 | 574 |
| GWP (TAR) | | | | 611 | 617 | 622 | 628 | 634 | 639 | 645 | 651 | 657 |
| F/(F + H) | | | | 0.610 | 0.588 | 0.566 | 0.546 | 0.528 | 0.510 | 0.493 | 0.477 | 0.462 |
| Capacity relative to 1234yf | | 106.6% | 100.0% | 125.9% | 127.2% | 128.3% | 129.2% | 130.1% | 130.7% | 131.3% | 131.7% | 132.1% |
| Relative COP | | 106.0% | 100.0% | 106.0% | 106.5% | 107.0% | 107.6% | 108.1% | 108.6% | 109.0% | 109.5% | 110.0% |
| Relative pressure drop | | 76.9% | 100.0% | 60.1% | 57.9% | 55.8% | 53.9% | 52.2% | 50.5% | 49.0% | 47.6% | 46.3% |

TABLE 33

Theoretical Performance Data of Selected R-32/R-152a/R-1234ze(E)/R-134a Blends Containing 4% R32 and 45% R134a

| | | | | | | | | | | | |
|---|---|---|---|---|---|---|---|---|---|---|---|
| R-32 (% b/w) | | | 4 | 4 | 4 | 4 | 4 | 4 | 4 | 4 | 4 |
| R-134a (% b/w) | | | 45 | 45 | 45 | 45 | 45 | 45 | 45 | 45 | 45 |
| R-152a (% b/w) | | | 5 | 10 | 15 | 20 | 25 | 30 | 35 | 40 | 45 |
| R-1234ze(E) (% b/w) | | | 46 | 41 | 36 | 31 | 26 | 21 | 16 | 11 | 6 |

| Calculation | | COMPARATIVE DATA | | 4/45/ | 4/45/ | 4/45/ | 4/45/ | 4/45/ | 4/45/ | 4/45/ | 4/45/ | 4/45/ |
|---|---|---|---|---|---|---|---|---|---|---|---|---|
| results | | 134a | R1234yf | 5/46 | 10/41 | 15/36 | 20/31 | 25/26 | 30/21 | 35/16 | 40/11 | 45/6 |
| Pressure ratio | | 5.79 | 5.24 | 5.69 | 5.68 | 5.68 | 5.69 | 5.70 | 5.71 | 5.72 | 5.73 | 5.74 |
| Volumetric efficiency | | 83.6% | 84.7% | 83.7% | 83.9% | 84.1% | 84.2% | 84.4% | 84.5% | 84.6% | 84.7% | 84.8% |
| condenser glide | K | 0.0 | 0.0 | 2.2 | 2.1 | 1.9 | 1.8 | 1.7 | 1.7 | 1.6 | 1.6 | 1.6 |
| Evaporator glide | K | 0.0 | 0.0 | 1.2 | 1.1 | 1.0 | 1.0 | 0.9 | 0.9 | 0.9 | 0.9 | 0.9 |
| Evaporator inlet T | °C. | 0.0 | 0.0 | −0.6 | −0.6 | −0.5 | −0.5 | −0.5 | −0.5 | −0.4 | −0.4 | −0.4 |
| Condenser exit T | °C. | 55.0 | 55.0 | 53.9 | 54.0 | 54.0 | 54.1 | 54.1 | 54.2 | 54.2 | 54.2 | 54.2 |
| Condenser pressure | bar | 16.88 | 16.46 | 16.49 | 16.59 | 16.66 | 16.72 | 16.76 | 16.78 | 16.79 | 16.78 | 16.77 |
| Evaporator pressure | bar | 2.92 | 3.14 | 2.90 | 2.92 | 2.93 | 2.94 | 2.94 | 2.94 | 2.94 | 2.93 | 2.92 |
| Refrigeration effect | kJ/kg | 123.76 | 94.99 | 123.55 | 128.75 | 134.06 | 139.50 | 145.05 | 150.70 | 156.44 | 162.27 | 168.18 |
| COP | | 2.03 | 1.91 | 2.02 | 2.03 | 2.05 | 2.06 | 2.07 | 2.08 | 2.09 | 2.10 | 2.11 |
| Discharge temperature | °C. | 99.15 | 92.88 | 97.30 | 98.94 | 100.58 | 102.22 | 103.84 | 105.46 | 107.07 | 108.66 | 110.25 |
| Mass flow rate | kg/hr | 174.53 | 227.39 | 174.83 | 167.77 | 161.12 | 154.84 | 148.92 | 143.33 | 138.07 | 133.11 | 128.43 |
| Volumetric flow rate | m3/hr | 13.16 | 14.03 | 13.47 | 13.26 | 13.07 | 12.92 | 12.78 | 12.66 | 12.56 | 12.48 | 12.40 |
| Volumetric capacity | kJ/m3 | 1641 | 1540 | 1604 | 1629 | 1652 | 1672 | 1690 | 1706 | 1720 | 1731 | 1742 |
| Pressure drop | kPa/m | 953 | 1239 | 976 | 932 | 892 | 855 | 822 | 791 | 763 | 737 | 714 |
| GWP (TAR) | | | | 616 | 621 | 627 | 633 | 639 | 644 | 650 | 656 | 661 |
| F/(F + H) | | | | 0.632 | 0.608 | 0.585 | 0.564 | 0.544 | 0.525 | 0.507 | 0.490 | 0.474 |
| Capacity relative to 1234yf | | 106.6% | 100.0% | 104.2% | 105.8% | 107.3% | 108.6% | 109.8% | 110.8% | 111.7% | 112.5% | 113.1% |
| Relative COP | | 106.0% | 100.0% | 105.8% | 106.4% | 107.0% | 107.6% | 108.2% | 108.8% | 109.4% | 109.9% | 110.4% |
| Relative pressure drop | | 76.9% | 100.0% | 78.8% | 75.2% | 72.0% | 69.0% | 66.3% | 63.9% | 61.6% | 59.5% | 57.6% |

TABLE 34

Theoretical Performance Data of Selected R-32/R-152a/R-1234ze(E)/R-134a Blends Containing 6% R32 and 45% R134a

| | | | | | | | | | | | |
|---|---|---|---|---|---|---|---|---|---|---|---|
| R-32 (% b/w) | | | 6 | 6 | 6 | 6 | 6 | 6 | 6 | 6 | 6 |
| R-134a (% b/w) | | | 45 | 45 | 45 | 45 | 45 | 45 | 45 | 45 | 45 |
| R-152a (% b/w) | | | 5 | 10 | 15 | 20 | 25 | 30 | 35 | 40 | 45 |
| R-1234ze(E) (% b/w) | | | 44 | 39 | 34 | 29 | 24 | 19 | 14 | 9 | 4 |

| Calculation | | COMPARATIVE DATA | | 6/45/ | 6/45/ | 6/45/ | 6/45/ | 6/45/ | 6/45/ | 6/45/ | 6/45/ | 6/45/ |
|---|---|---|---|---|---|---|---|---|---|---|---|---|
| results | | 134a | R1234yf | 5/44 | 10/39 | 15/34 | 20/29 | 25/24 | 30/19 | 35/14 | 40/9 | 45/4 |
| Pressure ratio | | 5.79 | 5.24 | 5.69 | 5.68 | 5.69 | 5.69 | 5.70 | 5.71 | 5.72 | 5.73 | 5.75 |

TABLE 34-continued

Theoretical Performance Data of Selected R-32/R-152a/R-1234ze(E)/R-134a Blends Containing 6% R32 and 45% R134a

| | | | | | | | | | | | |
|---|---|---|---|---|---|---|---|---|---|---|---|
| Volumetric efficiency | | 83.6% | 84.7% | 83.8% | 84.0% | 84.2% | 84.3% | 84.5% | 84.6% | 84.7% | 84.8% | 84.9% |
| condenser glide | K | 0.0 | 0.0 | 2.9 | 2.7 | 2.6 | 2.4 | 2.4 | 2.3 | 2.3 | 2.2 | 2.2 |
| Evaporator glide | K | 0.0 | 0.0 | 1.6 | 1.5 | 1.4 | 1.4 | 1.3 | 1.3 | 1.3 | 1.3 | 1.3 |
| Evaporator inlet T | °C. | 0.0 | 0.0 | −0.8 | −0.7 | −0.7 | −0.7 | −0.7 | −0.6 | −0.6 | −0.6 | −0.7 |
| Condenser exit T | °C. | 55.0 | 55.0 | 53.6 | 53.7 | 53.7 | 53.8 | 53.8 | 53.8 | 53.9 | 53.9 | 53.9 |
| Condenser pressure | bar | 16.88 | 16.46 | 17.11 | 17.19 | 17.25 | 17.29 | 17.31 | 17.32 | 17.32 | 17.30 | 17.27 |
| Evaporator pressure | bar | 2.92 | 3.14 | 3.01 | 3.02 | 3.03 | 3.04 | 3.04 | 3.03 | 3.03 | 3.02 | 3.01 |
| Refrigeration effect | kJ/kg | 123.76 | 94.99 | 126.38 | 131.59 | 136.94 | 142.40 | 147.97 | 153.65 | 159.42 | 165.28 | 171.22 |
| COP | | 2.03 | 1.91 | 2.02 | 2.04 | 2.05 | 2.06 | 2.07 | 2.08 | 2.09 | 2.10 | 2.11 |
| Discharge temperature | °C. | 99.15 | 92.88 | 99.10 | 100.73 | 102.35 | 103.97 | 105.58 | 107.19 | 108.79 | 110.37 | 111.94 |
| Mass flow rate | kg/hr | 174.53 | 227.39 | 170.92 | 164.14 | 157.74 | 151.69 | 145.97 | 140.58 | 135.49 | 130.68 | 126.15 |
| Volumetric flow rate | m3/hr | 13.16 | 14.03 | 12.94 | 12.76 | 12.60 | 12.46 | 12.34 | 12.24 | 12.15 | 12.08 | 12.02 |
| Volumetric capacity | kJ/m3 | 1641 | 1540 | 1669 | 1693 | 1715 | 1734 | 1750 | 1765 | 1777 | 1788 | 1797 |
| Pressure drop | kPa/m | 953 | 1239 | 923 | 882 | 846 | 812 | 782 | 754 | 728 | 704 | 682 |
| GWP (TAR) | | | | 627 | 632 | 638 | 644 | 649 | 655 | 661 | 667 | 672 |
| F/(F + H) | | | | 0.628 | 0.604 | 0.582 | 0.561 | 0.541 | 0.522 | 0.505 | 0.488 | 0.472 |
| Capacity relative to 1234yf | | 106.6% | 100.0% | 108.4% | 110.0% | 111.4% | 112.6% | 113.7% | 114.6% | 115.4% | 116.1% | 116.7% |
| Relative COP | | 106.0% | 100.0% | 105.9% | 106.5% | 107.1% | 107.7% | 108.2% | 108.8% | 109.3% | 109.9% | 110.4% |
| Relative pressure drop | | 76.9% | 100.0% | 74.5% | 71.2% | 68.3% | 65.6% | 63.1% | 60.8% | 58.8% | 56.8% | 55.1% |

TABLE 34

Theoretical Performance Data of Selected R-32/R-152a/R-1234ze(E)/R-134a Blends Containing 8% R32 and 45% R134a

| | | | | | | | | | | |
|---|---|---|---|---|---|---|---|---|---|---|
| R-32 (% b/w) | | | 8 | 8 | 8 | 8 | 8 | 8 | 8 | 8 | 8 |
| R-134a (% b/w) | | | 45 | 45 | 45 | 45 | 45 | 45 | 45 | 45 | 45 |
| R-152a (% b/w) | | | 5 | 10 | 15 | 20 | 25 | 30 | 35 | 40 | 45 |
| R-1234ze(E) (% b/w) | | | 42 | 37 | 32 | 27 | 22 | 17 | 12 | 7 | 2 |

| Calculation results | | COMPARATIVE DATA | | 8/45/ | 8/45/ | 8/45/ | 8/45/ | 8/45/ | 8/45/ | 8/45/ | 8/45/ | 8/45/ |
|---|---|---|---|---|---|---|---|---|---|---|---|---|
| | | 134a | R1234yf | 5/42 | 10/37 | 15/32 | 20/27 | 25/22 | 30/17 | 35/12 | 40/7 | 45/2 |
| Pressure ratio | | 5.79 | 5.24 | 5.68 | 5.68 | 5.68 | 5.69 | 5.70 | 5.71 | 5.72 | 5.73 | 5.75 |
| Volumetric efficiency | | 83.6% | 84.7% | 84.0% | 84.2% | 84.3% | 84.5% | 84.6% | 84.7% | 84.8% | 84.9% | 85.0% |
| condenser glide | K | 0.0 | 0.0 | 3.4 | 3.2 | 3.1 | 3.0 | 2.9 | 2.8 | 2.8 | 2.8 | 2.8 |
| Evaporator glide | K | 0.0 | 0.0 | 2.0 | 1.8 | 1.8 | 1.7 | 1.7 | 1.7 | 1.7 | 1.7 | 1.7 |
| Evaporator inlet T | °C. | 0.0 | 0.0 | −1.0 | −0.9 | −0.9 | −0.9 | −0.8 | −0.8 | −0.8 | −0.8 | −0.8 |
| Condenser exit T | °C. | 55.0 | 55.0 | 53.3 | 53.4 | 53.5 | 53.5 | 53.5 | 53.6 | 53.6 | 53.6 | 53.6 |
| Condenser pressure | bar | 16.88 | 16.46 | 17.72 | 17.78 | 17.83 | 17.85 | 17.86 | 17.86 | 17.84 | 17.81 | 17.77 |
| Evaporator pressure | bar | 2.92 | 3.14 | 3.12 | 3.13 | 3.14 | 3.14 | 3.14 | 3.13 | 3.12 | 3.11 | 3.09 |
| Refrigeration effect | kJ/kg | 123.76 | 94.99 | 129.13 | 134.37 | 139.74 | 145.23 | 150.83 | 156.54 | 162.35 | 168.24 | 174.21 |
| COP | | 2.03 | 1.91 | 2.03 | 2.04 | 2.05 | 2.06 | 2.07 | 2.08 | 2.09 | 2.10 | 2.11 |

TABLE 34-continued

Theoretical Performance Data of Selected R-32/R-152a/R-1234ze(E)/R-134a Blends Containing 8% R32 and 45% R134a

| | | | | | | | | | | | |
|---|---|---|---|---|---|---|---|---|---|---|---|
| Discharge temperature | °C. | 99.15 | 92.88 | 100.86 | 102.47 | 104.08 | 105.69 | 107.29 | 108.89 | 110.47 | 112.05 | 113.61 |
| Mass flow rate | kg/hr | 174.53 | 227.39 | 167.27 | 160.75 | 154.58 | 148.73 | 143.21 | 137.98 | 133.05 | 128.39 | 123.99 |
| Volumetric flow rate | m3/hr | 13.16 | 14.03 | 12.45 | 12.29 | 12.16 | 12.04 | 11.93 | 11.85 | 11.77 | 11.71 | 11.66 |
| Volumetric capacity | kJ/m3 | 1641 | 1540 | 1734 | 1757 | 1777 | 1795 | 1810 | 1823 | 1834 | 1844 | 1852 |
| Pressure drop | kPa/m | 953 | 1239 | 874 | 837 | 804 | 773 | 745 | 719 | 696 | 674 | 654 |
| GWP (TAR) | | | | 638 | 643 | 649 | 655 | 660 | 666 | 672 | 677 | 683 |
| F/(F + H) | | | | 0.624 | 0.600 | 0.578 | 0.558 | 0.538 | 0.520 | 0.502 | 0.486 | 0.470 |
| Capacity relative to 1234yf | | 106.6% | 100.0% | 112.6% | 114.1% | 115.4% | 116.6% | 117.5% | 118.4% | 119.1% | 119.8% | 120.3% |
| Relative COP | | 106.0% | 100.0% | 105.9% | 106.5% | 107.1% | 107.7% | 108.2% | 108.8% | 109.3% | 109.8% | 110.3% |
| Relative pressure drop | | 76.9% | 100.0% | 70.5% | 67.6% | 64.9% | 62.4% | 60.1% | 58.1% | 56.2% | 54.4% | 52.7% |

TABLE 35

Theoretical Performance Data of Selected R-32/R-152a/R-1234ze(E)/R-134a Blends Containing 10% R32 and 45% R134a

| | | | | | | | | | | |
|---|---|---|---|---|---|---|---|---|---|---|
| R-32 (% b/w) | | 10 | 10 | 10 | 10 | 10 | 10 | 10 | 10 | 10 |
| R-134a (% b/w) | | 45 | 45 | 45 | 45 | 45 | 45 | 45 | 45 | 45 |
| R-152a (% b/w) | | 5 | 10 | 15 | 20 | 25 | 30 | 35 | 40 | 45 |
| R-1234ze(E) (% b/w) | | 40 | 35 | 30 | 25 | 20 | 15 | 10 | 5 | 0 |

| | | COMPARATIVE DATA | | 10/45/ | 10/45/ | 10/45/ | 10/45/ | 10/45/ | 10/45/ | 10/45/ | 10/45/ | 10/45/ |
|---|---|---|---|---|---|---|---|---|---|---|---|---|
| | | 134a | R1234yf | 5/40 | 10/35 | 15/30 | 20/25 | 25/20 | 30/15 | 35/10 | 40/5 | 45/0 |
| Pressure ratio | | 5.79 | 5.24 | 5.67 | 5.67 | 5.68 | 5.68 | 5.69 | 5.70 | 5.72 | 5.73 | 5.75 |
| Volumetric efficiency | | 83.6% | 84.7% | 84.1% | 84.3% | 84.5% | 84.6% | 84.8% | 84.9% | 85.0% | 85.1% | 85.2% |
| condenser glide | K | 0.0 | 0.0 | 3.8 | 3.7 | 3.5 | 3.4 | 3.4 | 3.3 | 3.3 | 3.3 | 3.3 |
| Evaporator glide | K | 0.0 | 0.0 | 2.3 | 2.2 | 2.1 | 2.1 | 2.0 | 2.0 | 2.0 | 2.0 | 2.1 |
| Evaporator inlet T | °C. | 0.0 | 0.0 | −1.1 | −1.1 | −1.1 | −1.0 | −1.0 | −1.0 | −1.0 | −1.0 | −1.0 |
| Condenser exit T | °C. | 55.0 | 55.0 | 53.1 | 53.2 | 53.2 | 53.3 | 53.3 | 53.3 | 53.4 | 53.4 | 53.4 |
| Condenser pressure | bar | 16.88 | 16.46 | 18.32 | 18.37 | 18.40 | 18.41 | 18.41 | 18.39 | 18.36 | 18.32 | 18.27 |
| Evaporator pressure | bar | 2.92 | 3.14 | 3.23 | 3.24 | 3.24 | 3.24 | 3.23 | 3.22 | 3.21 | 3.20 | 3.18 |
| Refrigeration effect | kJ/kg | 123.76 | 94.99 | 131.81 | 137.08 | 142.47 | 147.99 | 153.63 | 159.37 | 165.21 | 171.14 | 177.14 |
| COP | | 2.03 | 1.91 | 2.03 | 2.04 | 2.05 | 2.06 | 2.07 | 2.08 | 2.09 | 2.10 | 2.11 |
| Discharge temperature | °C. | 99.15 | 92.88 | 102.58 | 104.18 | 105.78 | 107.37 | 108.97 | 110.55 | 112.13 | 113.70 | 115.25 |
| Mass flow rate | kg/hr | 174.53 | 227.39 | 163.87 | 157.58 | 151.61 | 145.95 | 140.60 | 135.53 | 130.74 | 126.21 | 121.94 |
| Volumetric flow rate | m3/hr | 13.16 | 14.03 | 12.01 | 11.87 | 11.74 | 11.64 | 11.55 | 11.48 | 11.42 | 11.37 | 11.33 |
| Volumetric capacity | kJ/m3 | 1641 | 1540 | 1799 | 1820 | 1839 | 1855 | 1869 | 1882 | 1892 | 1900 | 1907 |
| Pressure drop | kPa/m | 953 | 1239 | 829 | 796 | 765 | 737 | 712 | 688 | 666 | 646 | 627 |
| GWP (TAR) | | | | 648 | 654 | 660 | 666 | 671 | 677 | 683 | 688 | 694 |
| F/(F + H) | | | | 0.620 | 0.597 | 0.575 | 0.555 | 0.535 | 0.517 | 0.500 | 0.483 | 0.468 |
| Capacity relative to 1234yf | | 106.6% | 100.0% | 116.8% | 118.2% | 119.4% | 120.5% | 121.4% | 122.2% | 122.9% | 123.4% | 123.9% |

TABLE 35-continued

Theoretical Performance Data of Selected R-32/R-152a/R-1234ze(E)/R-134a Blends Containing 10% R32 and 45% R134a

| | | | | | | | | | | |
|---|---|---|---|---|---|---|---|---|---|---|
| Relative COP | 106.0% | 100.0% | 105.9% | 106.5% | 107.1% | 107.7% | 108.2% | 108.8% | 109.3% | 109.8% | 110.3% |
| Relative pressure drop | 76.9% | 100.0% | 66.9% | 64.2% | 61.8% | 59.5% | 57.4% | 55.5% | 53.7% | 52.1% | 50.6% |

TABLE 36

Theoretical Performance Data of Selected R-32/R-152a/R-1234ze(E)/R-134a Blends Containing 12% R32 and 45% R134a

| | | | | | | | | | | |
|---|---|---|---|---|---|---|---|---|---|---|
| R-32 (% b/w) | | | 12 | 12 | 12 | 12 | 12 | 12 | 12 | 12 | 12 |
| R-134a (% b/w) | | | 45 | 45 | 45 | 45 | 45 | 45 | 45 | 45 | 45 |
| R-152a (% b/w) | | | 5 | 10 | 15 | 20 | 25 | 30 | 35 | 40 | 45 |
| R-1234ze(E) (% b/w) | | | 38 | 33 | 28 | 23 | 18 | 13 | 8 | 3 | −2 |

| Calculation results | | COMPARATIVE DATA | | 12/45/ 5/38 | 12/45/ 10/33 | 12/45/ 15/28 | 12/45/ 20/23 | 12/45/ 25/18 | 12/45/ 30/13 | 12/45/ 35/8 | 12/45/ 40/3 | 12/45/ 45/−2 |
|---|---|---|---|---|---|---|---|---|---|---|---|---|
| | | 134a | R1234yf | | | | | | | | | |
| Pressure ratio | | 5.79 | 5.24 | 5.66 | 5.66 | 5.67 | 5.67 | 5.68 | 5.70 | 5.71 | 5.72 | 5.74 |
| Volumetric efficiency | | 83.6% | 84.7% | 84.3% | 84.5% | 84.6% | 84.8% | 84.9% | 85.0% | 85.1% | 85.2% | 85.3% |
| condenser glide | K | 0.0 | 0.0 | 4.2 | 4.1 | 3.9 | 3.8 | 3.8 | 3.7 | 3.7 | 3.7 | 3.7 |
| Evaporator glide | K | 0.0 | 0.0 | 2.6 | 2.5 | 2.4 | 2.4 | 2.4 | 2.4 | 2.4 | 2.4 | 2.4 |
| Evaporator inlet T | °C. | 0.0 | 0.0 | −1.3 | −1.2 | −1.2 | −1.2 | −1.2 | −1.2 | −1.2 | −1.2 | −1.2 |
| Condenser exit T | °C. | 55.0 | 55.0 | 52.9 | 53.0 | 53.0 | 53.1 | 53.1 | 53.1 | 53.1 | 53.1 | 53.1 |
| Condenser pressure | bar | 16.88 | 16.46 | 18.92 | 18.95 | 18.97 | 18.96 | 18.94 | 18.91 | 18.87 | 18.82 | 18.75 |
| Evaporator pressure | bar | 2.92 | 3.14 | 3.34 | 3.35 | 3.35 | 3.34 | 3.33 | 3.32 | 3.30 | 3.29 | 3.27 |
| Refrigeration effect | kJ/kg | 123.76 | 94.99 | 134.43 | 139.73 | 145.15 | 150.71 | 156.38 | 162.15 | 168.03 | 173.99 | 180.03 |
| COP | | 2.03 | 1.91 | 2.03 | 2.04 | 2.05 | 2.06 | 2.07 | 2.08 | 2.09 | 2.10 | 2.11 |
| Discharge temperature | °C. | 99.15 | 92.88 | 104.27 | 105.86 | 107.45 | 109.03 | 110.62 | 112.19 | 113.76 | 115.32 | 116.87 |
| Mass flow rate | kg/hr | 174.53 | 227.39 | 160.68 | 154.59 | 148.81 | 143.32 | 138.13 | 133.21 | 128.55 | 124.15 | 119.98 |
| Volumetric flow rate | m3/hr | 13.16 | 14.03 | 11.59 | 11.47 | 11.36 | 11.27 | 11.20 | 11.14 | 11.08 | 11.04 | 11.01 |
| Volumetric capacity | kJ/ m3 | 1641 | 1540 | 1864 | 1884 | 1901 | 1916 | 1929 | 1940 | 1949 | 1956 | 1962 |
| Pressure drop | kPa/ m | 953 | 1239 | 789 | 758 | 730 | 704 | 681 | 659 | 638 | 619 | 602 |
| GWP (TAR) | | | | 659 | 665 | 671 | 676 | 682 | 688 | 693 | 699 | 705 |
| F/(F + H) | | | | 0.616 | 0.593 | 0.572 | 0.552 | 0.532 | 0.514 | 0.497 | 0.481 | 0.466 |
| Capacity relative to 1234yf | | 106.6% | 100.0% | 121.0% | 122.3% | 123.5% | 124.4% | 125.3% | 126.0% | 126.6% | 127.0% | 127.4% |
| Relative COP | | 106.0% | 100.0% | 106.0% | 106.5% | 107.1% | 107.6% | 108.2% | 108.7% | 109.2% | 109.7% | 110.2% |
| Relative pressure drop | | 76.9% | 100.0% | 63.7% | 61.2% | 58.9% | 56.8% | 54.9% | 53.2% | 51.5% | 50.0% | 48.6% |

TABLE 37

Theoretical Performance Data of Selected R-32/R-152a/R-1234ze(E)/R-134a Blends Containing 15% R32 and 45% R134a

| | | | | | | | |
|---|---|---|---|---|---|---|---|
| R-32 (% b/w) | 15 | 15 | 15 | 15 | 15 | 15 | 15 |
| R-134a (% b/w) | 45 | 45 | 45 | 45 | 45 | 45 | 45 |
| R-152a (% b/w) | 5 | 10 | 15 | 20 | 25 | 30 | 35 |

TABLE 37-continued

Theoretical Performance Data of Selected R-32/R-152a/R-1234ze(E)/R-134a Blends Containing 15% R32 and 45% R134a

| R-1234ze(E) (% b/w) | | 35 | 30 | 25 | 20 | 15 | 10 | 5 |
|---|---|---|---|---|---|---|---|---|
| Calculation | | COMPARATIVE DATA | | 15/45/ | 15/45/ | 15/45/ | 15/45/ | 15/45/ | 15/45/ | 15/45/ |
| results | | 134a | R1234yf | 5/35 | 10/30 | 15/25 | 20/20 | 25/15 | 30/10 | 35/5 |
| Pressure ratio | | 5.79 | 5.24 | 5.64 | 5.64 | 5.65 | 5.66 | 5.67 | 5.68 | 5.70 |
| Volumetric efficiency | | 83.6% | 84.7% | 84.6% | 84.7% | 84.9% | 85.0% | 85.1% | 85.2% | 85.3% |
| condenser glide | K | 0.0 | 0.0 | 4.6 | 4.5 | 4.4 | 4.3 | 4.3 | 4.3 | 4.3 |
| Evaporator glide | K | 0.0 | 0.0 | 3.0 | 2.9 | 2.9 | 2.8 | 2.8 | 2.8 | 2.9 |
| Evaporator inlet T | °C. | 0.0 | 0.0 | −1.5 | −1.5 | −1.4 | −1.4 | −1.4 | −1.4 | −1.4 |
| Condenser exit T | °C. | 55.0 | 55.0 | 52.7 | 52.7 | 52.8 | 52.8 | 52.9 | 52.9 | 52.9 |
| Condenser pressure | bar | 16.88 | 16.46 | 19.80 | 19.81 | 19.80 | 19.78 | 19.74 | 19.69 | 19.62 |
| Evaporator pressure | bar | 2.92 | 3.14 | 3.51 | 3.51 | 3.51 | 3.50 | 3.48 | 3.46 | 3.44 |
| Refrigeration effect | kJ/kg | 123.76 | 94.99 | 138.26 | 143.60 | 149.08 | 154.68 | 160.41 | 166.24 | 172.17 |
| COP | | 2.03 | 1.91 | 2.03 | 2.04 | 2.05 | 2.06 | 2.07 | 2.08 | 2.09 |
| Discharge temperature | °C. | 99.15 | 92.88 | 106.76 | 108.33 | 109.90 | 111.48 | 113.05 | 114.61 | 116.17 |
| Mass flow rate | kg/hr | 174.53 | 227.39 | 156.23 | 150.42 | 144.89 | 139.64 | 134.66 | 129.93 | 125.46 |
| Volumetric flow rate | m3/hr | 13.16 | 14.03 | 11.02 | 10.92 | 10.84 | 10.77 | 10.71 | 10.66 | 10.62 |
| Volumetric capacity | kJ/m3 | 1641 | 1540 | 1960 | 1978 | 1993 | 2006 | 2017 | 2026 | 2033 |
| Pressure drop | kPa/m | 953 | 1239 | 735 | 707 | 683 | 660 | 638 | 619 | 601 |
| GWP (TAR) | | | | 676 | 681 | 687 | 693 | 698 | 704 | 710 |
| F/(F + H) | | | | 0.610 | 0.588 | 0.567 | 0.547 | 0.528 | 0.511 | 0.494 |
| Capacity relative to 1234yf | | 106.6% | 100.0% | 127.3% | 128.5% | 129.5% | 130.3% | 131.0% | 131.6% | 132.1% |
| Relative COP | | 106.0% | 100.0% | 105.9% | 106.5% | 107.0% | 107.6% | 108.1% | 108.6% | 109.1% |
| Relative pressure drop | | 76.9% | 100.0% | 59.3% | 57.1% | 55.1% | 53.2% | 51.5% | 49.9% | 48.5% |

I claim:

1. A heat transfer composition comprising trans-1,3,3,3-tetrafluoropropene (R-12342e(E)), difluoromethane (R-32) and 1,1-difluoroethane (R-152a), wherein the composition has a fluorine ratio (F/(F+H)) of from about 0.42 to about 0.65 wherein the composition comprises substantially no pentafluoropropene (R-1225).

2. A composition according to claim 1 wherein the fluorine ratio is greater than about 0.44.

3. A composition according to claim 1 comprising from about 2 to about 25 by weight R-32, from about 5 to about 45% by weight of R-152a and from about 60 to about 95 by weight R-1234ze(E).

4. A composition according to claim 1 consisting essentially of R-32, R-152a and R-1234ze(E).

5. A composition according to claim 1 further comprising 1,1,1,2-tetrafluoroethane (R-134a).

6. A composition according to claim 5 comprising up to about 50% by weight of R-134a.

7. A composition according to claim 6 comprising from about 2 to about 15 by weight R-32, from about 5 to about 45% by weight R-152a, from about 25 to about 50% R-134a, and from about 5 to about 70% by weight R-1234ze(E).

8. A composition according to claim 6 consisting essentially of R-32, R-152a, R-12342e(E) and R-134a.

9. A composition according to claim 1 wherein the composition is less flammable than R-1234yf alone.

10. A composition according to claim 9 wherein the composition has:
 (a) a higher flammable limit;
 (b) a higher ignition energy; and/or
 (c) a lower flame velocity
compared to R-1234yf alone.

11. A composition according to claim 9 which is non-flammable at 23° C.

12. A composition comprising a lubricant and a composition according to claim 1.

13. A composition according to claim 12, wherein the lubricant is selected from mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof.

14. A composition according to claim 12 further comprising a stabiliser.

15. A composition according to claim 14, wherein the stabiliser is selected from diene-based compounds, phosphates, phenol compounds and epoxides, and mixtures thereof.

16. A composition comprising a flame retardant and a composition according to claim 1.

17. A composition according to claim 16, wherein the flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

18. A heat transfer device containing a composition as defined in claim 1.

19. A heat transfer device according to claim 18 which is a refrigeration device.

20. A heat transfer device according to claim 19 which is selected from group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems.

21. A heat transfer device according to claim 19 which contains a compressor.

22. A blowing agent comprising a composition as defined in claim 1.

23. A foamable composition comprising one or more components capable of forming foam and a composition as defined in claim 1, wherein the one or more components capable of forming foam are selected from polyurethanes, thermoplastic polymers and resins, such as polystyrene, and epoxy resins, and mixtures thereof.

24. A foam comprising a composition as defined in claim 1.

25. A sprayable composition comprising material to be sprayed and a propellant comprising a composition as defined in claim 1.

26. A method for cooling an article which comprises condensing a composition as defined in claim 1 and thereafter evaporating the composition in the vicinity of the article to be cooled.

27. A method for heating an article which comprises condensing a composition as defined in claim 1 in the vicinity of the article to be heated and thereafter evaporating the composition.

28. A method for extracting a substance from biomass comprising contacting biomass with a solvent comprising a composition as defined in claim 1, and separating the substance from the solvent.

29. A method of cleaning an article comprising contacting the article with a solvent comprising a composition as defined in claim 1.

30. A method of extracting a material from an aqueous solution or a particulate solid matrix comprising contacting the aqueous solution or the particulate solid matrix with a solvent comprising a composition as defined in claim 1, and separating the material from the solvent.

31. A mechanical power generation device containing a composition as defined in claim 1.

32. A mechanical power generating device according to claim 31 which is adapted to use a Rankine Cycle or modification thereof to generate work from heat.

33. A method of retrofitting a heat transfer device comprising the step of removing an existing heat transfer fluid, and introducing a composition as defined in claim 1.

34. A method of claim 33 wherein the heat transfer device is a refrigeration device.

35. A method according to claim 34 wherein the heat transfer device is an air conditioning system.

36. A method for reducing the environmental impact arising from the operation of a product comprising an existing compound or composition, the method comprising replacing at least partially the existing compound or composition with a composition as defined in claim 1.

37. A method for preparing a composition as defined in claim 1, which composition contains R-134a, the method comprising introducing R-1234ze(E), R-32, and R-152a, and optionally a lubricant, a stabiliser and/or a flame retardant, into a heat transfer device containing an existing heat transfer fluid which is R-134a.

38. A method according to claim 37 comprising the step of removing at least some of the existing R-134a from the composition before introducing the R-1234ze(E), R-32, and R-152a, and optionally the lubricant, the stabiliser and/or the flame retardant.

39. A method for generating greenhouse gas emission credit comprising (i) replacing an existing compound or composition with a composition as defined in claim 1, wherein the composition as defined in claim 1 has a lower GWP than the existing compound or composition; and (ii) obtaining greenhouse gas emission credit for said replacing step.

40. A method of claim 39 wherein the use of the composition of the invention results in a lower Total Equivalent Warming Impact, and/or a lower Life-Cycle Carbon Production than is be attained by use of the existing compound or composition.

41. A method of claim 39 carried out on a product from the fields of air-conditioning, refrigeration, heat transfer, blowing agents, aerosols or sprayable propellants, gaseous dielectrics, cryosurgery, veterinary procedures, dental procedures, fire extinguishing, flame suppression, solvents, cleaners, air horns, pellet guns, topical anesthetics, and expansion applications.

42. A method according to claim 36 wherein the product is selected from a heat transfer device, a blowing agent, a foamable composition, a sprayable composition, a solvent or a mechanical power generation device.

43. A method according to claim 42 wherein the product is a heat transfer device.

44. A method according to claim 36 wherein the existing compound or composition is a heat transfer composition.

45. A method according to claim 44 wherein the heat transfer composition is a refrigerant selected from R-134a, R-1234yf and R-152a.

* * * * *

UNITED STATES PATENT AND TRADEMARK OFFICE
CERTIFICATE OF CORRECTION

PATENT NO. : 8,926,856 B2
APPLICATION NO. : 13/946697
DATED : January 6, 2015
INVENTOR(S) : Robert E. Low Page 1 of 1

It is certified that error appears in the above-identified patent and that said Letters Patent is hereby corrected as shown below:

In the Claims

Column 79, line 2 of Claim 1, after "tetrafluoropropene" delete "(R-12342e(E))" and insert -- (R-1234ze(E)) --

Column 79, line 2 of Claim 3, after "about 2 to about" delete "25" and insert -- 25% --

Column 79, line 3 of Claim 3, after "about 60 to about" delete "95" and insert -- 95% --

Column 79, line 2 of Claim 7, after "about 2 to about" delete "15" and insert -- 15% --

Column 79, line 2 of Claim 8, after "R-32, R-152a," delete "R-12342e(E)" and insert -- R-1234ze(E) --

Signed and Sealed this
Thirtieth Day of June, 2015

Michelle K. Lee
*Director of the United States Patent and Trademark Office*